(12) United States Patent
Nishikawa

(10) Patent No.: US 8,086,714 B2
(45) Date of Patent: Dec. 27, 2011

(54) LOAD BALANCING SYSTEM

(75) Inventor: Yasuhiro Nishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 12/570,252

(22) Filed: Sep. 30, 2009

(65) Prior Publication Data

US 2010/0036956 A1    Feb. 11, 2010

Related U.S. Application Data

(63) Continuation of application No. PCT/JP2007/057582, filed on Apr. 4, 2007.

(51) Int. Cl.
*G06F 15/173* (2006.01)
(52) U.S. Cl. .......... 709/223; 709/224; 709/225
(58) Field of Classification Search ........ 709/223–226
See application file for complete search history.

(56) References Cited

U.S. PATENT DOCUMENTS

| | | | | |
|---|---|---|---|---|
| 5,991,809 A * | 11/1999 | Kriegsman | | 709/226 |
| 6,108,703 A * | 8/2000 | Leighton et al. | | 709/226 |
| 6,119,143 A * | 9/2000 | Dias et al. | | 709/201 |
| 6,185,598 B1 * | 2/2001 | Farber et al. | | 709/200 |
| 6,327,622 B1 * | 12/2001 | Jindal et al. | | 709/228 |
| 6,553,413 B1 * | 4/2003 | Leighton et al. | | 709/219 |
| 6,587,878 B1 * | 7/2003 | Merriam | | 709/224 |
| 6,665,706 B2 * | 12/2003 | Kenner et al. | | 709/203 |
| 6,820,133 B1 * | 11/2004 | Grove et al. | | 709/238 |
| 2003/0120724 A1 | 6/2003 | Kawashimo et al. | | |
| 2004/0193681 A1 | 9/2004 | Koike et al. | | |

FOREIGN PATENT DOCUMENTS

| | | |
|---|---|---|
| JP | 2003-196178 | 7/2003 |
| JP | 2004-302564 | 10/2004 |
| JP | 2005-182641 | 7/2005 |
| JP | 2005-352576 | 12/2005 |

OTHER PUBLICATIONS

International Search Report dated Jun. 19, 2007, from the corresponding International Application.

* cited by examiner

*Primary Examiner* — Hussein A. Elchanti
(74) *Attorney, Agent, or Firm* — Katten Muchin Rosenman LLP

(57) ABSTRACT

In a hierarchical load balancing system with each layer including one or more nodes, the load balancing information for all the nodes included in the hierarchical structure is collectively managed by any of the nodes. The load balancing information is defined as the information indicating any one of the number of the processes accepted and the number of the processes executed in the node to which the processing request is distributed, the connection status and the load condition of the node to which the processing request is distributed, and the load balancing manner carried out by the load balancing nodes.

16 Claims, 47 Drawing Sheets

FIG. 8

INFORMATION ELEMENT ID

| | DATA NAME |
|---|---|
| 1 | LAYER NO. |
| 2 | DEVICE NO. |
| 3 | IP ADDRESS |
| 4 | NUMBER OF DEVICES IN SAME LAYER |
| 5 | DEVICE STATE |
| 6 | ROUTE STATE FROM HIGHER-LAYER DEVICES |
| 7 | LOAD BALANCING TYPE |
| 8 | LOAD BALANCING MANNER (EXISTING) |
| 9 | LOAD BALANCING MANNER SWITCHING FLAG |
| 10 | LOAD BALANCING MANNER SWITCHING |
| 11 | NUMBER OF PROCESSES ACCEPTED |
| 12 | NUMBER OF PROCESSED EXECUTED |
| 13 | IP CONNECTION IN ESTABLISHED STATE |
| 14 | NUMBER OF IP CONNECTIONS IN USE |
| 15 | NUMBER OF RESIDUAL IP CONNECTIONS |
| 16 | COUNT HOLDING TIME USED FOR SWITCHING TO Least Connection |
| 17 | COUNT USED FOR SWITCHING TO Least Connection |
| 18 | THRESHOLD OF COUNT USED FOR SWITCHING TO Least Connection |
| 19 | CPU UTILIZATION RATE |
| 20 | CPU UTILIZATION RATE THRESHOLD |
| 21 | MEMORY UTILIZATION RATE |
| 22 | MEMORY UTILIZATION RATE THRESHOLD |
| 23 | PROCESS UTILIZATION RATE |
| 24 | PROCESS UTILIZATION RATE THRESHOLD |
| 25 | RESOURCE UTILIZATION AMOUNT |
| 26 | RESOURCE UTILIZATION AMOUNT THRESHOLD VALUE |
| 27 | COUNT HOLDING TIME USED FOR SWITCHING TO WEIGHTING METHOD |
| 28 | COUNT USED FOR SWITCHING TO WEIGHTING METHOD |
| 29 | THRESHOLD OF COUNT USED FOR SWITCHING TO WEIGHTING METHOD |
| 30 | CLIENT IP ADDRESS CONNECTED TO TARGET DEVICE |
| 31 | IP ADDRESS OF LOAD DISTRIBUTEE SERVER CONNECTED TO CLIENT |
| 32 | NOTIFIED INFORMATION |
| 33 | LAYER NO. OF NEXT LOWER LAYER |
| 34 | NUMBER OF DEVICES IN NEXT LOWER LAYER |
| 35 | DEVICE NO. IN NEXT LOWER LAYER |
| 36 | LOAD BALANCING MANNER FOR NEXT LOWER LAYER |
| 37 | IP ADDRESS OF DEVICES IN NEXT LOWER LAYER |
| 38 | LOAD BALANCING TYPE OF NEXT LOWER LAYER |
| 39 | DEVICE STATE IN NEXT LOWER LAYER |
| 40 | ROUTE STATE OF NEXT LOWER LAYER |

FIG.9

| |
|---|
| LOAD BALANCING INFORMATION OF SERVER 11 |
| LOAD BALANCING INFORMATION OF SERVER 12 |
| LOAD BALANCING INFORMATION OF SERVER 13 |
| LOAD BALANCING INFORMATION OF SERVER LB21 |
| LOAD BALANCING INFORMATION OF SERVER 31 |
| LOAD BALANCING INFORMATION OF SERVER 32 |
| LOAD BALANCING INFORMATION OF SERVER 33 |
| LOAD BALANCING INFORMATION OF SERVER 34 |
| LOAD BALANCING INFORMATION OF SERVER 35 |
| LOAD BALANCING INFORMATION OF SERVER 36 |
| LOAD BALANCING INFORMATION OF SERVER 37 |
| LOAD BALANCING INFORMATION OF SERVER 38 |
| LOAD BALANCING INFORMATION OF SERVER 39 |
| LOAD BALANCING INFORMATION OF LB41 |
| LOAD BALANCING INFORMATION OF LB42 |
| LOAD BALANCING INFORMATION OF LB43 |
| LOAD BALANCING INFORMATION OF SERVER 51 |
| LOAD BALANCING INFORMATION OF SERVER 52 |
| LOAD BALANCING INFORMATION OF SERVER 53 |
| LOAD BALANCING INFORMATION OF SERVER 54 |
| LOAD BALANCING INFORMATION OF SERVER 55 |
| LOAD BALANCING INFORMATION OF SERVER 56 |
| LOAD BALANCING INFORMATION OF SERVER 57 |
| LOAD BALANCING INFORMATION OF SERVER 58 |
| LOAD BALANCING INFORMATION OF SERVER 59 |

FIG.10

| LOAD BALANCING INFORMATION OF LB21 |
|---|
| LOAD BALANCING INFORMATION OF SERVER 31 |
| LOAD BALANCING INFORMATION OF SERVER 32 |
| LOAD BALANCING INFORMATION OF SERVER 33 |
| LOAD BALANCING INFORMATION OF SERVER 34 |
| LOAD BALANCING INFORMATION OF SERVER 35 |
| LOAD BALANCING INFORMATION OF SERVER 36 |
| LOAD BALANCING INFORMATION OF SERVER 37 |
| LOAD BALANCING INFORMATION OF SERVER 38 |
| LOAD BALANCING INFORMATION OF SERVER 39 |

FIG.11

| LOAD BALANCING INFORMATION OF LB41 |
|---|
| LOAD BALANCING INFORMATION OF SERVER 51 |
| LOAD BALANCING INFORMATION OF SERVER 52 |
| LOAD BALANCING INFORMATION OF SERVER 53 |

FIG.15

INFORMATION ELEMENT ID

| | DATA NAME |
|---|---|
| | REQUEST TYPE |
| | INFORMATION ELEMENT ID BIT MAP INFORMATION |
| 1 | LAYER NO. |
| 2 | DEVICE NO. |
| 3 | IP ADDRESS |
| 4 | NUMBER DEVICES IN SAME LAYER |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | |
| 39 | |

INFORMATION ELEMENT ID

FIG.16

| | DATA NAME |
|---|---|
| | REQUEST TYPE |
| | INFORMATION ELEMENT ID BIT MAP INFORMATION |
| 1 | LAYER NO. |
| 2 | DEVICE NO. |
| 3 | IP ADDRESS |
| 4 | NUMBER OF DEVICES IN SAME LAYER |
| 5 | DEVICE STATE |
| 6 | ROUTE STATE FROM HIGHER-LAYER DEVICES |
| 7 | LOAD BALANCING TYPE |
| 8 | LOAD BALANCING MANNER (EXISTING) |
| 9 | LOAD BALANCING MANNER SWITCHING FLAG |
| 10 | LOAD BALANCING MANNER SWITCHING |
| 11 | NUMBER OF PROCESSES ACCEPTED |
| 12 | NUMBER OF PROCESSED EXECUTED |
| 13 | IP CONNECTION IN ESTABLISHED STATE |
| 14 | NUMBER OF IP CONNECTIONS IN USE |
| 15 | NUMBER OF RESIDUAL IP CONNECTIONS |
| 16 | COUNT HOLDING TIME USED FOR SWITCHING TO Least Connection |
| 17 | COUNT USED FOR SWITCHING TO Least Connection |
| 18 | THRESHOLD OF COUNT USED FOR SWITCHING TO Least Connection |
| 19 | CPU UTILIZATION RATE |
| 20 | CPU UTILIZATION RATE THRESHOLD |
| 21 | MEMORY UTILIZATION RATE |
| 22 | MEMORY UTILIZATION RATE THRESHOLD |
| 23 | PROCESS UTILIZATION RATE |
| 24 | PROCESS UTILIZATION RATE THRESHOLD |
| 25 | RESOURCE UTILIZATION AMOUNT |
| 26 | RESOURCE UTILIZATION AMOUNT THRESHOLD VALUE |
| 27 | COUNT HOLDING TIME USED FOR SWITCHING TO WEIGHTING METHOD |
| 28 | COUNT USED FOR SWITCHING TO WEIGHTING METHOD |
| 29 | THRESHOLD OF COUNT USED FOR SWITCHING TO WEIGHTING METHOD |
| 30 | CLIENT IP ADDRESS CONNECTED TO TARGET DEVICE |
| 31 | IP ADDRESS OF LOAD DISTRIBUTEE SERVER CONNECTED TO CLIENT |
| 32 | NOTIFIED INFORMATION |
| 33 | LAYER NO. OF NEXT LOWER LAYER |
| 34 | NUMBER OF DEVICES IN NEXT LOWER LAYER |
| 35 | DEVICE NO. IN NEXT LOWER LAYER |
| 36 | LOAD BALANCING MANNER FOR NEXT LOWER LAYER |
| 37 | IP ADDRESS OF DEVICES IN NEXT LOWER LAYER |
| 38 | LOAD BALANCING TYPE OF NEXT LOWER LAYER |
| 39 | DEVICE STATE IN NEXT LOWER LAYER |
| 40 | ROUTE STATE OF NEXT LOWER LAYER |

FIG. 30

INFORMATION ELEMENT ID

| | DATA NAME |
|---|---|
| | REQUEST TYPE |
| | INFORMATION ELEMENT ID BIT MAP INFORMATION |
| 1 | LAYER NO. |
| 2 | DEVICE NO. |
| 3 | IP ADDRESS |
| 4 | NUMBER OF DEVICES IN SAME LAYER |
| 5 | DEVICE STATE |
| 6 | ROUTE STATE FROM HIGHER-LAYER DEVICES |
| 7 | LOAD BALANCING TYPE |
| 8 | LOAD BALANCING MANNER (EXISTING) |
| 9 | LOAD BALANCING MANNER SWITCHING FLAG |
| 10 | LOAD BALANCING MANNER SWITCHING |
| 11 | |
| 12 | |
| 13 | |
| 14 | |
| 15 | |
| 16 | COUNT HOLDING TIME USED FOR SWITCHING TO Least Connection |
| 17 | COUNT USED FOR SWITCHING TO Least Connection |
| 18 | THRESHOLD OF COUNT USED FOR SWITCHING TO Least Connection |
| 19 | |
| 20 | CPU UTILIZATION RATE THRESHOLD |
| 21 | |
| 22 | MEMORY UTILIZATION RATE THRESHOLD |
| 23 | |
| 24 | PROCESS UTILIZATION RATE THRESHOLD |
| 25 | |
| 26 | RESOURCE UTILIZATION AMOUNT THRESHOLD VALUE |
| 27 | COUNT HOLDING TIME USED FOR SWITCHING TO WEIGHTING METHOD |
| 28 | COUNT USED FOR SWITCHING TO WEIGHTING METHOD |
| 29 | THRESHOLD OF COUNT USED FOR SWITCHING TO WEIGHTING METHOD |
| 30 | CLIENT IP ADDRESS CONNECTED TO TARGET DEVICE |
| 31 | IP ADDRESS OF LOAD DISTRIBUTEE SERVER CONNECTED TO CLIENT |
| 32 | NOTIFIED INFORMATION |
| 33 | LAYER NO. OF NEXT LOWER LAYER |
| 34 | NUMBER OF DEVICES IN NEXT LOWER LAYER |
| 35 | DEVICE NO. IN NEXT LOWER LAYER |
| 36 | LOAD BALANCING MANNER FOR NEXT LOWER LAYER |
| 37 | IP ADDRESS OF DEVICES IN NEXT LOWER LAYER |
| 38 | LOAD BALANCING TYPE OF NEXT LOWER LAYER |
| 39 | DEVICE STATE IN NEXT LOWER LAYER |
| 40 | ROUTE STATE OF NEXT LOWER LAYER |

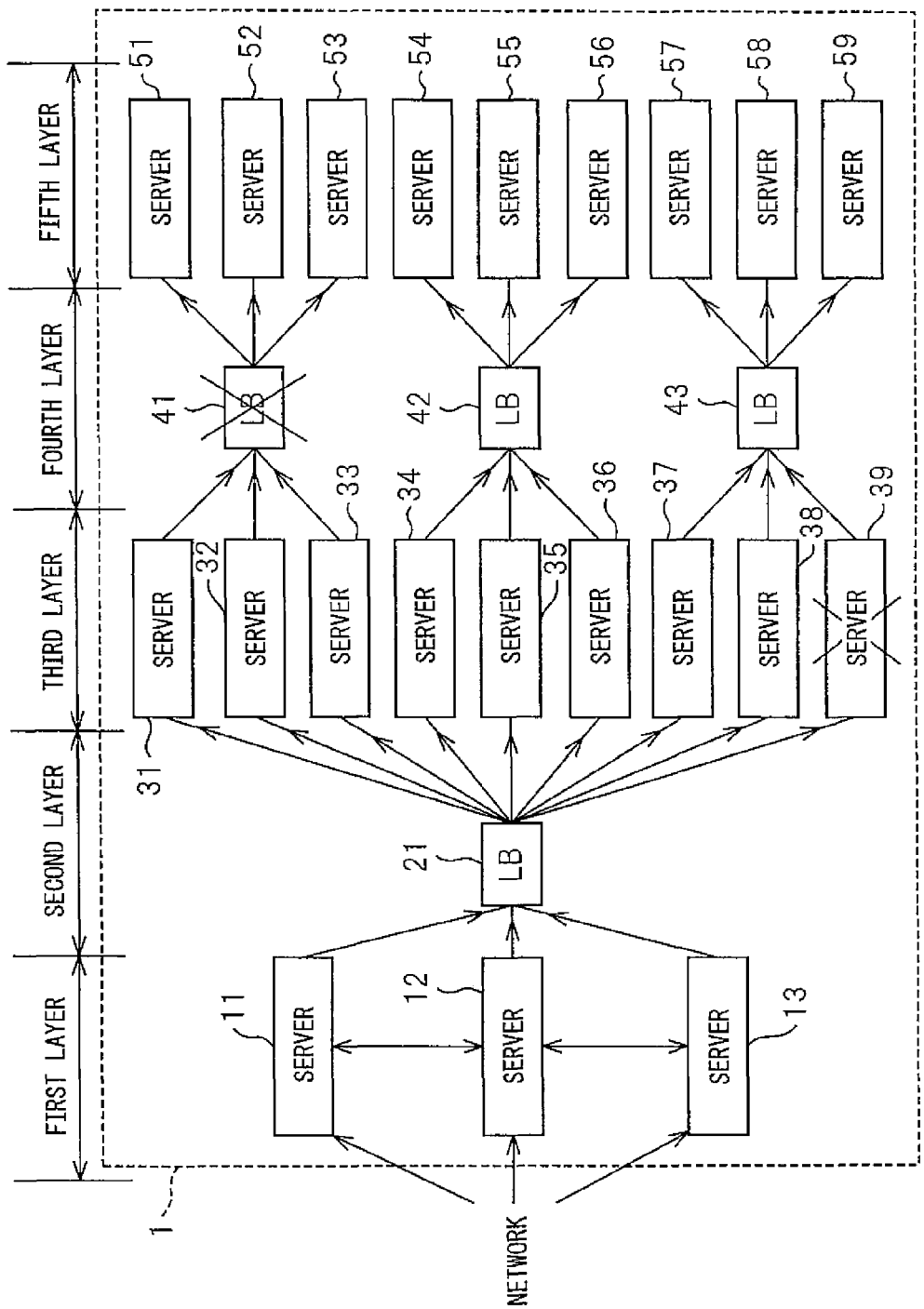

FIG. 34

INFORMATION ELEMENT ID

| | DATA NAME |
|---|---|
| | REQUEST TYPE |
| | INFORMATION ELEMENT ID BIT MAP INFORMATION |
| 1 | LAYER NO. |
| 2 | DEVICE NO. |
| 3 | IP ADDRESS |
| 4 | NUMBER OF DEVICES IN SAME LAYER |
| 5 | DEVICE STATE |
| 6 | ROUTE STATE FROM HIGHER-LAYER DEVICES |
| 7 | LOAD BALANCING TYPE |
| 8 | LOAD BALANCING MANNER (EXISTING) |
| 9 | LOAD BALANCING MANNER SWITCHING FLAG |
| 10 | LOAD BALANCING MANNER SWITCHING |
| 11 | NUMBER OF PROCESSES ACCEPTED |
| 12 | NUMBER OF PROCESSED EXECUTED |
| 13 | IP CONNECTION IN ESTABLISHED STATE |
| 14 | NUMBER OF IP CONNECTIONS IN USE |
| 15 | NUMBER OF RESIDUAL IP CONNECTIONS |
| 16 | COUNT HOLDING TIME USED FOR SWITCHING TO Least Connection |
| 17 | COUNT USED FOR SWITCHING TO Least Connection |
| 18 | THRESHOLD OF COUNT USED FOR SWITCHING TO Least Connection |
| 19 | CPU UTILIZATION RATE |
| 20 | CPU UTILIZATION RATE THRESHOLD |
| 21 | MEMORY UTILIZATION RATE |
| 22 | MEMORY UTILIZATION RATE THRESHOLD |
| 23 | PROCESS UTILIZATION RATE |
| 24 | PROCESS UTILIZATION RATE THRESHOLD |
| 25 | RESOURCE UTILIZATION AMOUNT |
| 26 | RESOURCE UTILIZATION AMOUNT THRESHOLD VALUE |
| 27 | COUNT HOLDING TIME USED FOR SWITCHING TO WEIGHTING METHOD |
| 28 | COUNT USED FOR SWITCHING TO WEIGHTING METHOD |
| 29 | THRESHOLD OF COUNT USED FOR SWITCHING TO WEIGHTING METHOD |
| 30 | CLIENT IP ADDRESS CONNECTED TO TARGET DEVICE |
| 31 | IP ADDRESS OF LOAD DISTRIBUTEE SERVER CONNECTED TO CLIENT |
| 32 | NOTIFIED INFORMATION |
| 33 | LAYER NO. OF NEXT LOWER LAYER |
| 34 | NUMBER OF DEVICES IN NEXT LOWER LAYER |
| 35 | DEVICE NO. IN NEXT LOWER LAYER |
| 36 | LOAD BALANCING MANNER FOR NEXT LOWER LAYER |
| 37 | IP ADDRESS OF DEVICES IN NEXT LOWER LAYER |
| 38 | LOAD BALANCING TYPE OF NEXT LOWER LAYER |
| 39 | DEVICE STATE IN NEXT LOWER LAYER |
| 40 | ROUTE STATE OF NEXT LOWER LAYER |

FIG. 37

INFORMATION ELEMENT ID

| | DATA NAME |
|---|---|
| | REQUEST TYPE |
| | INFORMATION ELEMENT ID BIT MAP INFORMATION |
| 1 | LAYER NO. |
| 2 | DEVICE NO. |
| 3 | IP ADDRESS |
| 4 | NUMBER OF DEVICES IN SAME LAYER |
| 5 | DEVICE STATE |
| 6 | ROUTE STATE FROM HIGHER-LAYER DEVICES |
| 7 | LOAD BALANCING TYPE |
| 8 | LOAD BALANCING MANNER (EXISTING) |
| 9 | LOAD BALANCING MANNER SWITCHING FLAG |
| 10 | LOAD BALANCING MANNER SWITCHING |
| 11 | NUMBER OF PROCESSES ACCEPTED |
| 12 | NUMBER OF PROCESSED EXECUTED |
| 13 | IP CONNECTION IN ESTABLISHED STATE |
| 14 | NUMBER OF IP CONNECTIONS IN USE |
| 15 | NUMBER OF RESIDUAL IP CONNECTIONS |
| 16 | COUNT HOLDING TIME USED FOR SWITCHING TO Least Connection |
| 17 | COUNT USED FOR SWITCHING TO Least Connection |
| 18 | THRESHOLD OF COUNT USED FOR SWITCHING TO Least Connection |
| 19 | CPU UTILIZATION RATE |
| 20 | CPU UTILIZATION RATE THRESHOLD |
| 21 | MEMORY UTILIZATION RATE |
| 22 | MEMORY UTILIZATION RATE THRESHOLD |
| 23 | PROCESS UTILIZATION RATE |
| 24 | PROCESS UTILIZATION RATE THRESHOLD |
| 25 | RESOURCE UTILIZATION AMOUNT |
| 26 | RESOURCE UTILIZATION AMOUNT THRESHOLD VALUE |
| 27 | COUNT HOLDING TIME USED FOR SWITCHING TO WEIGHTING METHOD |
| 28 | COUNT USED FOR SWITCHING TO WEIGHTING METHOD |
| 29 | THRESHOLD OF COUNT USED FOR SWITCHING TO WEIGHTING METHOD |
| 30 | CLIENT IP ADDRESS CONNECTED TO TARGET DEVICE |
| 31 | IP ADDRESS OF LOAD DISTRIBUTEE SERVER CONNECTED TO CLIENT |
| 32 | NOTIFIED INFORMATION |
| 33 | LAYER NO. OF NEXT LOWER LAYER |
| 34 | NUMBER OF DEVICES IN NEXT LOWER LAYER |
| 35 | DEVICE NO. IN NEXT LOWER LAYER |
| 36 | LOAD BALANCING MANNER FOR NEXT LOWER LAYER |
| 37 | IP ADDRESS OF DEVICES IN NEXT LOWER LAYER |
| 38 | LOAD BALANCING TYPE OF NEXT LOWER LAYER |
| 39 | DEVICE STATE IN NEXT LOWER LAYER |
| 40 | ROUTE STATE OF NEXT LOWER LAYER |

LOAD BALANCING SYSTEM

CROSS REFERENCE TO RELATED APPLICATION

The present application is a continuation application based on International application No. PCT/JP2007/57582, filed on Apr. 4, 2007.

TECHNICAL FIELD

The embodiments discussed herein are related to a load balancing system for processing, by distributing to a plurality of servers, the processing requests received from a client device.

BACKGROUND ART

In the load balancing system, a large amount of processing requests issued from client devices can be processed at high speed by being distributed among a plurality of servers. In recent years, a load balancing system having a hierarchical structure with a plurality of servers connected hierarchically has been used for the purpose of preventing the reduction in communication speed. FIG. 1 is a diagram schematically depicting a configuration of a load balancing system having the hierarchical structure with the servers connected hierarchically.

The hierarchical load balancing system 1, which can be illustrated as a network with nodes 111 to 113, 121, 131 to 139, 141 to 143 and 151 to 159 connected in hierarchy. The load balancing system 1 includes various devices such as servers having the functions of processing, distributing and transferring the processing requests, or firewalls, as the above nodes 111 to 113, 121, 131 to 139, 141 to 143 and 151 to 159. The node units 111 to 113 in the highest layer called the front end, upon reception of processing requests from client devices (hereinafter referred to simply as "the clients") C1 and C2 through a network N, transfer these processing requests sequentially from the nodes in the high layers to the nodes in low layers. While proceeding to the tail end, the load balancing nodes 121 and 141 to 143 distribute the processing requests among a plurality of nodes so that the load on each node is reduced by distribution.

Incidentally, each of the load balancing nodes 121 and 141 to 143 may be a load balancer, a load balancing application program or a load balancing middleware executed on and causing these servers to execute the load balancing process. Also, the node units 111 to 113 in the highest layer are not limited to the server units but may be any of various devices such as the load balancers, the firewall devices or the load balancers having the firewall function. As described above, the hierarchical load balancing system 1 can be implemented with various configurations. In this specification, an example of a specified configuration is used solely for the convenience of illustration. The embodiment, however, is not limited to this specified configuration, but is applicable also to any hierarchical load balancing system having various configurations.

FIG. 2 is a diagram depicting an example of the configuration of the conventional hierarchical load balancing system. In this load balancing system 1, the servers 11 to 13 in the highest layer (first layer) accept the processing requests given by the clients C1 and C2, and these processing requests are transmitted to a load balancer (LB) 21 arranged in the next lower layer (second layer). In the load balancer 21, each processing request received from the servers 11 to 13 is distributively transmitted to the servers 31 to 39 arranged in the next lower layer (third layer) in accordance with the manner corresponding to the situation of the various load balancing manners. The load balancing manners in general use include, in addition to the least connection and the round robin, a method for determining the distributee according to the value of the hash function of the address of the transmittee or the transmitter of the processing request (referred to as "the hash method" hereinafter in this specification), a method for determining the distributes in accordance with the HTTP header of the processing request (referred to as "the HTTP header method" hereinafter in this specification) and a weighting method.

The servers 31 to 33 arranged in the third layer transmit the processing requests received from the load balancer 21 to the load balancer 41 arranged in the next lower layer (fourth layer). In similar fashion, the servers 34 to 36 transmit the processing requests received from the load balancer 21 to the load balancer 42. Also, the servers 37 to 39 transmit the processing requests received from the load balancer 21 to the load balancer 43. The load balancer 41 arranged in the fourth layer distributes the processing requests received from the servers 31 to 33 to the servers 51 to 53 in the lowest layer (fifth layer) in accordance with a manner corresponding to the prevailing situation, of all the various load balancing manners. In similar fashion, the load balancer 42 distributes the processing requests received from the servers 34 to 36 to the servers 54 to 56, and the load balancer 43 distributes the processing requests received from the servers 37 to 39 to the servers 57 to 59.

Patent Document 1: Japanese Unexamined Patent Publication No. 2003-196178

SUMMARY

In the conventional hierarchical load balancing system 1, each server or each load balancer transmits the processing request by monitoring the device state only in the next lower layer connected thereto, and thus transmits the processing request regardless of the state of the devices in lower layers than the layer where the server or load balancer is located by two or more layers. As a result, as indicated in FIG. 3, for example, even in a case where a fault occurs in the load balancer 41 midway of the hierarchy, the load balancer 21 two layers higher than the load balancer 41 transmits the processing requests to the servers 31 to 33 arranged in layers higher than the load balancer 41 regardless of this situation. As a result, these processing requests become wasteful on the one hand and the requests are transmitted repeatedly from the servers 31 to 33 to the load balancer 41, thereby causing a process delay.

Also, once a fault occurs in any device midway of the hierarchy (the servers 34 an 35 in the illustrated example), an imbalance of the load is caused between the servers (the servers 54 to 56 in the illustrated case) connected downstream thereof and the other servers (the servers 57 to 59 in the illustrated case).

According to a first embodiment, there is provided a load balancing system having a hierarchical structure in which each layer includes one or more nodes and the processing requests are sequentially transmitted from the higher-layer nodes to the lower-layer nodes, and in which any of these nodes acts as a load balancing unit thereby to distribute the processing requests to the nodes at the tail end. In this load balancing system, a master node as one of the nodes comprises a load balancing information receiving unit which receives predetermined load balancing information held in a first node other than the master node from the first node or other node in a layer higher than that of the first node, and a load balancing information storage unit which collectively stores the load balancing information for all the nodes included in the hierarchical structure.

According to a second embodiment, there is provided a node device operating as a master node in the load balancing system according to the first embodiment. This node device includes a load balancing information receiving unit which receives predetermined load balancing information held in the first node other than the master node from the first node or the second node in a higher layer than that of the first node and a load balancing information storage unit which collectively stores the load balancing information for all the nodes included in the hierarchical structure.

According to a third embodiment, there is provided a load balancer operating as a load balancing unit in the load balancing system in the first embodiment. This load balancer includes an advisability notice receiving unit which receives an advisability notice from the master node and a load distributing unit which distributes the processing request in accordance with the received advisability notice.

According to a fourth embodiment, there is provided a computer-readable storage medium storing a load balancing control program for a load balancing system having a hierarchical structure in which each layer includes one or more nodes and the processing requests are sequentially transmitted from the higher-layer nodes to the lower-layer nodes and in which any one of the nodes acts as a load balancing unit thereby to distribute the processing requests to the nodes at the tail end, the load balancing control program being executed by a processor on a master node as one of these nodes. This load balancing control program causes the master node to execute the process of receiving the predetermined load balancing information held in a first node other than the master node from the first node or a second node in a higher layer than that of the first node and the process of collectively storing, in a predetermined load balancing information storage unit arranged in the master node, the load balancing information for all the nodes included in the hierarchical structure.

According to a fifth embodiment, there is provided a computer-readable storage medium storing a load balancing program executed by a processor on any node acting as the load balancing unit in the load balancing system according to the first embodiment. This load balancing program causes any node to execute the process of receiving an advisability notice from the master node and the process of distributing the processing request in accordance with the advisability notice received.

According to a sixth embodiment, there is provided a load balancing method for a load balancing system having a hierarchical structure in which each layer includes at least one node and the processing requests are sequentially transmitted from the higher-layer nodes to the lower-layer nodes and in which any one of the nodes acts as a load balancing unit thereby to distribute the processing requests to the nodes at the tail end. According to this load balancing method, the master node as one of the nodes receives the predetermined load balancing information held in a first node other than the master node from the first node or a second node in a higher layer than that of the first node, and the load balancing information for all the nodes included in the hierarchical structure are collectively stored in a load balancing information storage unit included in the master node.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 8 is a diagram depicting an example of the data structure of the load balancing information for each device.

FIG. 9 is a diagram depicting an example of the data structure of the load balancing information stored in a server arranged in the highest layer.

FIG. 10 is a diagram (No. 1) depicting an example of the data structure of the load balancing information stored in a device arranged in the intermediate layer.

FIG. 11 is a diagram (No. 2) depicting an example of the data structure of the load balancing information stored in a device arranged in the intermediate layer.

FIG. 15 is a diagram depicting an example of the data structure of a load balancing information extraction request.

FIG. 16 is a diagram depicting an example of the data structure for a load balancing information reply in response to the load balancing information extraction request depicted in FIG. 15.

FIG. 30 is a diagram depicting an example of the data structure of the load balancing information correction request.

FIG. 31 is a diagram depicting the state in which a fault occurs in the hierarchical load balancing system depicted in FIG. 4.

FIG. 34 is a diagram depicting an example of the data structure of a fault notice.

FIG. 37 is a diagram depicting an example of the data structure of the restoration notice.

DESCRIPTION OF EMBODIMENTS

Figure 1:
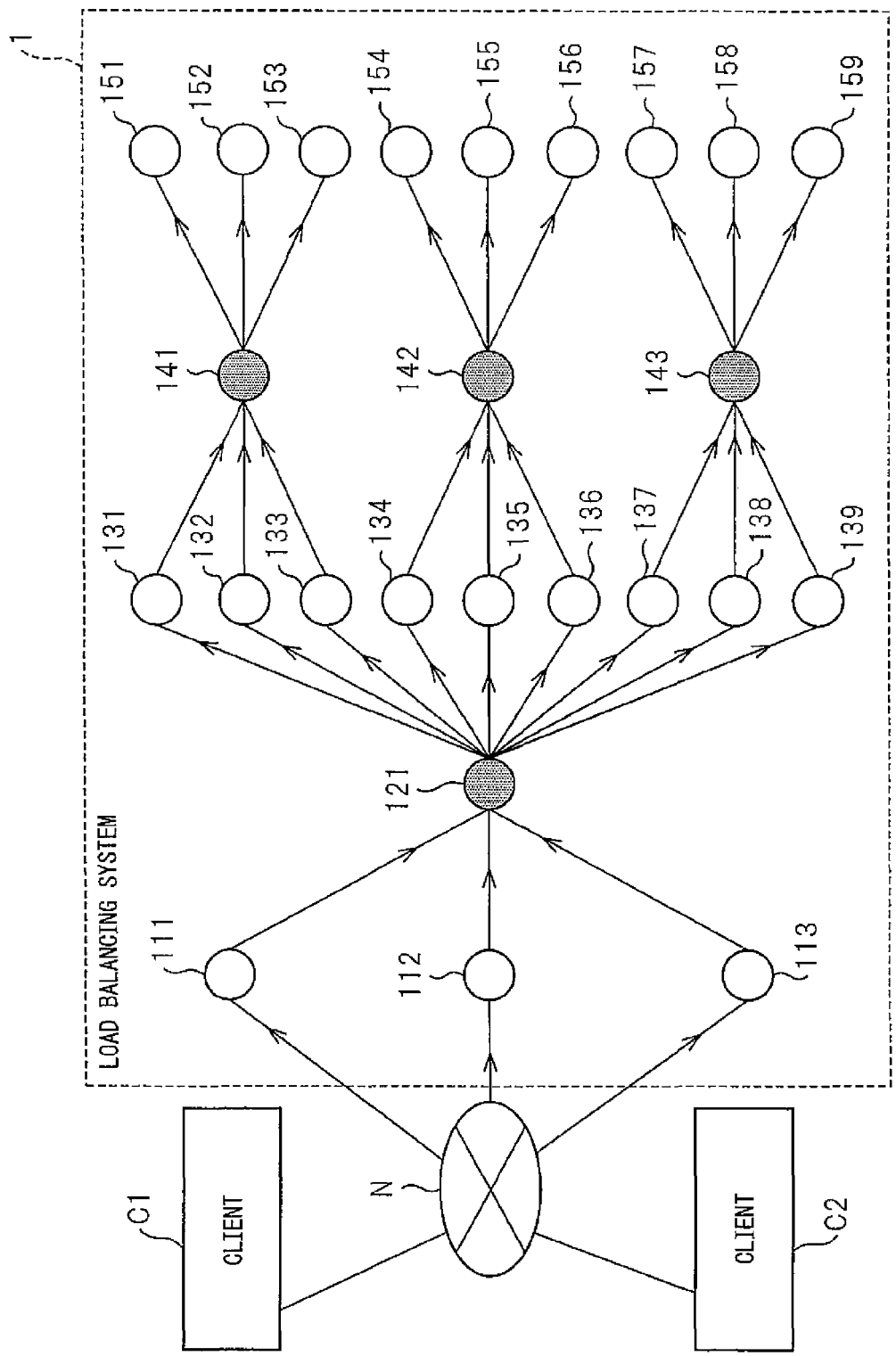
FIG. 1 is a schematic diagram depicting a configuration of a load balancing system having a hierarchical structure with hierarchically connected nodes.
Figure 2:
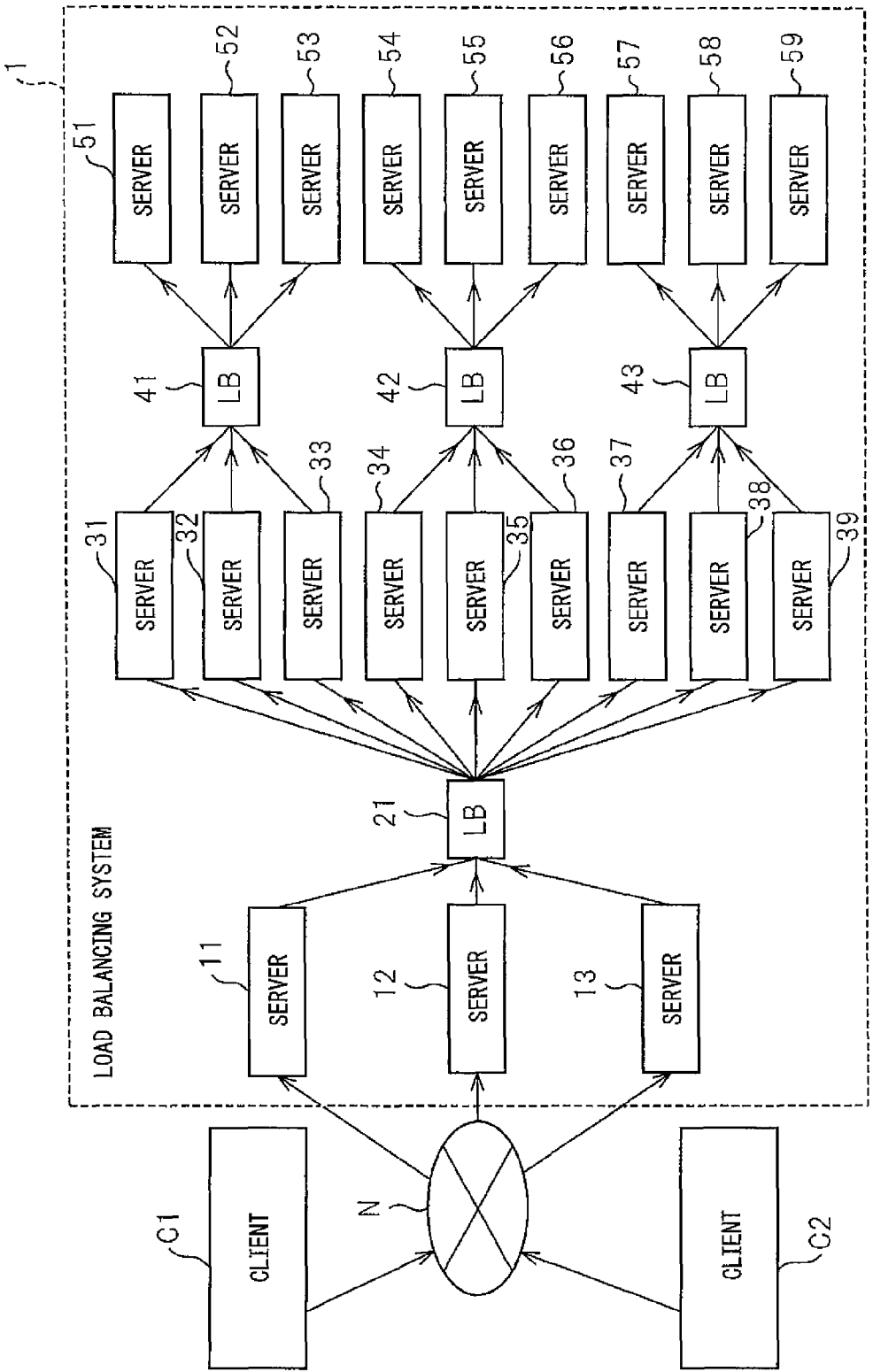
FIG. 2 is a diagram depicting an example of the configuration of the conventional hierarchical load balancing system.
Figure 3:
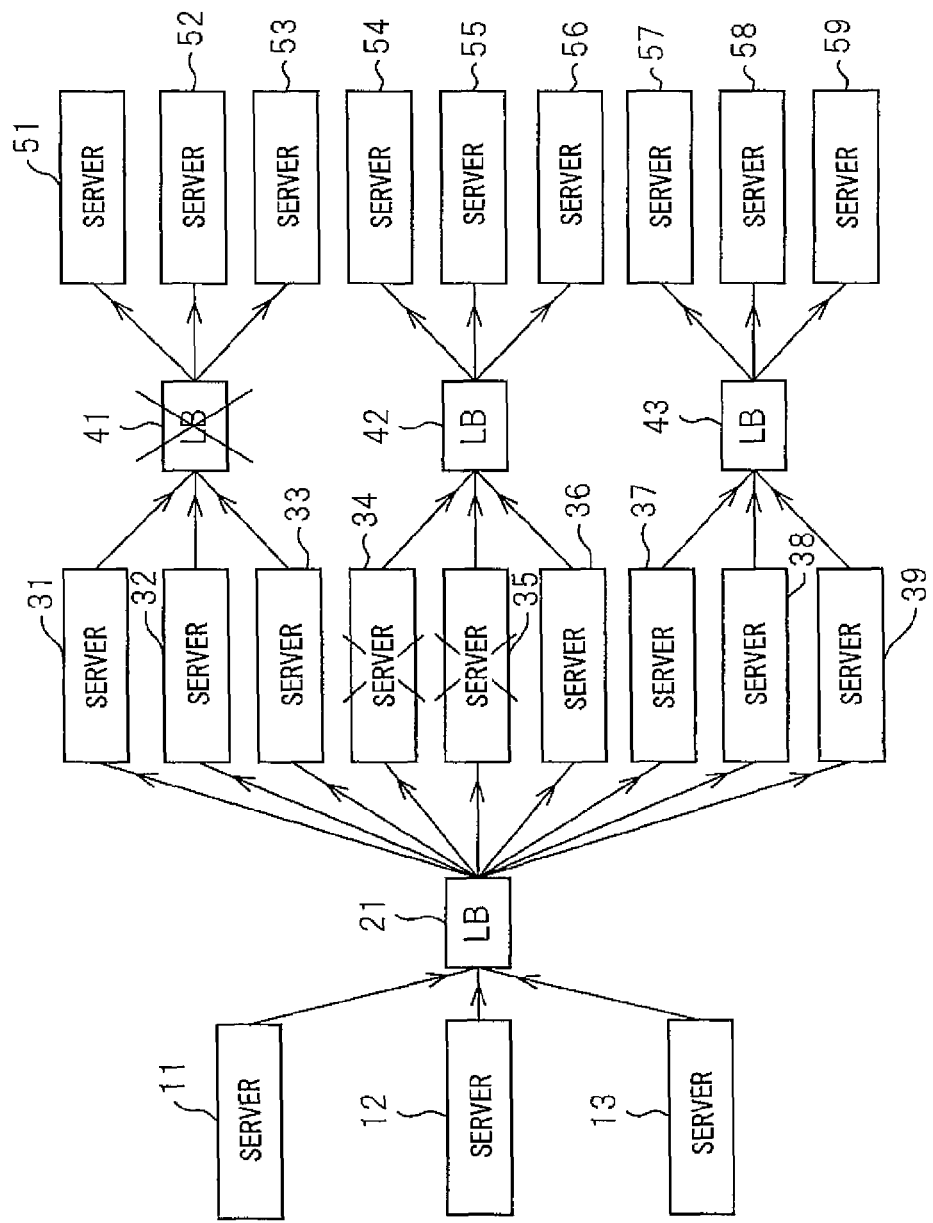
FIG. 3 is a diagram for illustrating the fault state of the hierarchical load balancing system depicted in FIG. 1.
Figure 4:
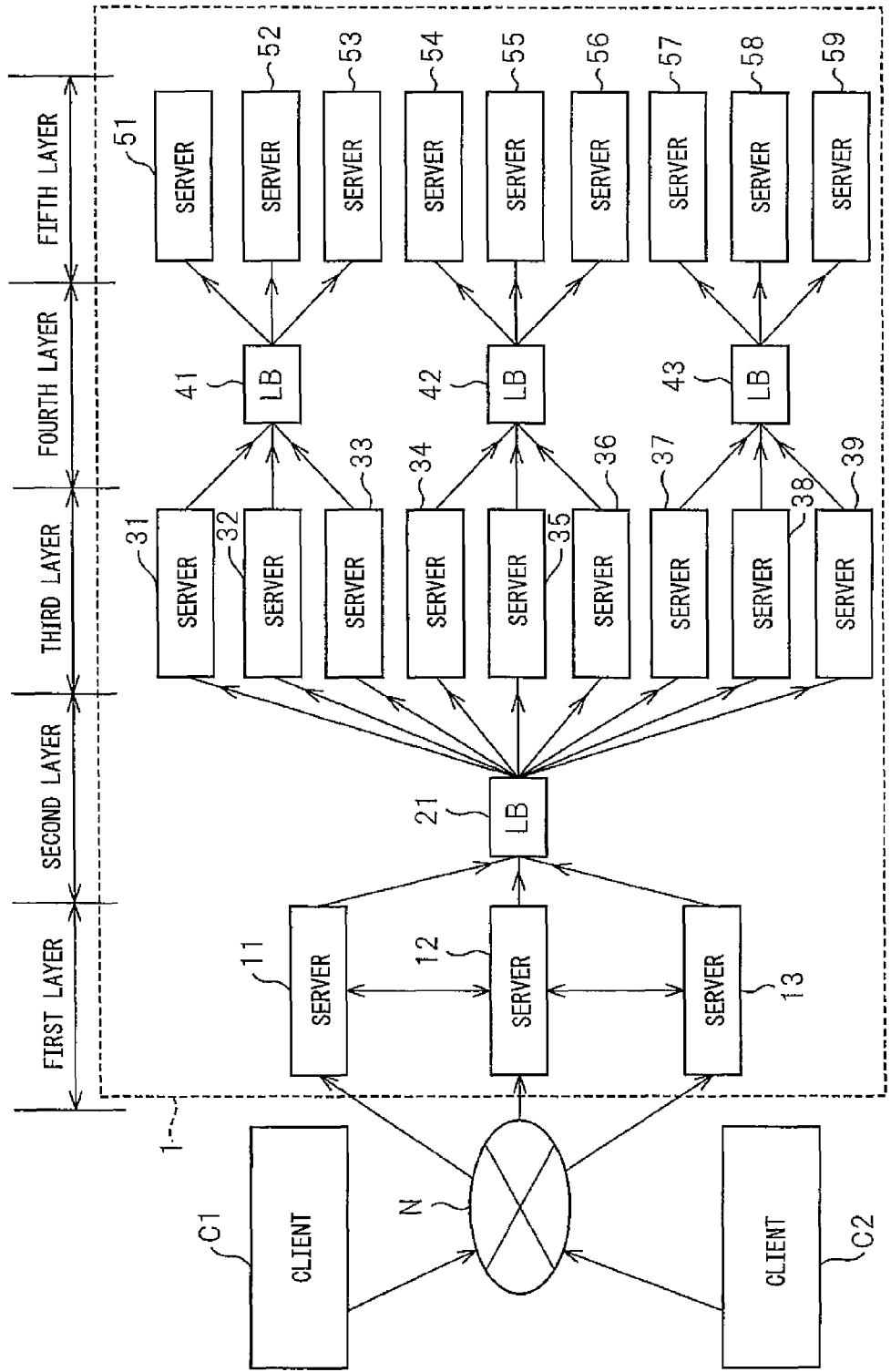
FIG. 4 is a diagram depicting a configuration of the hierarchical load balancing system according to the first embodiment.
Figure 5:
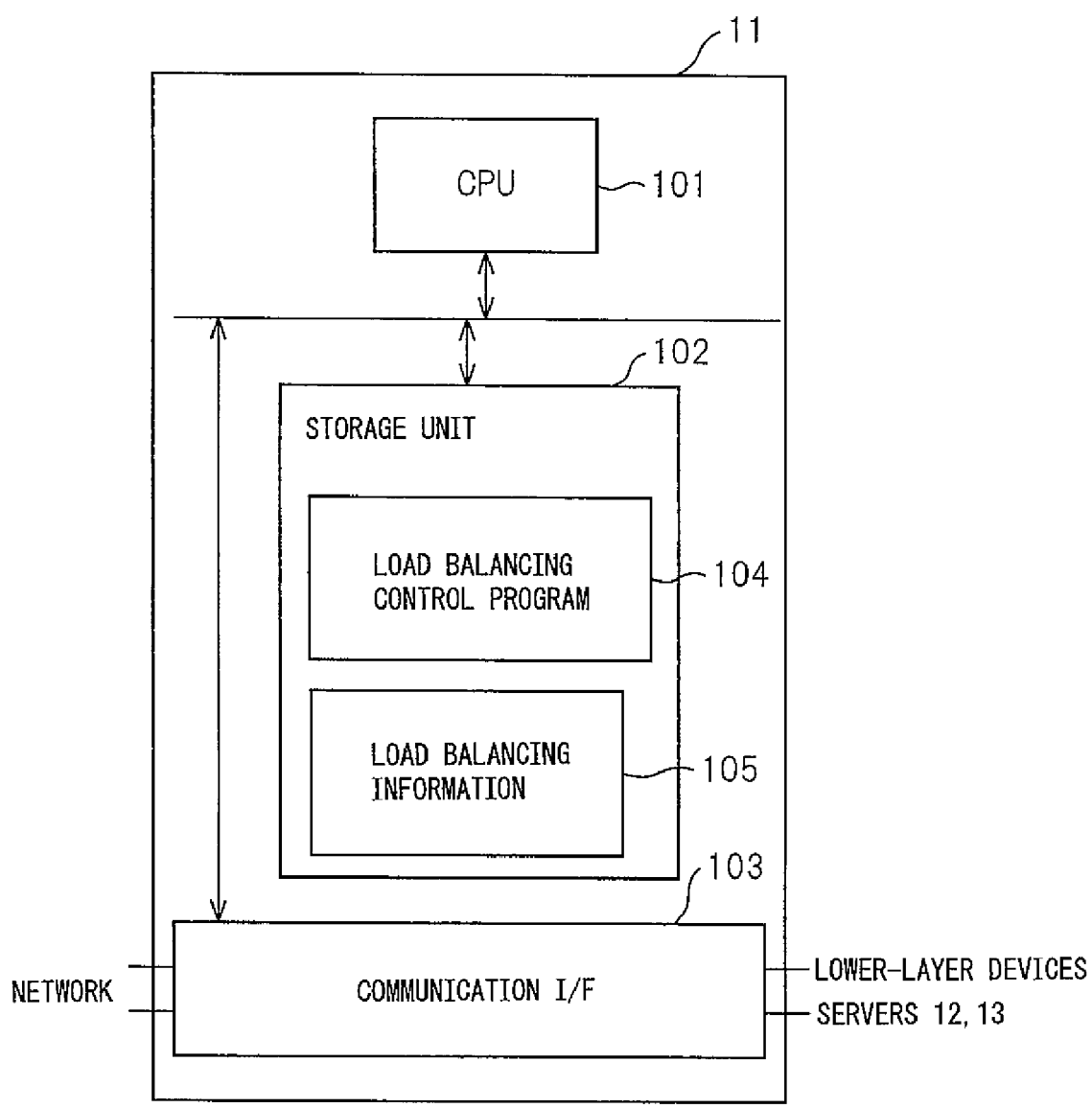
FIG. 5 is a diagram depicting a configuration of a server arranged in the highest layer in the hierarchical load balancing system depicted in FIG. 4.

Embodiments are illustrated below with reference to the accompanying drawings. FIG. 4 is a diagram depicting a configuration of a hierarchical load balancing system according to a first embodiment. The configuration of the hierarchical load balancing system 1 is similar to that of the load balancing system illustrated with reference to FIG. 2. Thus, the same component elements are designated by the same reference numerals, respectively, and not described again. Further, in the description that follows, the hierarchical load balancing system may be referred to simply as "the load balancing system". FIG. 5 is a diagram depicting the configuration of the server 11, among the servers 11 to 13, arranged in the highest layer (first layer) in the load balancing system 1 depicted in FIG. 4. The configuration of the servers 12 and 13 is also similar to that of the server 11.

The server 11 includes a CPU 101, a storage unit 102 for storing the program executed by the CPU 101 and the data necessary for the process executed by the CPU 101, and a communication interface 103 for the server 11 to conduct communication with the network N and other devices (specifically, the servers 12, 13, 31 to 39, 51 to 59 and the load balancers 21, 41 to 43) in the load balancing system 1. The server 11 receives, from the network N through the communication interface 103, the processing requests issued from the clients C1 and C2 and transmits it to the lower-layer devices through the communication interface 103.

The storage unit 102 has stored therein a load balancing control program 104 for controlling the load balancing process executed by the load balancers 21, 41 to 43 and the transmission path of the processing requests in the load balancing system 1, and load balancing information 105 indicating the operating condition of each device in the load balancing system 1. The operation of the load balancing control program 104 and the load balancing information 105 are described later.

Figure 6:
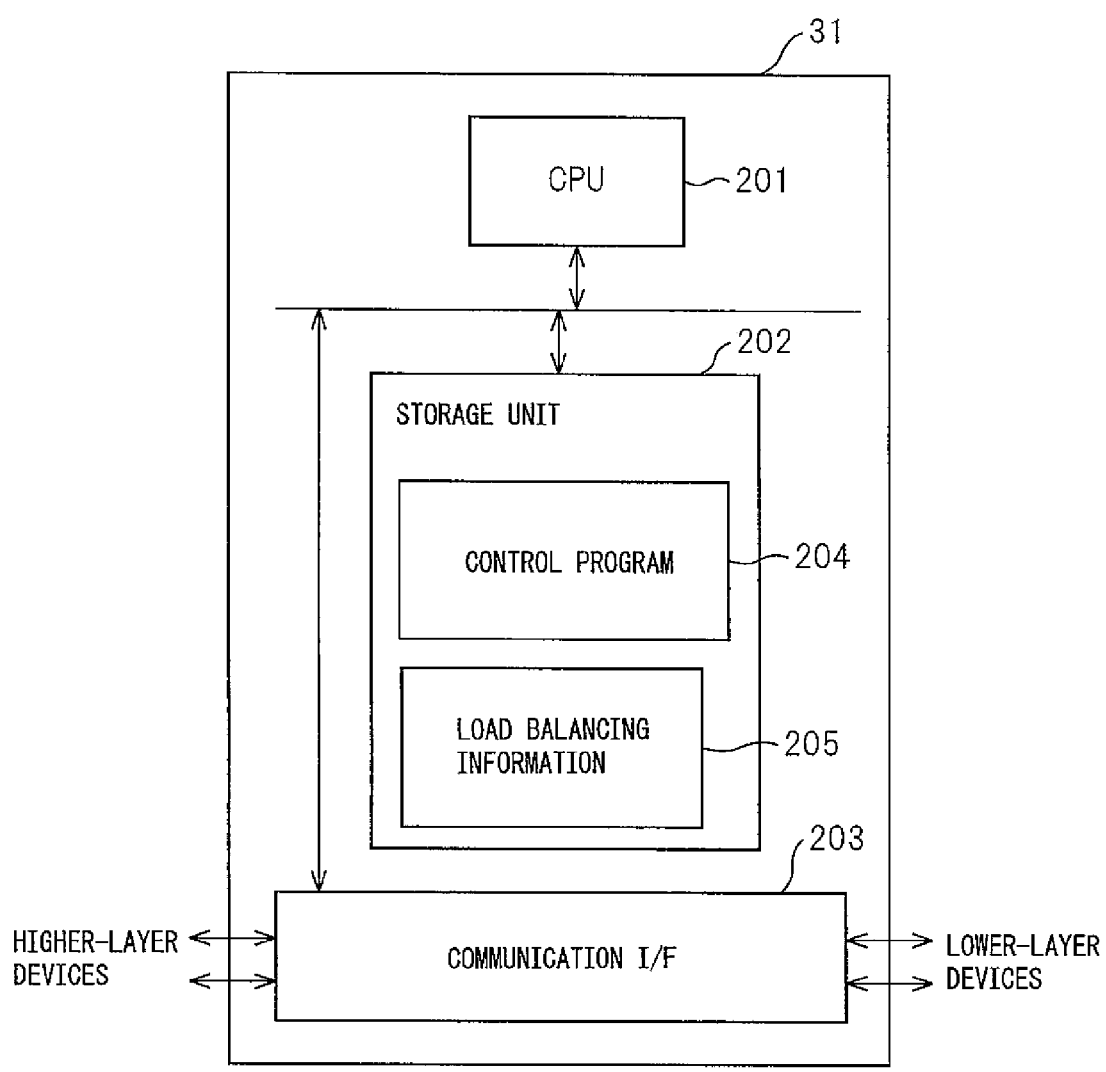
FIG. 6 is a diagram depicting a configuration of the server arranged in the intermediate layer or the low layer in the hierarchical load balancing system depicted in FIG. 4.

FIG. 6 is a diagram depicting the configuration of the server 31 arranged in the intermediate layer depicted in FIG. 4. The servers 32 to 39 and 51 to 59 have a similar configuration to the server 31. The server 31 includes a CPU 201, a storage unit 202 for storing the program executed by the CPU

201 and the data necessary for the process executed by the CPU 201 and a communication interface 203 for conducting communication with other devices such as the higher-layer device (specifically, the load balancer 21) and the lower-layer device (specifically, the load balancer 41) connected with the server 31 in the load balancing system 1.

The server 31 receives, through the communication interface 203, the processing requests transmitted from the load balancer 21, and transmits the processing requests to the lower-layer load balancer 41 through the communication interface 203. The storage unit 202 has stored therein a control program 204 for causing the server 31 to transmit the received processing request to the lower layers and the load balancing information 205 described later. The tail end of the load balancing system 1, i.e. the servers 51 to 59 arranged in the lowest layer (fifth layer), however, have no lower-layer device and process the received processing requests by themselves.

Figure 7:
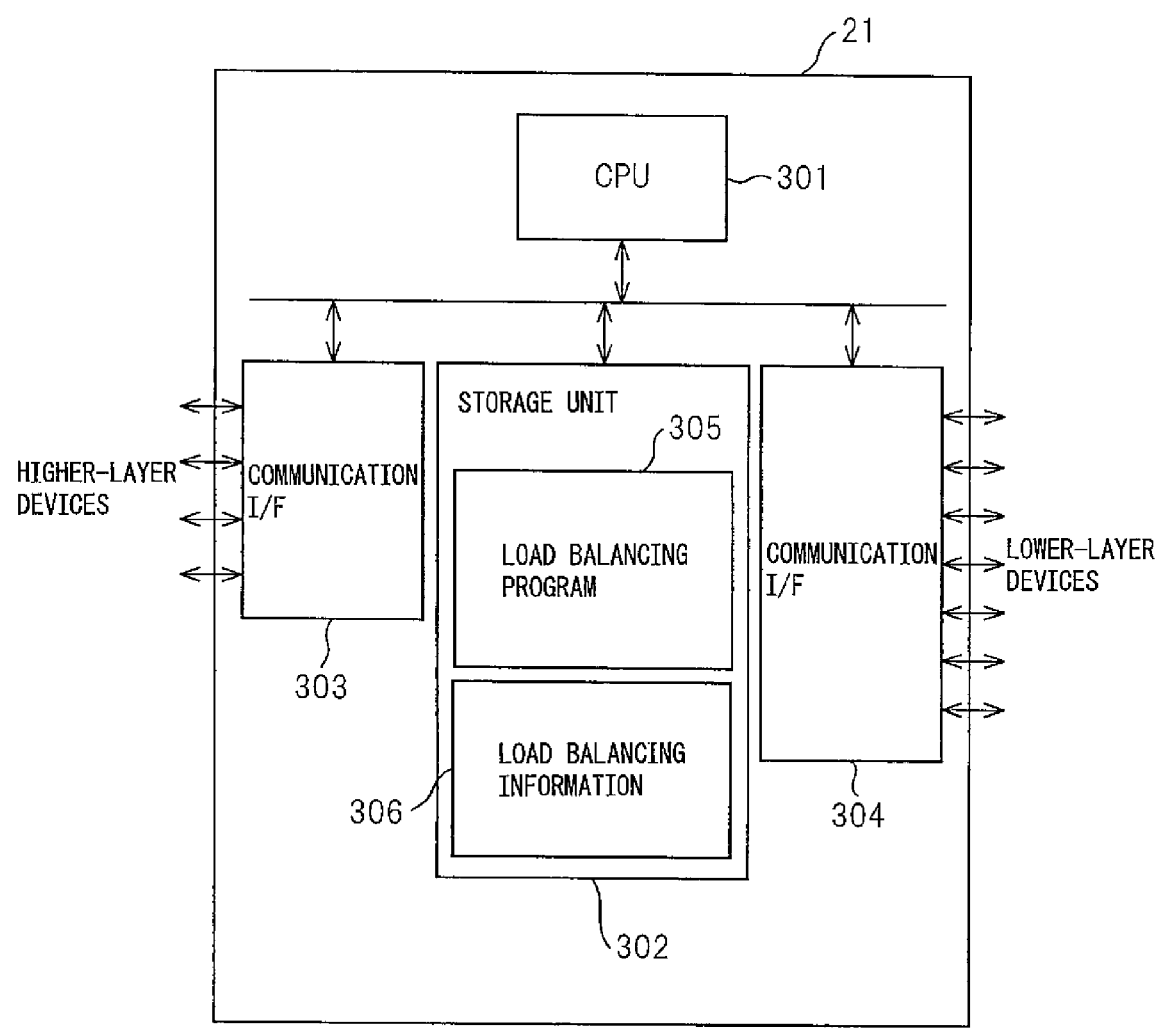
FIG. 7 is a diagram depicting a configuration of the load balancer of the hierarchical load balancing system depicted in FIG. 4.

FIG. 7 is a diagram depicting the configuration of the load balancer 21 in the load balancing system 1 depicted in FIG. 4. The configuration of the load balancers 41 to 43 is similar to that of the load balancer 21. The load balancer 21 includes a CPU 301, a storage unit 302 for storing the program executed by the CPU 301 and the data necessary for the process executed by the CPU 301, a communication interface 303 for conducting communication with other devices such as the higher-layer devices (specifically, the servers 11 to 13) connected with the load balancer 21 in the load balancing system 1 and a communication interface 304 for conducting communication with the lower-layer devices (specifically, the servers 31 to 39).

The storage unit 302 has stored therein a load balancing program 305 for causing the CPU 301 to execute the load balancing process whereby the processing requests received through the communication interface 303 are distributed to the lower-layer servers 31 to 39 connected to the load balancer 21, and the load balancing information 306 described later. The load balancer 21 receives the processing requests from the servers 11 to 13 through the communication interface 303, determines any of the lower-layer servers 31 to 39 as a distributee of the received processing requests, and transmits the processing requests to any of the servers 31 to 39 through the communication interface 304. In the following description of the load balancing system 1 according to the first embodiment, the servers 31 to 39, 51 to 59 and the load balancers 21, 41 to 43 may be collectively referred to as "the lower-layer devices".

The load balancing information referred to above is illustrated below. The load balancing information is the information indicating, for each device of the load balancing system 1, the load balancing manner used for the target device, the load status of the target device and the presence or absence of a valid path leading from the highest layer to the target device. In the case where the target device is the one to which the process requests are distributed from the load balancers such as the servers 31 to 39, 51 to 59, for example, the load balancing information contains the information indicating the number of the processes accepted and the number of the processes executed by the target device, the connection status and the load condition of the node as the target device and the load balancing manner used for the target device.

In the case where the target device is any of the load balancers 21, 41 to 43, on the other hand, the load balancing information contains the information indicating the load balancing manner carried out by the load balancer.

The load balancing information is stored in the storage unit 102 of the servers 11 to 13, the storage unit 202 of the servers 31 to 39 and the storage unit 302 of the load balancers 21, 41 to 43. The value of each of the load balancing information is initialized in accordance with the configuration of the load balancing system 1 or in the case where the value is changed by the previous operation of the load balancing system 1, the changed value is held. FIG. 8 depicts an example of the data structure of the load balancing information for each device. The load balancing information has the data structure depicted in FIG. 8 for each device. In the description that follows, given load balancing information having the data structure depicted in FIG. 8 and indicating the state of a given device X is referred to as "the load balancing information for the device X".

Each data contained in the load balancing information is assigned the identification number for each type of data. This identification number is indicated as "the information element ID" in FIG. 8. In the description that follows, "the information element ID" is indicated simply as "the ID". The data of ID="1" indicates the layer number in which the target device is arranged. In the case of the load balancing information for the server 1, for example, the data has the value "1", while in the case of the load balancing information for the load balancer 41, the data has the value "4". The data of ID="2" indicates the sequence number for each layer assigned to the target device in the load balancing system 1. Also, the data of ID="3" indicates the IP address assigned to the target device. The data of ID="4" indicates the total number of the devices in the same layer.

The data of ID="5" indicates the state of the target device or, in the case where the operation is normal, has a value indicating "normal" and a value indicating a "fault" in the case where the target device is in fault. Even in the case where the target device is normal, this data has a value indicating "invalid" in the absence of a valid path for transmitting the processing request from the target device to the tail end servers due to a fault of the lower-layer devices or in the absence of a valid path for transmitting the processing request to the target device from the highest-layer servers 11 to 13. Further, in order to indicate that the operation is neither normal nor faulty, the data may have the value such as "in starting operation" indicating that the target device is being started or the value "IP connection not established" indicating that the IP connection with other devices cannot be established as yet. If the target device is the one for executing the load balancing process, this date may has the value "load balancing normal", in place of "normal", indicating that the load balancing is being carried out normally, or the value "load balancing abnormal", in place of "faulty", indicating that the load balancing is not being carried out normally.

The data of ID="6" indicates the presence or absence of a valid path for transmitting the processing request to the target device from the highest-layer servers 11 to 13, and in the presence or absence of such valid path, the data has the value "valid" or "invalid", respectively. The data of ID="7" indicates the type of the means for the target device to carry out the load balancing. In the configuration example depicted in FIG. 4, for example, the load balancers 21, 41 to 43 carry out the load balancing process. As described later, however, the load balancing system 1 may be configured in such a manner that the load balancing process is executed according to the load balancing application program or the load balancing middleware.

The data of ID="8" indicates the type of the load balancing manner carried out by a device upstream of the target device. The types of the load balancing manner include the round robin, the least connection and the weighting method (hereinafter sometimes collectively referred to as "the round robin, etc."), the hash method and the HTTP header method in which the distributee of the processing request is uniquely specified (hereinafter sometimes collectively referred to as "the hash method, etc."). Also, the data of ID="8" has a value indicating "not involved" in the case where the load is not balanced for the target device. The server 31 upstream of the load balancer 41, for example, transmits all the processing requests to the load balancer 41 without executing the load balancing process. In the load balancing information for this load balancer 41, therefore, the data of ID="8" has a value indicating "not involved".

Also, in the case where the hash method, etc. is used, the distributee of the processing request may have a redundant configuration. Specifically, a plurality of devices may be specified as distributees by the hash method, etc. in response to a given processing request, and then the processing request may be distributed among these devices by the round robin. In such a case, the data indicates the combination of two types of load balancing manners as the type of the load balancing manner.

In the case where the processing request is first distributed by the hash method, followed by the distribution of the processing request using the round robin among a plurality of devices specified as distributees, for example, the data of ID="8" has the value "hash-round robin" indicating that the hash method and the round robin are combined with each other. Similarly, in the case where the processing request is distributed by the hash method, followed by the processing request distribution using the least connection method or the weighting method among a plurality of devices specified as distributees, then the data of ID="8" has the value of the "hash-least connection method" or the "hash-weighting method", respectively. Also, in the case where the processing request is distributed by the HTTP header method, followed by the processing request distribution using the round robin, the least connection method or the weighting method among a plurality of devices specified as distributees, then the data of ID="8" has the value of the "HTTP header-round robin", the "HTTP header-least connection method" or the "HTTP header-weighting method", respectively.

The data of ID="9" and "10" are described later. The data of ID="11" ("number of processes accepted") indicates the number of the processing requests accepted by the target device. The data of ID="12" ("number of processes executed") indicates the number of those processing requests accepted by the target device which have been completely transmitted to a lower layer. In the case where the target device is a server in the lowest layer (any of the servers 51 to 59 in this configuration example), however, the data ID="12" indicates the number of the processes completely processed by the particular server. The data of ID="13" indicates whether the IP connection is established or not between the target device and other devices in the load balancing system 1, and has the value of "IP connection established" or "IP connection not established" in the case where the IP connection is established or not established, respectively. The data of ID="14" indicates the number of the IP connections currently used by the target device, and the data of ID="15" the number of usable IP connections remaining in the target device.

The data area of ID="16" to "18" is used by the highest-layer servers 11 to 13 in the case where the load balancing manner for the load balancing process executed by the load balancer is changed from the round robin to the least connection. In the load balancing system 1, as long as the load condition of the servers 31 to 39 and the servers 51 to 59 meets a predetermined standard, the load balancing manner for the load balancing process executed by the higher-layer device which distributes the processing requests to each server is switched from the round robin to the least connection.

The load balancing manner change process described later with reference to FIGS. 20 and 21 judges whether the number of the processing requests accepted (ID=11) is larger or not than the number of the processes executed (ID=12) by a given server. The number of times the number of the processing requests accepted is judged to be larger than the number of the processing requests executed is counted, and in the case where this count in a predetermined holding time exceeds a predetermined threshold value, then the load balancing manner for distributing the processing requests to the given server is switched from the round robin to the least connection.

The number of times the number of the processing requests accepted is judged larger than the number of the processing requests executed is recorded in the data area of ID="17", and the period of time (holding time) to hold the count of the number of times recorded in the data area of ID="17" is recorded in the data area of ID="16". Upon lapse of this holding time, the load balancing manner change process judges whether the number of times the judgment recorded in the area of ID="17" has exceeded a predetermined threshold value recorded in the area of ID="18". Specifically, a threshold value to be compared with the number of times the judgment is made during the holding time recorded in the area of ID="16" and recorded in the area of ID="17" is recorded in the area of ID="18". After the number of times the judgment recorded in the area of ID="17" is compared with the threshold value recorded in the area of ID="18", the value in the area of ID="17" is reset.

The data of ID="19" indicates the CPU utilization rate of the target device, and the data of ID="20" provides the threshold of the value tolerable as the CPU utilization rate of the target device. The data of ID="21" indicates the memory utilization rate of the target device, and the data of ID="22" provides the threshold of the value tolerable as the memory utilization rate of the target device. The data of ID="23" indicates the process utilization rate of the target device, and the data of ID="24" provides the threshold of the value tolerable as the process utilization rate of the target device. The data of ID="25" indicates the resource amount used by the target device, and the data of ID="26" provides the threshold of the value tolerable as the resource amount used by the target device.

The data area of ID="27" to "29" is used by the highest-layer servers 11 to 13 for changing the load balancing manner from the round robin or the least connection to the weighting method in the load balancing process executed by the load balancer, In the load balancing system 1, as long as the load condition of the servers 31 to 39 and the servers 51 to 59 meets a predetermined standard, the load balancing manner used by the higher-layer devices distributing the processing requests to each serve is switched to the weighting method.

The load balancing manner change process described later with reference to FIGS. 20 and 21 counts the number of times the judgment is made that the number of the processes accepted is larger than the number of the processes executed in spite of the fact that the CPU utilization rate, the memory utilization rate, the process utilization rate and the number of the remaining resources of a given server are within a tolerable value, and in the case where this count exceeds a predetermined threshold value in a predetermined holding time, the load balancing manner for distributing the processing request to the given server is switched to the weighting method.

The number of times the judgment is made that the number of the processes accepted is larger than the number of the processes executed is recorded in the data area of ID="28", and the period of time (holding time) for which the count of the number of times recorded in the data area of ID="28" is to be held is recorded in the area of data of ID="27". The load balancing manner change process, upon lapse of this holding time, judges whether the number of times the judgment is made which is recorded in the area of ID="28" has exceeded the predetermined threshold value recorded in the area of the data D="29". Specifically, in the area of ID="29", the threshold value is recorded to be compared with the number of times the judgment is made which is counted during the holding time recorded in the area of ID="27" and recorded in the area of ID="28". After the number of times the judgment is made which is recorded in the area of ID="28" is compared with the threshold value recorded in the area of ID="29", the value in the area of ID="28" is reset.

The data of ID="30" indicates the IP address of the client connected to the highest-layer device (such as the servers 11 to 13), and in the case where there are a plurality of clients connected to the highest-layer device, has as many IP addresses as the clients. Also, in the case where the target device is not in the highest layer, the IP address of the device in the next higher layer connected to the target device may be recorded as the data of ID="30".

The data of ID="31" indicates the IP address of the highest-layer device connected with the client. In the case where the client is connected to a plurality of the highest-layer devices, as many IP addresses as the servers connected are available. In the configuration example illustrated in FIG. 4, a plurality of the servers 11 to 13 are arranged in the highest layer, and therefore, these servers of the highest layer can be informed of the IP addresses of other highest-layer servers by reference to the data of ID="31". The data of ID="32" is prepared as the load balancing information for the device in the highest layer, and indicates whether the normal or faulty state of the target device is notified or not to the clients C1, C2 and other devices in the load balancing system 1.

The data of ID="33" to "40" is the information on the devices connected to the target device and arranged in the next layer lower than the target device. In the configuration illustrated in FIG. 4, for example, the data of ID="33" to "40" of the load balancing information for the load balancer 21 has the information on the servers 31 to 39. Also, the data of ID="33" to "39" of the load balancing information for the load balancer 41, for example, has the information on the servers 51 to 53.

The data of ID="33" indicates the layer number of the next lower layer than the target device. The data of ID="34" indicates the number of the devices connected to the target device and arranged one layer lower than the target device, or in the case where the target device is a load balancer, indicates the number of devices to which the processing requests are distributed by the load balancing process of the target device. The data of ID="35" indicates the device number of each device which is connected to the target device and which is in next lower layer, and in the case where there are a plurality of such devices in the next lower layer, the data of ID="35" has the data corresponding to the number of the devices. In the case where a device which is connected to the target device and which is in next lower layer carries out the load balancing, the data of ID="36" indicates the type of the load balancing manner carried out by the device in next lower layer. In the case where there are a plurality of such devices in next lower layer, the data of ID="36" has the data corresponding to the number of such devices.

The data of ID="37" indicates the IP address of a device which is connected to the target device and which is in next lower layer. In the case where there are a plurality of such devices, the data of ID="37" has the data corresponding to the number of such devices. In the case where a device which is connected to the target device and which is in next lower layer carries out the load balancing, the data of ID="38" indicates which of the load balancer, the load balancing application program and the load balancing middleware operating on the server carries out the load balancing process. In the case where there are a plurality of such devices in next lower layer, the data of ID="38" has the data corresponding to the number of such devices.

The data of ID="39" indicates the state of a device which is connected to the target device and which is in the next lower layer, and has the value indicating "normal", "faulty" or "invalid" in accordance with the device state described above. As described above, the value may alternatively be "in the starting process", "IP connection not established", "load balancing normal" or "load balancing abnormal". In the case where there are a plurality of such devices, the data of ID="39" has the data corresponding to the number of such devices. The data of ID="40" indicates whether each of the devices which are connected to the target device and which are in next lower layer lower has a valid path that can transmit the processing request to the tail end servers 51 to 59, and in the case where such a valid path exists, has the value "valid", while in the absence of a valid path, has the value "invalid". In the case where there are a plurality of such devices one layer lower, the data of ID="40" has the data corresponding to the number of such devices.

FIG. 9 is a diagram depicting an example of the data structure of the load balancing information stored in the storage unit 102 of the highest-layer servers 11 to 13. The highest-layer servers 11 to 13 store the load balancing information for all the devices included in the load balancing system 1. The highest-layer servers 11 to 13 according to this embodiment, therefore, may be an example of the master node described in the claims. According to this embodiment, the server is used as a device to implement the master node. Nevertheless, the master node may be any of various devices including the load balancer, the firewall device and the load balancer with the firewall function. The highest-layer servers 11 to 13 collect, from other highest-layer servers in the same layer and the lower-layer devices, the load balancing information through a link established with these devices via the network layer. In the case where any of the lower-layer devices is in fault, the load balancing information of the faulty device is collected from a devices connected to the faulty device and arranged in the layer one layer higher than the faulty device.

Each of the servers 31 to 39 arranged in the intermediate layer stores, in the storage unit 202 thereof, the load balancing information for the target device, i.e. each of servers 31 to 39 itself and the load balancing information for the devices which is connected to the target device and which is in the next lower layer. Also, each of the load balancers 21, 41 to 43 arranged in the intermediate layer store, in the storage unit 302 thereof, the load balancing information for the target device, i.e. each of the balancers 21, 41 to 43 itself and the load balancing information for the devices which is connected to the target device and which is in the next lower layer.

FIG. 10 is a diagram depicting an example of the data structure of the load balancing information stored in the load balancer 21 stored in the second layer. FIG. 11 is a diagram depicting an example of the data structure of the load balancing information stored in the load balancer 41 arranged in the fourth layer. Each of the servers 31 to 39 and the load balancers 21, 41 to 43 arranged in the intermediate layer collects the load balancing information, from the devices which is connected to the target device, i.e. the each of the servers 31 to 39 and the load balancers 21, 41 to 43 itself and which is in next lower layer, the load balancing information through the link established with these devices via the network layer. Also, each of the servers 51 to 59 in the lowest layer stores only the load balancing information on the target device, i.e. each of the servers 51 to 59 itself in the storage unit 202 thereof.

Figure 12:
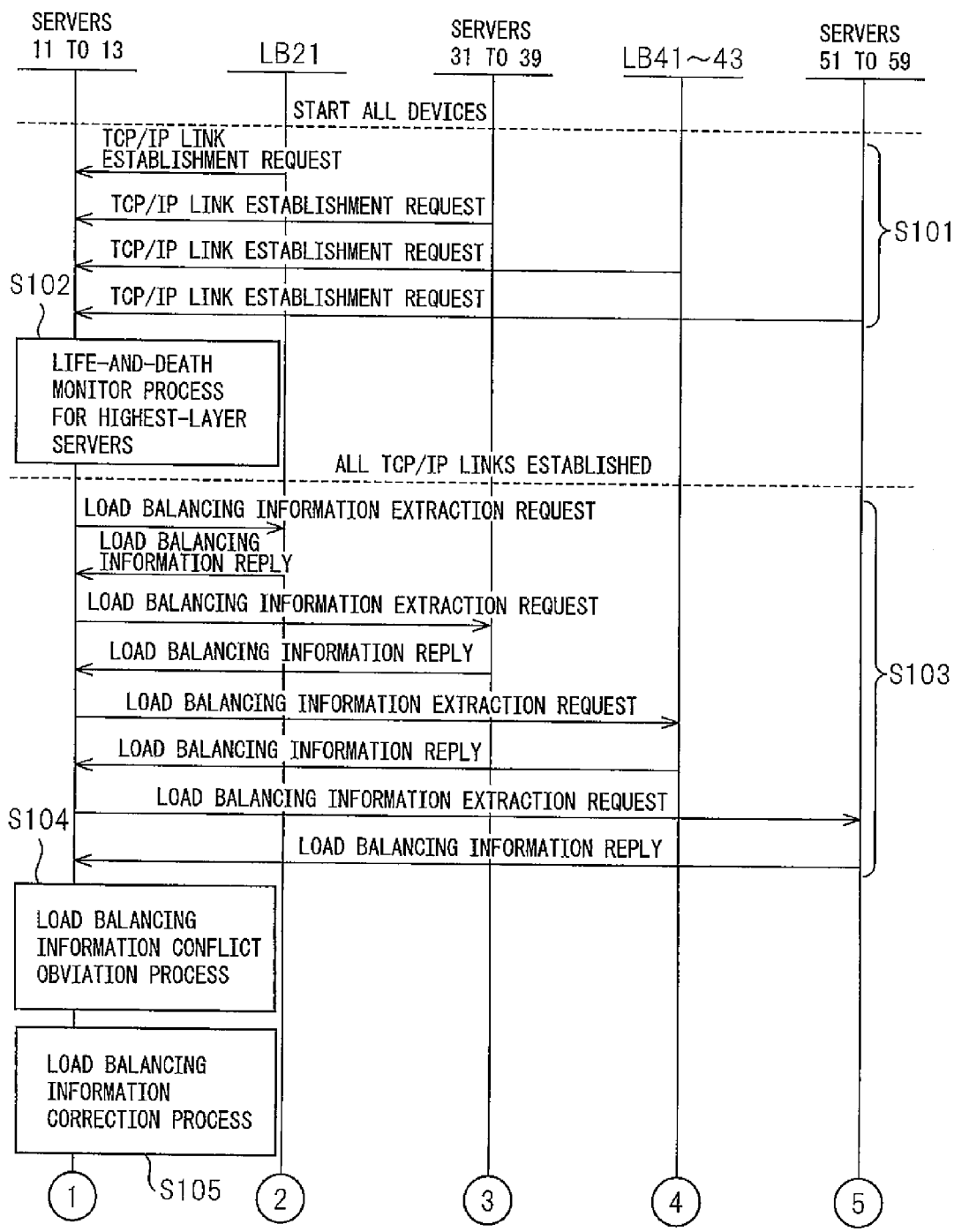
FIG. 12 is a diagram (No. 1) depicting the sequence for starting the hierarchical load balancing system depicted in FIG. 4.
Figure 13:
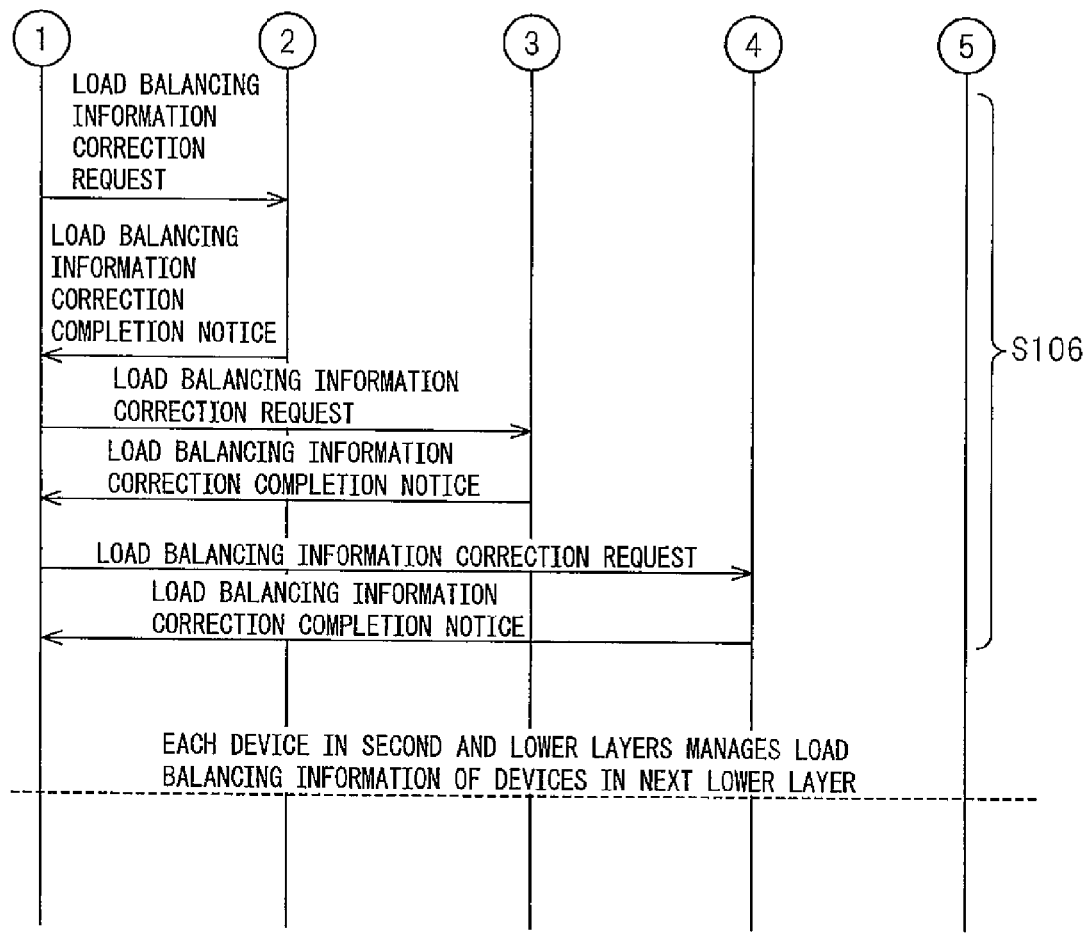
FIG. 13 is a diagram (No. 2) depicting the sequence for starting the hierarchical load balancing system depicted in FIG. 4.

FIGS. 12 and 13 depict the starting sequence of the load balancing system 1 illustrated in FIG. 4. Once all the devices in the load balancing system 1 are started, the lower-layer devices, by requesting the highest-layer servers 11 to 13 to establish the TCP/IP link, establish the TCP/IP link with the highest-layer servers 11 to 13 (step S101). In step S102, each of the highest-layer servers 11 to 13 executes the life-and-death monitor process for the highest-layer servers to judge whether other highest-layer servers are normally operating or not.

Figure 14:
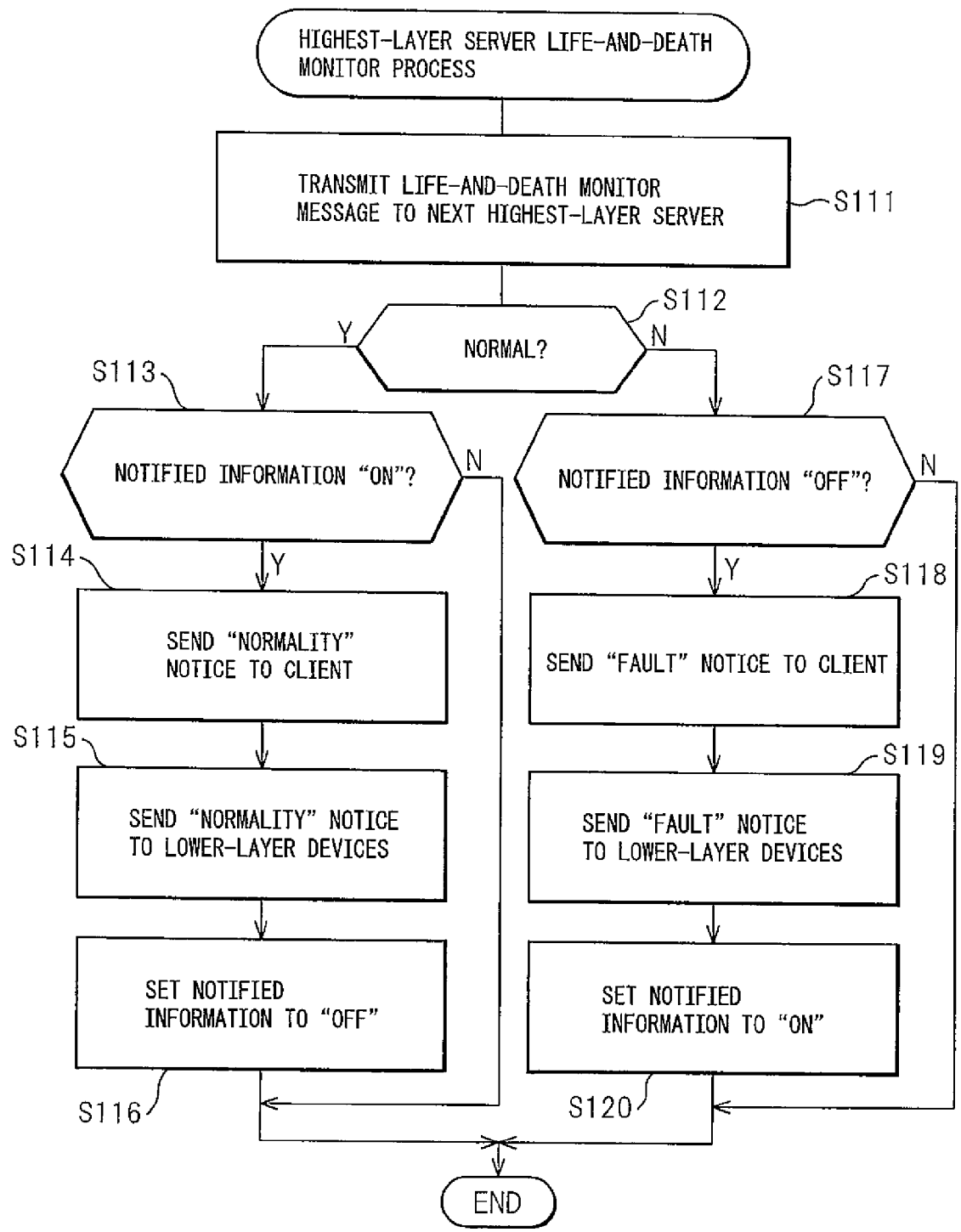
FIG. 14 is a flowchart depicting the life-and-death monitor process of the highest server.

FIG. 14 is a flowchart depicting the life-and-death monitor process for the highest-layer servers executed by the load balancing control program 104 operating on the highest-layer servers 11 to 13. The highest-layer servers 11 to 13 transmit the TCP/IP message to the other highest-layer servers, and by judging whether the server to which the message is transmitted is normal or not in accordance with whether the TCP/IP message is transmitted normally or not, mutually execute the life-and-death monitor operation. For example, the server 11 executes the life-and-death monitoring of the server 12 by transmitting the TCP/IP message thereto, the server 12 executes the life-and-death monitoring of the server 13 by transmitting the TCP/IP message thereto, and the server 13 executes the life-and-death monitoring of the server 11 by transmitting the TCP/IP message thereto. Now, the process in the server 11 is illustrated as an example.

In step S111, the server 11 transmits the life-and-death monitor message of the TCP/IP level to the next server 12 in the highest layer. In step S112, the server 11 judges whether the transmission result of step S111 is normal or not. In the case where the transmission result is normal, the process proceeds to step S113.

In step S113, the server 11 refers the "notified information" (ID=32) in the load balancing information for the highest-layer server 12 stored in the storage unit 102 of the highest-layer server 11. In the case where this data is "ON", i.e. indicates that "the abnormality of the highest-layer server 12 is notified previously to the clients C1, C2 and the lower-layer devices in the load balancing system 1 and neither the subsequent restoration of normality thereof is notified as yet", then the highest-layer server 11 notifies the clients C1, C2 in step 114 that the highest-layer server 12 is normal, and also notifies the lower-layer devices in the load balancing system 1 in step S115 that the highest-layer server 12 is normal. In step S116, the highest-layer server 11 turns "off" the value of the data "notified information" in the load balancing information for the highest-layer server 12 stored in the storage unit 102 thereof. By turning "off" the value of the data "notified information", the data "the normality of the highest-layer server 12 is notified previously to the clients C1, C2 and the lower-layer devices in the load balancing system 1 and the subsequent turning to abnormal state thereof is not notified as yet" is stored. After that, the process proceeds to step S121.

In the case where step S111 judges that the transmission result is abnormal, the process proceeds to step S117. In step S117, the server 11 refers the data "notified information" in the load balancing information for the highest-layer server 12 stored in the storage unit 102 of the highest-layer server 11. As long as this data indicates "off", the highest-layer server 11 notifies the clients C1, C2 in step S118 that the highest-layer server 12 is abnormal, and also notifies the lower-layer devices in the load balancing system 1 in step S119 that the highest-layer server 12 is abnormal. Then, in step S120, the highest-layer server 11 turns "on" the value of the data "notified information" in the load balancing information for the highest-layer server 12 stored in the storage unit 102.

Returning to FIG. 12, assume that the life-and-death monitor process S102 of the highest-layer servers is ended and the advisability of connection by the TCP/IP link between the highest-layer servers 11 to 13 and all the devices in the lower layers is established. Then, in step S103, the load balancing control program 104 requests all the lower-layer devices to extract the load balancing information, and causes the servers 11 to 13 to execute the process of collecting the load balancing information for these lower-layer devices. At the same time, the load balancing control program 104 causes each of the servers 11 to 13 to execute the process of collecting the load balancing information for the other highest-layer servers. An example of the data structure of the load balancing information transmission request transmitted by the servers 11 to 13 is illustrated in FIG. 15.

According to this embodiment, the communication data exchanged in the load balancing system 1 at the time of the extraction request, the transmission (notice) or the correction request for the load balancing information is generated in accordance with a predetermined format described below and transmitted or received at TCP/IP level. This communication data has a structure with the "request type" and the "ID bit map information" added to the load balancing information described above. The "request type" is the data indicating the type of the content of the communication data transmitted. The "request type" indicates that the type of the content of the communication data is any one of the load balancing information extraction request and the load balancing information reply, the load balancing information correction request, the load balancing information correction completion notice, the load balancing information notice, the response to the load balancing information notice, the device fault notice and the device restoration notice described later.

The "ID bit map information" is the bit map information indicating the ID of valid data in the load balancing information included in the transmitted communication data. In the load balancing information extraction request illustrated in FIG. 15, the type data indicating that the transmitted data is the load balancing information extraction request is input to the "request type", and only the data of ID=1 to 4 constitute valid data. The device requested to transmit the load balancing information is specified by the data "layer number" (ID=1) and the "device number" (ID=2) in the load balancing information.

The control program 204 operating on the servers 31 to 39 and 51 to 59, upon reception of the load balancing information extraction request, causes each server to execute the process of returning the load balancing information 205 for itself stored in the storage unit 202 of each server to the highest-layer servers 11 to 13.

Similarly, the load balancing program 305 operating on the load balancers 21, 41 to 43, upon reception of the load balancing information extraction request, causes each load balancer to execute the process of returning the load balancing information 306 of itself stored in the storage unit 302 of each load balancer to the highest-layer servers 11 to 13.

In the process, the control program 204 and the load balancing program 305 operate the servers and the load balancers in such a manner that any of the highest-layer servers 11 to 13 judged abnormal by the life-and-death monitor process illustrated in FIG. 14 are excluded from the destination to which the load balancing information is transmitted. For this purpose, the control program 204 and the load balancing program 305, in the life-and-death monitor process illustrated in FIG. 14, stores in the storage unit 202 of the servers and the storage unit 302 of the load balancers the fact that a notice is received to the effect that any one of the highest-layer servers is abnormal.

An example of the data structure of the load balancing information returned by the lower-layer devices is illustrated in FIG. 16. The type data indicating that the transmitted data is the reply data of the load balancing information is input to the "request type". All the data having the ID=1 to 40 constitute valid data. The data having the data ID of 33 to 40 transmitted from the servers 51 to 59 in the lowest layer, however, become invalid data.

The load balancing control program 104 of the servers 11 to 13 causes each of the servers 11 to 13 to execute the process of receiving the load balancing information transmitted from the other highest-layer servers and the lower-layer devices and the process of storing the received load balancing information in each storage unit 102. The CPU 101 executing the load balancing control program 104 and the communication interface 103, therefore, may be an example of the load balancing information receiving unit described in the claims.

The control program 204 of the servers 31 to 39, with the returning of the load balancing information of each of the servers 31 to 39 to the highest-layer servers 11 to 13, causes each of the servers 31 to 39 to execute the process of collecting the load balancing information from the load balancers 41 to 43 which are connected to the respective servers and which are in next lower layer. The collected load balancing information are each stored in the storage unit 202 by the servers 31 to 39.

The load balancing program 305 of the load balancers 21, 41 to 43, with the returning of the load balancing information of each of the load balancers 21, 41 to 43 to the highest-layer servers 11 to 13, causes each of the load balancers 21, 41 to 43 to execute the process of collecting the load balancing information from the servers 31 to 39, 51 to 59 which are connected to the respective the load balancers and which in next lower layer. Then, the load balancers 21, 41 to 43 store the collected load balancing information in the respective storage units 302. The process executed at the time of exchanging the load balancing information between the servers 31 to 39 and the load balancers 21, 41 to 43 in the intermediate layer and the devices one layer lower than these devices is similar to the process executed to collect the load balancing information between the highest-layer servers 11 to 13 and the lower-layer devices.

In step S104, each of the highest-layer servers 11 to 13 checks and obviates the conflict contained in the load balancing information collected in step S103. The conflict contained in the load balancing information may be defined, for example, as a conflict regarding the normal state and the abnormal state (or the invalid state) in one device such as the fact that the value of the data "IP connection in established state" (ID=13) in the load balancing information for a given device is expressed as the "IP connection established" in spite of the fact that the value of the data "device state" (ID=5) is a "fault". Another example of the conflict contained in the load balancing information may be a conflict in the vertical relation between the devices, i.e. a conflict in which in spite of the fact that the value of the data "device state" in the load balancing information for a higher-layer device is "fault" or "invalid", the value of the data "device state" in the load balancing information for the devices downstream of the higher-layer device is "normal".

Figure 17:
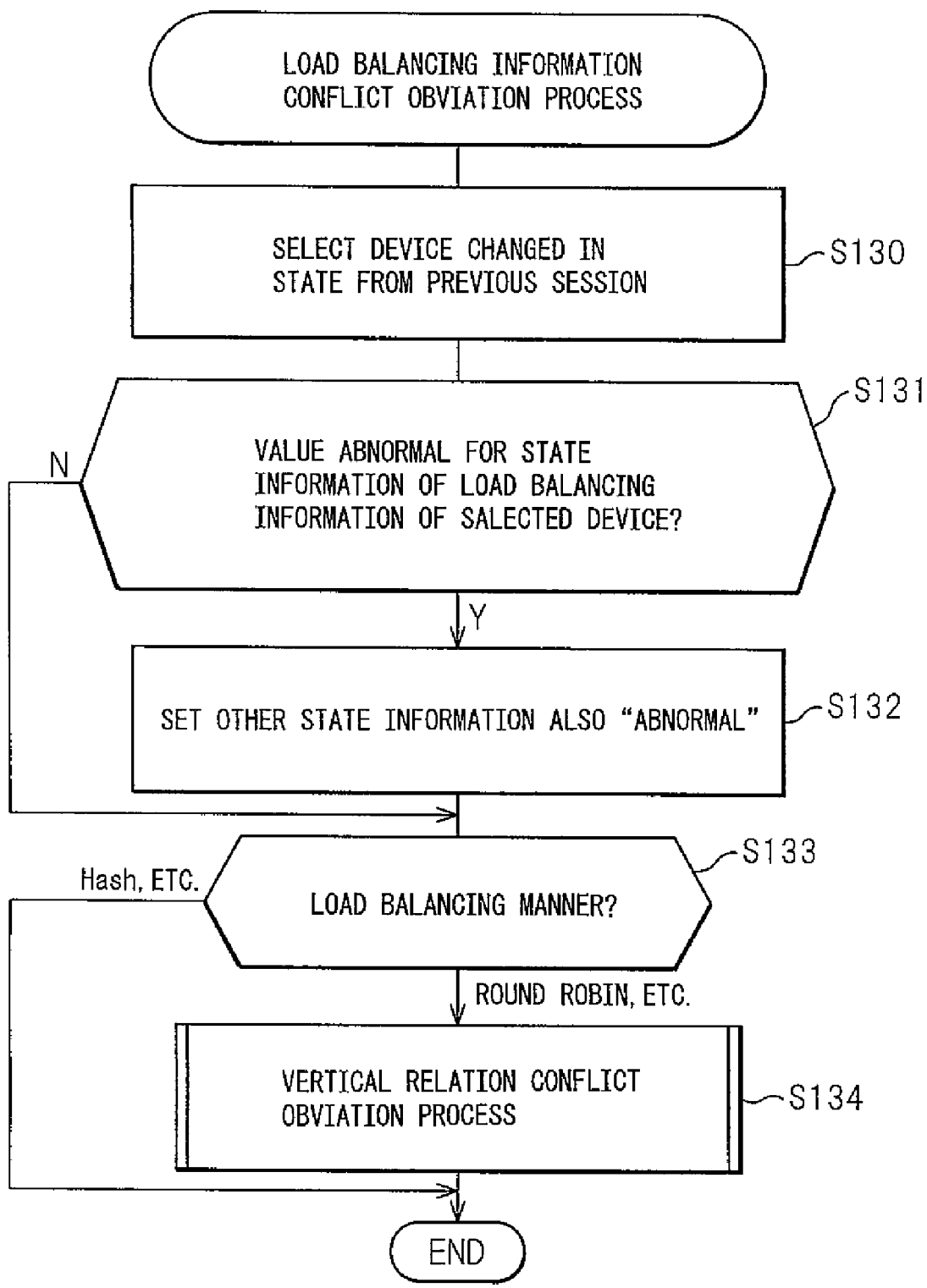
FIG. 17 is a flowchart depicting the load balancing information conflict obviation process.

FIG. 17 illustrates a flowchart for the load balancing information conflict obviation process executed by the load balancing control program 104. In step S130, each of the highest-layer servers 11 to 13 compares the load balancing information collected previously from each device with the load balancing information collected currently in step S103, and selects any devices with the information thereof changed from all the devices in the load balancing system 1. For the devices selected in this way, steps S131 to S134 described below are executed. By concentration of the process execution on the difference points between the load balancing information previously collected and the load balancing information currently collected as described above, the load balancing information conflict obviation process can be executed quickly.

The servers 11 to 13 in the highest layer access the data "number of processes accepted" (ID=11), "CPU utilization rate" (ID=19), "memory utilization rate" (ID=21), "process utilization rate" (ID=23) and "resource utilization amount" (ID=25) in the load balancing information for the selected device, and in the case where any of these values is abnormal (for example, in the case where any of them exceeds a predetermined tolerable range), the data "device state" in the load balancing information is set to "fault" in step S132. Also, the servers 11 to 13 in the highest layer access the data "device state" in the load balancing information for the selected device in step S131, and in the case where the value thereof is "fault", the value of the data "IP connection in established state" (ID=13) in the load balancing information is set to "IP connection not established" in step S132. Further, the servers 11 to 13 in the highest layer access the data "IP connection in established state" in the load balancing load information for the selected device in step S131, and in the case where the value thereof is "IP connection not established", the data "device state" (ID=5) in the load balancing information is set to "fault" in step S132.

In step S133, the servers 11 to 13 in the highest layer access the data "load balancing manner (existing)" (ID=8) in the load balancing information for the selected device, and judges whether the load balancing manner used for the selected device is the hash method, etc. and the distributes of the processing request according to this load balancing manner is redundant. In the case where the load balancing manner is the hash method, etc. and the distributee is not redundant, then the next step S134 is skipped and the process ended in order to use the currently-used load balancing manner in priority. This is also true in the case where the data "load balancing manner (existing)" (ID=8) is "not intended".

Although it is judged that the load balancing manner currently used for the selected device is the round robin, etc. or that the load balancing manner used for the selected device is the hash method, etc., in step S133, if the distributee of the processing request is judged to have a redundant configuration, then the process proceeds to step S134. Incidentally, in the case where the load balancing manner used for the selected device is the hash method, etc. in step S131, the process may be ended regardless of whether the distributee of the processing request has a redundant configuration or not in order to use the current load balancing manner in priority.

Figure 18:
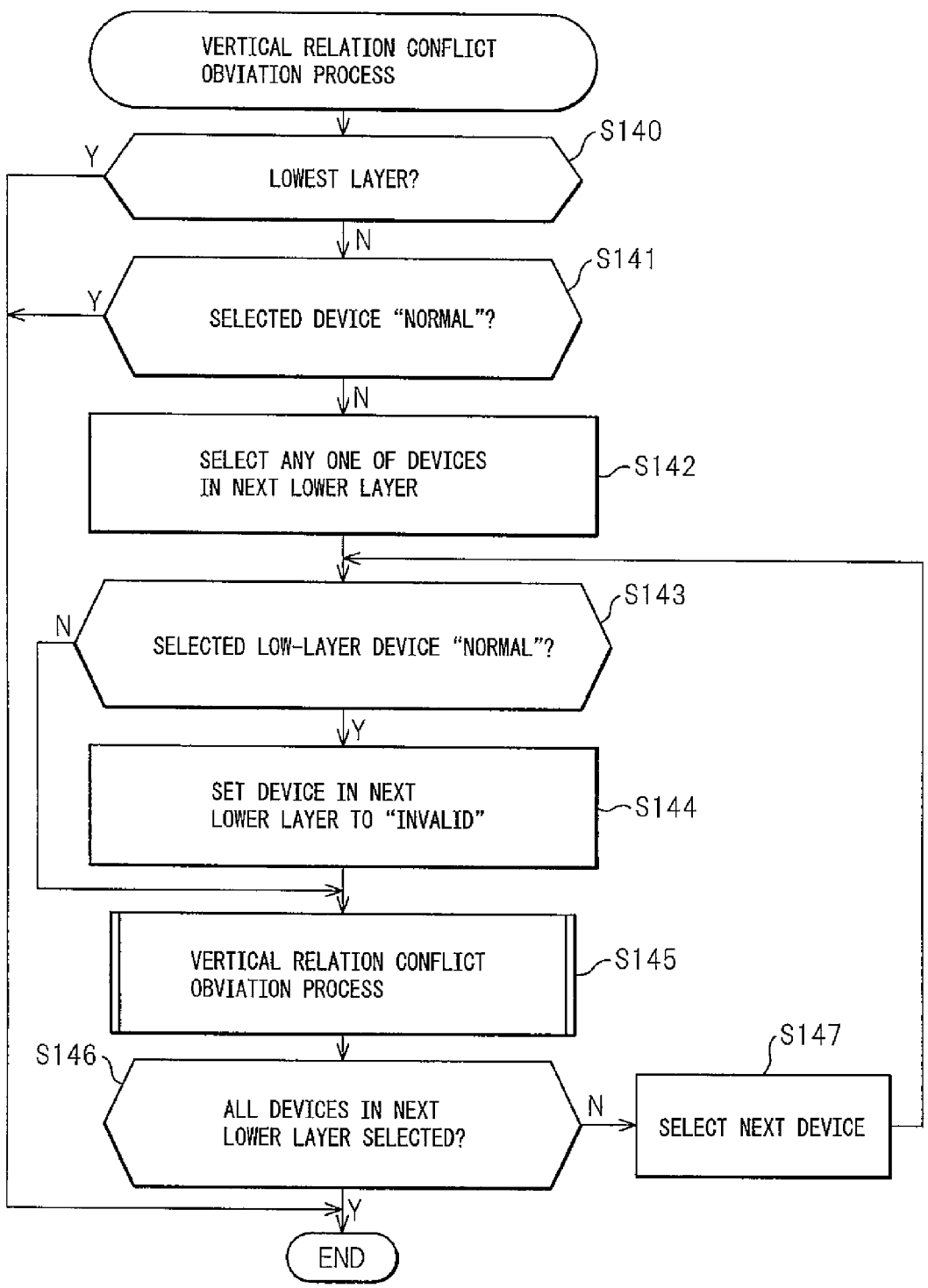
FIG. 18 is a flowchart depicting the vertical relation conflict obviation process as a subroutine accessed from the load balancing information conflict obviation process depicted in FIG. 15.

In step S134, the servers 11 to 13 in the highest layer access the vertical relation conflict obviation process for obviating the conflict of the vertical relation between the selected device and a device on the downstream side thereof. FIG. 18 is a flowchart depicting the vertical relation conflict obviation process as a subroutine accessed in step S134. In step S140, each of the servers 11 to 13 in the highest layer judges whether the selected device belongs to the lowest layer or not, and in the case where the selected device belongs to the lowest layer, the process is ended without doing anything. In step S141, the servers 11 to 13 in the highest layer judges whether the value of the data "device state" in the load balancing information for the selected device is "normal" or not, and in the case where it is "normal", ends the process without doing anything.

In step S142, each of the servers 11 to 13 in the highest layer selects a device which is connected to the selected device and which is arranged in the next lower layer than the selected device. In the case where the data "device state" in the load balancing information for the lower-layer device thus selected is "normal", the particular value is set to "invalid", and at the same time, the value of the data "route state from higher-layer devices" in the load balancing information for the lower-layer device thus selected is also set to "invalid" (steps S143 and S144). In step S145, recursive call of the vertical relation conflict obviation process is executed in order to obviate the conflict of the vertical relation between the lower-layer device selected and the devices downstream thereof. In step S146, it is judged whether the process of steps S143 to S145 has been executed or not for all the devices which are connected to the selected device and are which is in next lower layer than the selected device. In the case where steps S143 to S145 have been executed for all the lower-layer devices, the process is ended. Otherwise, the next device in lower layers is selected (step S147) and the process is returned to step S143.

Returning to FIG. 12, the servers 11 to 13 in the highest layer execute, in step S105, the load balancing information correction process thereby to correct the load balancing information stored in the storage units 102 of the servers 11 to 13. The load balancing information correction process checks whether a given device in the load balancing system 1 has a valid path capable of transmitting the processing request to the tail-end server downstream thereof, and in the absence of such a valid path, invalidates the processing request to the given device. Also, the load balancing information correction process changes the load balancing manner for the load balancing process executed by each device (each of the load balancers 21, 41 to 43 in this configuration example) in the load balancing system 1.

Figure 19:
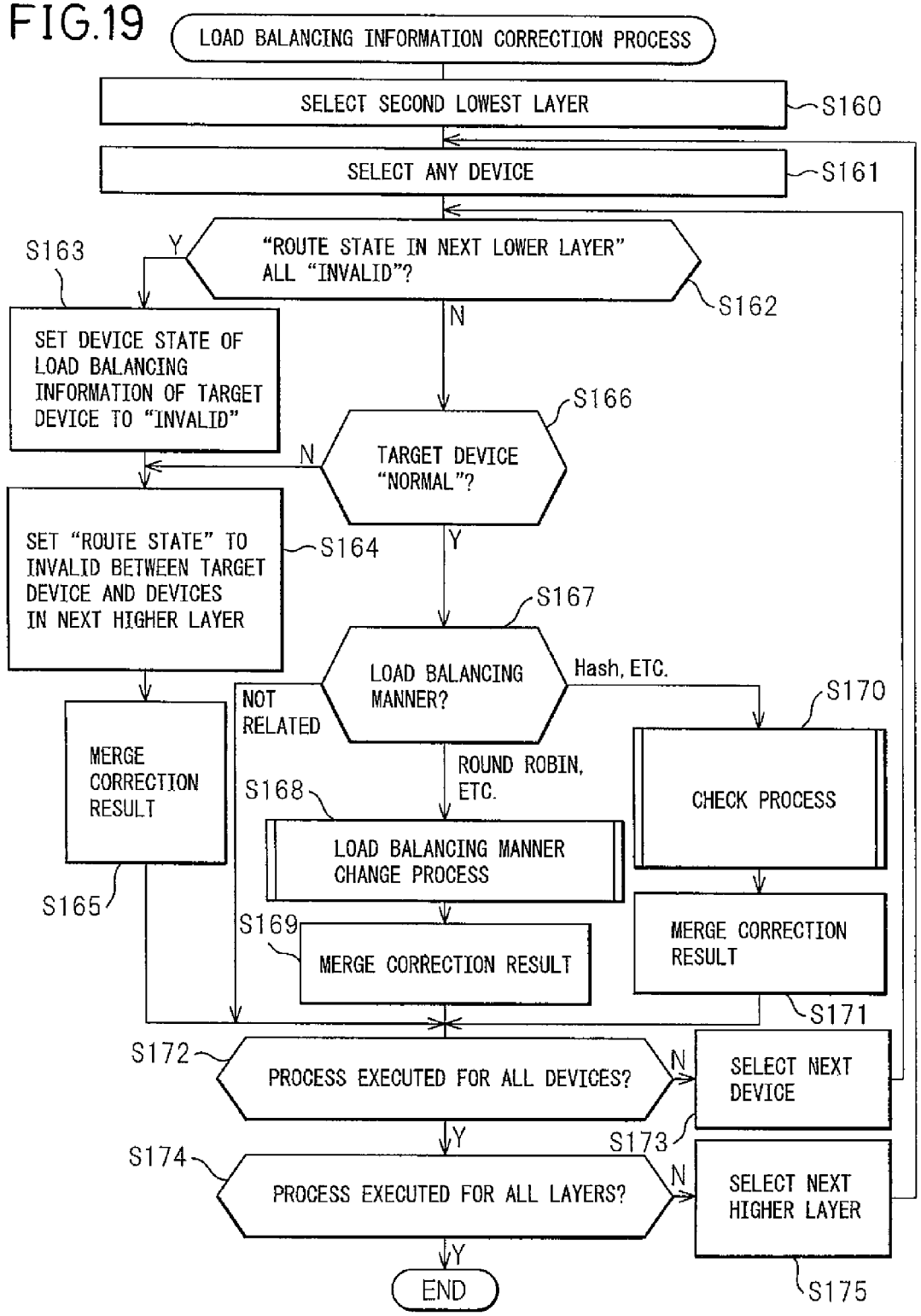
FIG. 19 is a flowchart depicting the load balancing information correction process.

FIG. 19 is a flowchart depicting the load balancing information correction process executed by the load balancing control program 104 operating on the servers 11 to 13 in the highest layer. In step S160, the servers 11 to 13 select the second lowest layer (fourth layer in this configuration example) as the layer to be processed in the load balancing system 1. In step S161, the servers 11 to 13 select any one of devices in the selected layer as a target device to be processed.

In step S162, the servers 11 to 13 read the load balancing information for the target device from the storage unit 102, and accesses the data "route state of the next lower layer" (ID=39) in the load balancing information. Then, the servers 11 to 13 judge whether all the values of the data "route state of the next lower layer" are "invalid" or not, i.e. whether all the devices which are connected to the target device and which are in next lower layer than the target device have no valid path capable of transmitting the processing request to the tail end of the load balancing system 1. In the case where all the values of the data "route state of the next lower layer" are judged as "invalid", it indicates that the target device has no valid path along which the processing request can be transmitted to the tail end on the downstream side. The servers 11 to 13, therefore, set the value of the data "device state" to "invalid" in the load balancing information of the target device in step S163.

Also, in step S164, the value of the data for the target device which is included in the data "route state of the next lower layer" in the load balancing information for the device which is connected to the target device and which is in next higher layer than the target device is set to "invalid". Further, the value of the data "route state of higher-layer devices" (ID=6) in the load balancing information for the target device is set to "invalid". In step S165, the servers 11 to 13 so operate that the contents of the load balancing information changed in steps S163 and S164 are merged with the load balancing information stored in the storage unit 202. After that, the process proceeds to step S172.

In the case where step S162 judges that none of the data "route state of the next lower layer" is "invalid", the servers 11 to 13 judge whether the value of the data "device state" in the load balancing information for the target device is "normal" or not. Upon judgment that the data "device state" is not "normal", the servers 11 to 13, in step S164, set to "invalid" the value of the data for the target device in the data "route state of the next lower layer" in the load balancing information for the devices which are connected to the target device and which are in next higher layer than the target device. Also, the value of the data "route state from higher-layer devices" in the load balancing information for the target device is set to "invalid". In step S165, the servers 11 to 13 so operate that the contents of the load balancing information changed in step S164 are merged with the load balancing information stored in the storage unit 202. After that, the process proceeds to step S172.

Upon judgment that the data "device state" is "normal", the servers 11 to 13 access the data "load balancing manner (existing)" in the load balancing information for the target device in step S166. In the case where the load balancing manner carried out for the target device by the device on the upstream side thereof is the round robin, etc., the servers 11 to 13 access the load balancing manner change process in step S168. In step S169, the servers 11 to 13 so operate that the contents of the load balancing information changed in step S168 are merged with the load balancing information stored in the storage unit 202. After that, the process proceeds to step S172.

In the case where the load balancing manner carried out for the target device by the device upstream thereof is the hash method, etc., the servers 11 to 13 access the check process in step S170. In step S171, the servers 11 to 13 so operate that the contents of the load balancing information changed in step S170 are merged with the load balancing information stored in the storage unit 202. After that, the process proceeds to step S172. The load balancing manner change processes and the check process are described later. In the case where the target device is not intended for load balancing, the process proceeds to step S172.

In step S172, the servers 11 to 13 judge whether the loop S162 to S173 has been executed for all the devices included in the layer currently selected as the layer to be processed. Upon judgment that the loop S162 to S173 has been executed for all the devices of the layer to be processed, the process proceeds to step S174. Otherwise, in step S173, the servers 11 to 13 select, as the target device, a device yet to be designated as the device to be processed in the layer to be processed, and the process returns to step S162.

In step S174, the servers 11 to 13 judge whether the loop S161 to S175 has been executed for all the layers of the load balancing system 1. Upon judgment that the loop S161 to S175 has been executed for all the layers, the process is ended. Otherwise, the layer one layer higher than the current layer to be processed is selected as a layer to be processed (step S175), and the process returns to step S161.

The servers 11 to 13, by executing the load balancing control program 104 and the load balancing information correction process, determine sequentially from the lower layers, whether each device in the load balancing system 1 has a valid path capable of transmitting the processing request to the tail end. In the case where a given device X has no valid path capable of transmitting the processing request to the tail end downstream thereof, the servers 11 to 13 set the data for the device X to "invalid" in the data "route state of the next lower layer" in the load balancing information for the device one layer higher than the device X. Specifically, the servers 11 to 13 so operate that the fact that the path for transmitting the processing request from the device X to the tail end downstream thereof is "invalid" is recorded in the load balancing information for the higher-layer devices transmitting the processing request to the device X. As a result, according to whether each device in the load balancing system 1 has a valid path capable of transmitting the processing request to the tail end downstream thereof, the servers 11 to 13 determine the advisability of transmission of the processing request to the each device. The CPU 101 executing the load balancing control program 104, therefore, may be an example of the transmission advisability determining unit described in the claims.

Figure 20:
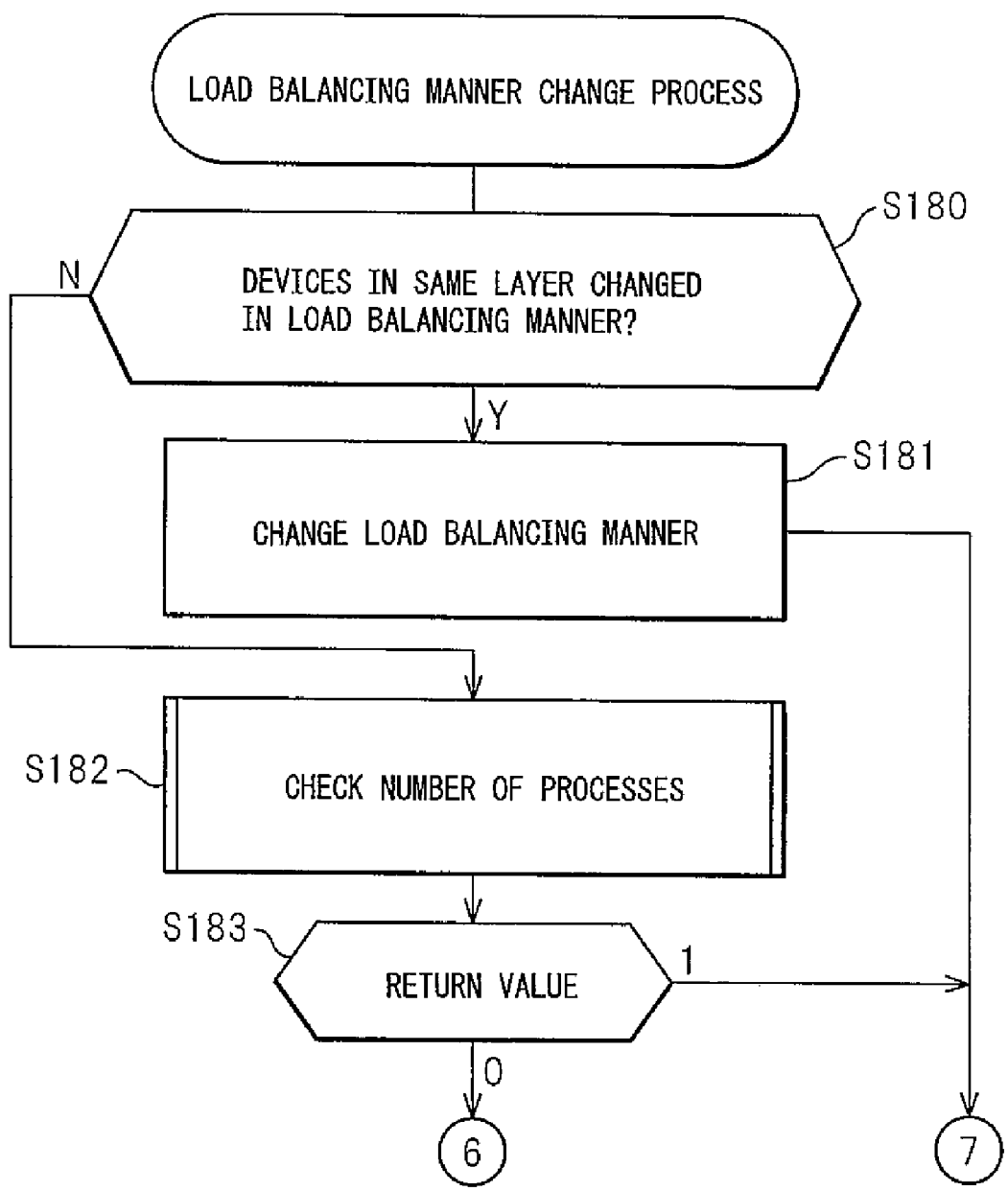
FIG. 20 is a flowchart (No. 1) depicting the load balancing manner change process as a subroutine accessed from the load balancing information correction process depicted in FIG. 19.
Figure 21:
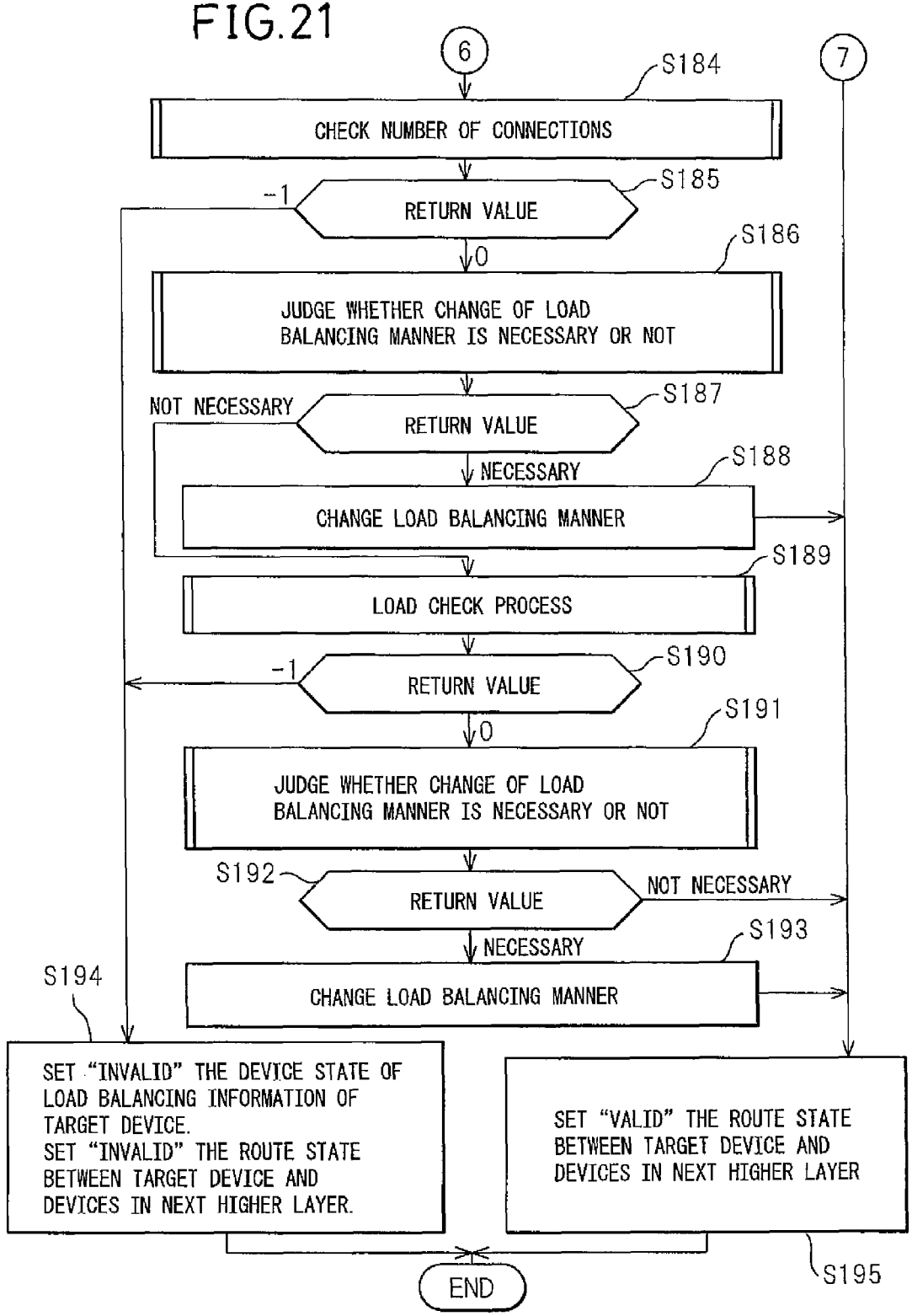
FIG. 21 is a flowchart (No. 2) depicting the load balancing manner change process as a subroutine accessed from the load balancing information correction process depicted in FIG. 19.

FIGS. 20 and 21 are flowcharts for the load balancing manner change process as a subroutine accessed by step S168 of the load balancing information correction process depicted in FIG. 19. In step S180, the servers 11 to 13 judge whether the load balancing manner used for other devices than the target device to be processed in the same layer is changed before the present time after the previous time when the load balancing information correction process is executed. Upon judgment that such a change is made, it can be assumed that the same load balancing manner is preferably carried out also for the target device, and therefore, in step S181, the servers 11 to 13 change the load balancing manner used for the target device.

In changing the load balancing manner, the servers 11 to 13 so operate that the value of the data "load balancing manner switching" (ID=10) in the load distribution information, which is stored in the storage unit 202 and which is associated with the device one layer higher than the layer where the processing request is distributed to the target device, is set to the same value as that of the type of the load balancing manner used for other devices in the same layer as the target device. Also, the value of the data "load balancing manner switching flag" (ID=9) in the load distribution information for the device one layer higher is turned "on" from the "off" state. In the case where by changing the load balancing information in this way, this changed load balancing information is transmitted to the device one layer higher than the target device as described later, then this load balancing information notifies the device one layer higher than the target device that the load balancing manner is to be changed.

Figure 22:
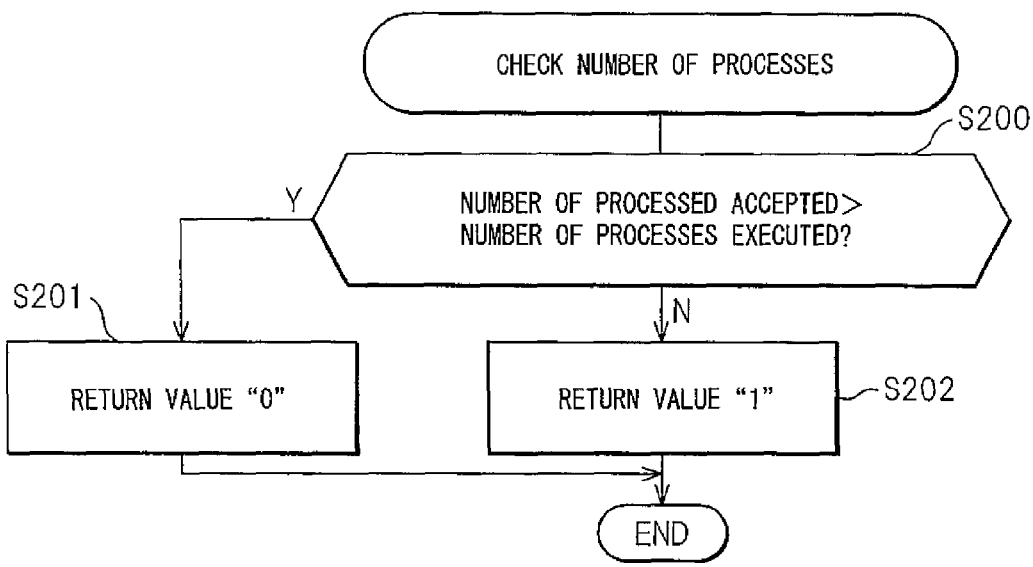
FIG. 22 is a flowchart depicting the process number check process accessed from the load balancing manner change process depicted in FIG. 20.

In step S182, assume that the target device is a server in the intermediate layer. The servers 11 to 13 checks the relation between the number of the processing requests accepted and the number of the processing requests completely transmitted to the lower layers. In the case where the target device is the servers 51 to 59 in the lowest layer, the processed number check process is executed to check the relation between the number of the accepted processing requests and those of the accepted processing requests which are completely processed. FIG. 22 depicts a flowchart for the processed number check process.

In step S200, the servers 11 to 13 compare the data "number of processes accepted" with the data "number of processes executed" in the load balancing information for the target device. In the case where the number of the processes accepted is not larger than the number of the processes executed, the processed number check process returns to the accessor the value "1" indicating that no problem is posed by the load balancing process for the target device as a return value (step S201). In the case where the number of the processes accepted is larger than the number of the processes executed, on the other hand, the value "0" indicating that the problem is posed by the load balancing process is returned to the accessor (step S202).

Figure 23:
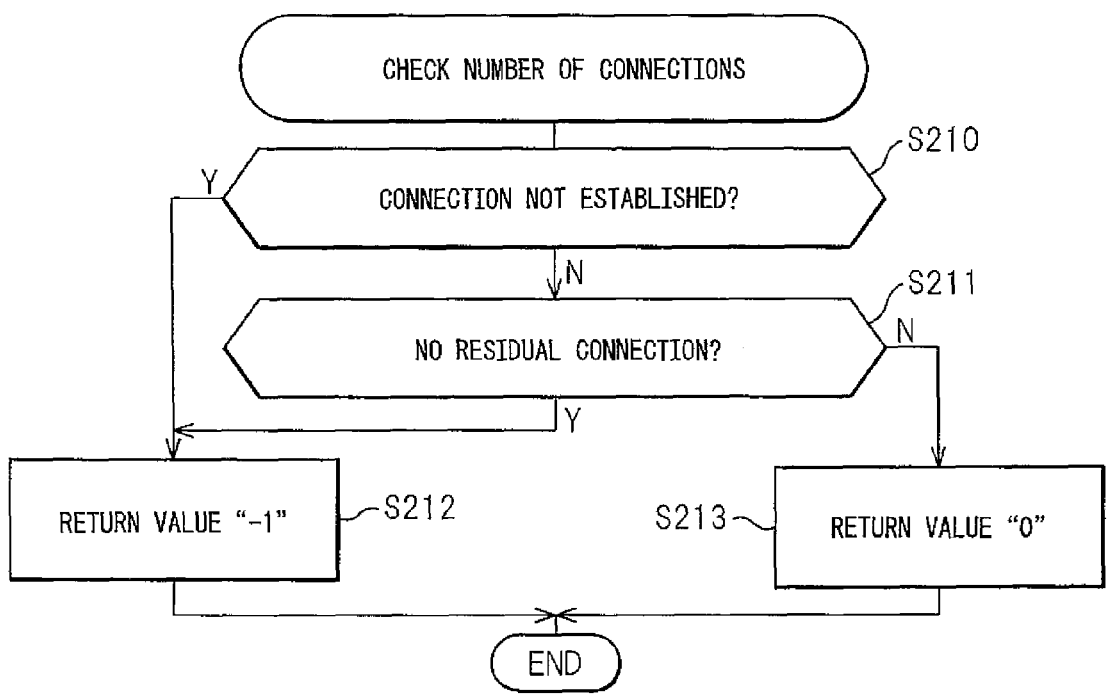
FIG. 23 is a flowchart depicting the connection number check process accessed from the load balancing manner change process depicted in FIG. 21.

Returning to FIGS. 20 and 21, assume that step S183 indicates that the return value of the processed number check process is "1". The servers 11 to 13 transfer the process to step S195, so that the value of the data for the target device included in the data "route state of the next lower layer" in the load balancing information for the device which is connected to the target device and which is in next higher layer than the target device is set to "valid". Then, the value of the data "route state from the higher layers" in the load balancing information for the target device is set to "valid", and the process is ended. In the case where the return value of the processed number check process is "0" in step S183, the servers 11 to 13 transfer the process to step S184. In step S184, the number of the connections held in the target device is checked. FIG. 23 depicts a flowchart for the connection number check process.

In steps S210 and S211, the servers 11 to 13 access the data "IP connection in established state" (ID=13) and the data "Number of residual IP connections" (ID=15) in the load balancing information for the target device. In the case where the IP connection is not established or the residual number of IP connections is zero, the connection number check process returns to the accessor the value "−1" indicating that the distribution of the processing request to the target device is to be invalidated (step S212). In the case where the IP connection is established and the IP connections remain, on the other hand, the connection number check process returns to the accessor the value "0" indicating that it is necessary to judge whether the load balancing manner is to be changed or not as a return value (step S213).

Figure 24:
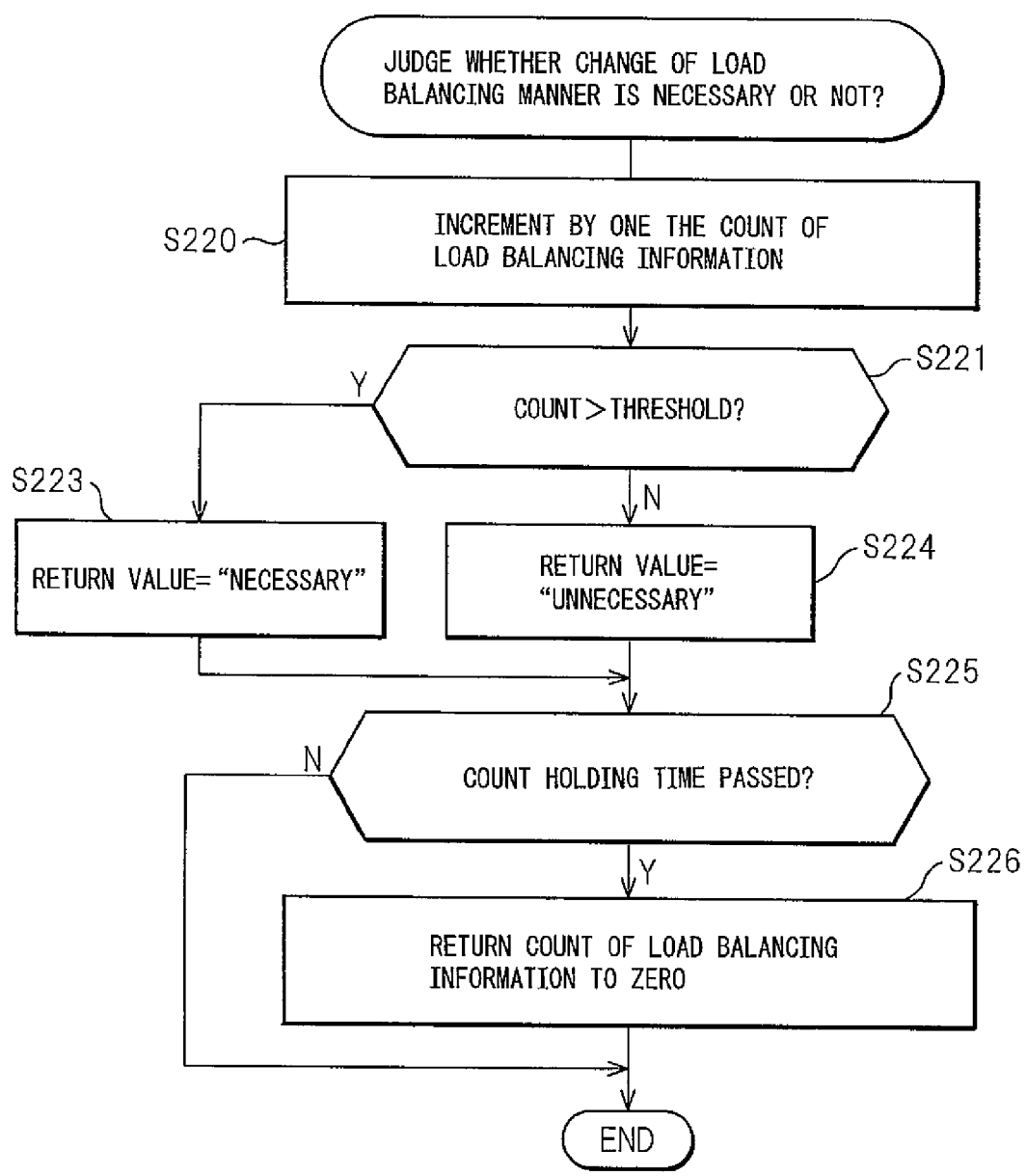
FIG. 24 is a flowchart depicting the process of judging whether the change in the load balancing manner is necessary or not, as accessed from the load balancing manner change process depicted in FIG. 21.

Returning to FIG. 21, assume that the return value of the connection number check process is "−1" in step S185. The servers 11 to 13 transfer the process to step S194, and the value of the data "device state" in the load balancing information for the target device is set to "invalid". Also, the data value for the target device included in the data "route state of the next lower layer" in the load balancing information for the device which is connected to the target device and which is in the next higher layer than the target device is set to "invalid". Further, the value of the data "route state from higher layers" in the load balancing information for the target device is set to "invalid". In the case where the return value of the connection number check process is "0" in step S185, the servers 11 to 13 transfer the process to step S186. In step S186, it is judged whether the load balancing manner used for the target device is to be changed from the normal round robin to the least connection. FIG. 24 is a flowchart for the process of judging whether the load balancing manner is to be changed or not, accessed in step S186.

In step S220, the servers 11 to 13 increment, by one, the data "count used for switching to least connection" (ID=17) (hereinafter referred to simply as "the count" in the description of step S186) in the load balancing information for the target device stored in the storage unit 102. In step S221, the servers 11 to 13 accesses the data "threshold of count used for switching to least connection" (ID=18) (hereinafter referred to simply as "threshold" in the description of step S186) in the load balancing information for the target device, and compares the count with the threshold. In the case where the comparison in step S221 indicates that the count exceeds the threshold, the return value to the accessor is set to "necessary" (step S223). Otherwise, the return value is set to "unnecessary" (step S224).

In steps S225, the servers 11 to 13 access the data "count holding time used for switching to least connection" (ID=16) (hereinafter referred to simply as "holding time" in the description of step S186) in the load balancing information for the target device, and judges whether the holding time has passed or not from the count start. If it is judged in step S225 that the holding time has passed, the servers 11 to 13 return the value of "count" returns to zero in step S226.

In the case where the return value from the process of step S186 is "unnecessary" in step S187 of FIG. 21, the servers 11 to 13 transfer the process to step S189. In the case where the return value is "necessary", on the other hand, the servers 11 to 13 operate in step S118 in such a manner that the load balancing manner of the load balancer in the next higher layer than the target device which distributes the processing request to the target device is changed to the least connection. In the process, the value of the data "load balancing manner switching" (ID=10) in that portion of the load balancing information which is stored in the storage unit 202 and associated with the device in the next higher layer where the processing request is distributed to the target device, is changed to "least connection" by the servers 11 to 13. Also, the value of the data "load balancing manner switching flag" (ID=9) in the load balancing information for the device in the next higher layer is changed from "off" to "on". Then, in step S195, the servers 11 to 13 operate in such a manner that the data value for the target device included in the data "route state of the next lower layer" in the load balancing information for the device which is connected to the target device and which is in the next higher layer than the target device is set to "valid". Also, the value of the data "route state from higher layers" in the load balancing information for the target device is set to "valid", and the process is ended.

Figure 25:
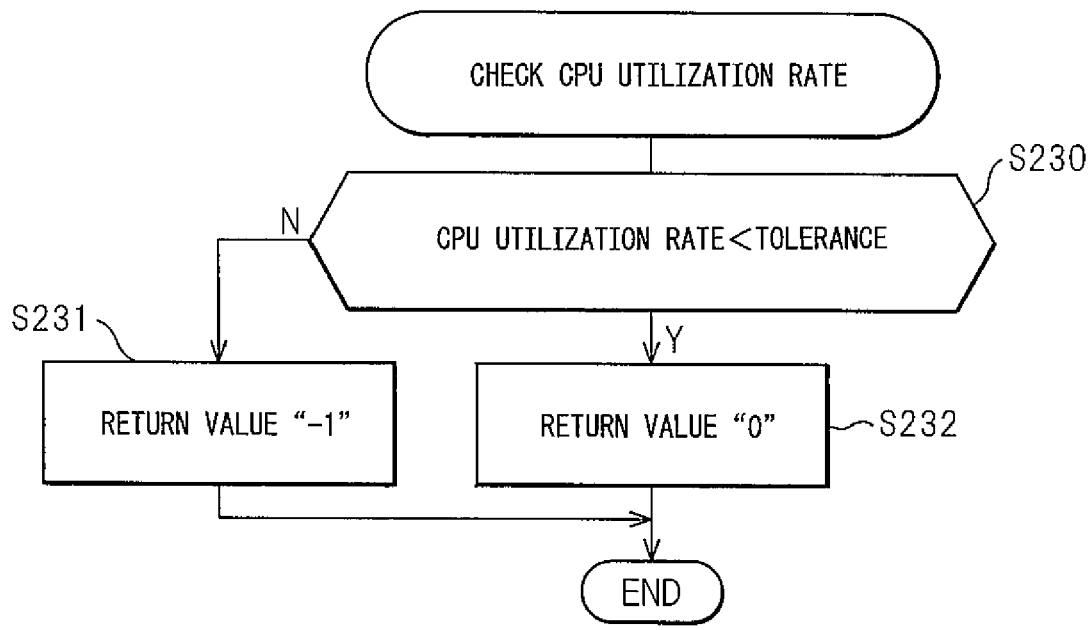
FIG. 25 is a flowchart depicting the CPU utilization rate check process accessed as the load check process depicted in FIG. 21.

In this way, the servers 11 to 13 execute the load balancing control program 104 and the load balancing manner change process illustrated in FIGS. 20 and 21. Therefore, the servers 11 to 13 executing the load balancing control program 104 change the load balancing manner employed by the devices in higher layers such as the load balancer for distributing the load to the device X, if the load condition of the device X as a server, etc. meets a predetermined standard, i.e. the condition that "the state in which the number of the accepted processes exceeds the number of the executed processes is sustained for a predetermined time or longer". Therefore, The CPU 101 executing the load balancing control program 104 may be an example of the load balancing manner change unit described in the claims In steps S189, the servers 11 to 13 check the other load conditions for the target device. An example of the load check process of step S189 is illustrated in FIGS. 25 to 28. FIG. 25 is a flowchart for the CPU utilization rate check process accessed as the load check process S189. In step S230, the servers 11 to 13 compare the data "CPU utilization rate" (ID=19) with the data "CPU utilization rate threshold" (ID=20) in the load balancing information for the target device. In the case where the CPU utilization rate is not smaller than the CPU utilization threshold value, the CPU utilization check process returns to the accessor the return value "−1" indicating that the distribution of the processing request to the target device is to be invalidated (step S231), while in the case where the CPU utilization rate is smaller than the CPU utilization rate threshold value, on the other hand, the value "0" is returned to the accessor as a return value (step S232).

Figure 26:
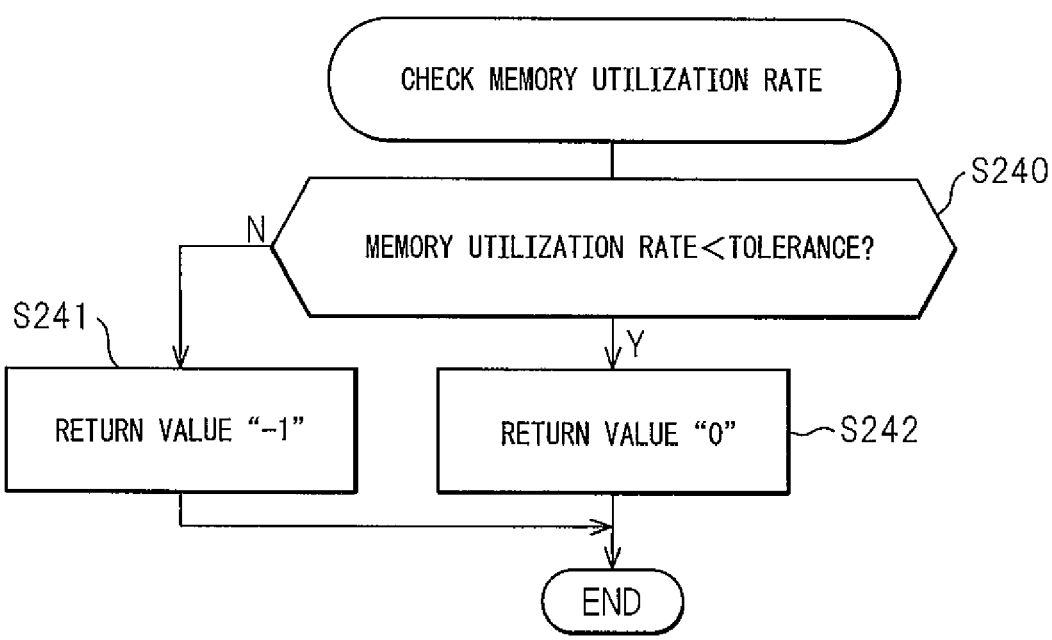
FIG. 26 is a flowchart depicting the memory utilization rate check process accessed as the load check process depicted in FIG. 21.

FIG. 26 is a flowchart for the memory utilization rate check process accessed as the load check process 189 illustrated in FIG. 21. In step S240, the servers 11 to 13 compare the data "memory utilization rate" (ID=21) with the data "memory utilization rate threshold value" (ID=22) in the load balancing information for the target device. In the case where the memory utilization rate is not smaller than the memory utilization rate threshold value, the memory utilization rate check process returns the return value "−1" to the accessor (step S241), while in the case where the memory utilization rate is smaller than the memory utilization rate threshold value, on the other hand, the return value "0" is returned to the accessor (step S242).

Figure 27:
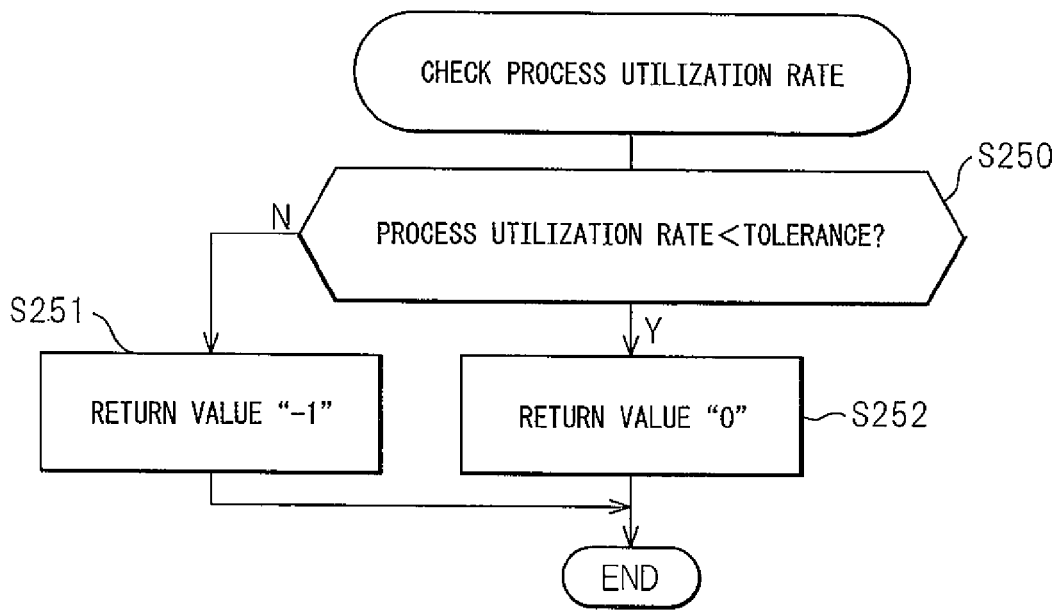
FIG. 27 is a flowchart depicting the process utilization rate check process accessed as the load check process depicted in FIG. 21.

FIG. 27 is a flowchart for the process utilization rate check process accessed as the load check process 189 illustrated in FIG. 21. In step S250, the servers 11 to 13 compare the data "process utilization rate" (ID=23) with the data "process utilization rate threshold value" (ID=24) in the load balancing information for the target device. In the case where the process utilization rate is not smaller than the process utilization rate threshold value, the process utilization rate check process returns the return value "−1" to the accessor (step S251), while in the case where the process utilization rate is smaller than the process utilization rate threshold value, on the other hand, the return value "0" is returned to the accessor.

Figure 28:
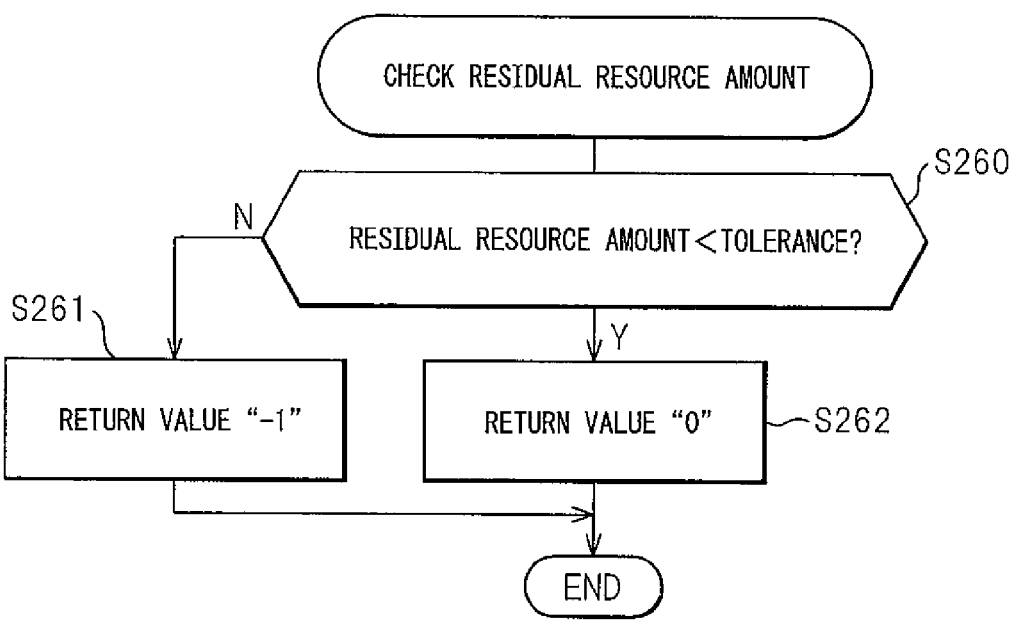
FIG. 28 is a flowchart depicting the residual source amount check process accessed as the load check process depicted in FIG. 21.

FIG. 28 is a flowchart for the residual resource amount check process accessed as the load check process 189 illustrated in FIG. 21. In step S260, the servers 11 to 13 compare the data "resource utilization amount" (ID=25) with the data "resource utilization amount threshold value" (ID=26) in the load balancing information for the target device. In the case where the process utilization rate is larger than the process utilization rate threshold value and the residual resource amount is smaller than a predetermined tolerance value, the residual resource amount check process returns the return value "−1" to the accessor (step S261), while in the case where the process utilization rate is smaller than the process utilization rate threshold value, on the other hand, the return value "0" is returned to the accessor (S262).

The load check process S189 may be executed by combining the processes illustrated in FIGS. 25 to 28. At the same time, the CPU utilization rate check process, the memory utilization rate check process, the process utilization rate check process and the residual resource amount check process may be executed in that order.

Returning to FIG. 21, assuming that the return value of the load check process is "−1", the servers 11 to 13 transfer the process to step S194, and set the data "device state" in the load balancing information for the target device to "invalid". Also, the value of the data for the target device included in the data "route state of the next lower layer" in the load balancing information for the device which is connected to the target device and which is in next higher layer than the target device is set to "invalid". Further, the value of the data "route state from higher-layer devices" in the load balancing information for the target device is set to "invalid". In the case where the return value of the load check process is "0" in step S190, the servers 11 to 13 transfer the process to step S191. In step S191, it is judged whether the load balancing manner used for the target device is to be changed or not from the round robin or the least connection to the weighting method.

Step S191 executes the process similar to the process of judging whether the load balancing manner is to be changed or not, as illustrated with reference to FIG. 24. In step S220, the servers 11 to 13 increment, by 1, the data "count used for switching to weighting method" (ID=28) (hereinafter referred to simply as the "count" in the description in step S191) in the load balancing information for the target device stored in the storage unit 102. In step S221, the servers 11 to 13 access the data "threshold of count used for switching to weighting method" (ID=29) (hereinafter referred to simply as the "threshold value" in the description of step S191) in the load balancing information for the target device, and compare the count with the threshold value. In the case where the comparison in step S221 indicates that the count exceeds the threshold value, the return value to the accessor is set to "necessary" (step S223). Otherwise, the return value is set to "unnecessary" (step S224).

In step S225, the servers 11 to 13 access the data "count holding time used for switching to weighting method" (ID=27) (hereinafter referred to simply as "holding time" in the description of step S191) in the load balancing information for the target device, and judge whether this holding time has passed from the count start. If it is judged in step S225 that the holding time has passed, the servers 11 to 13 return the value of the "count" to zero in step S226.

In step S192 in FIG. 21, assuming that the return value from the process of step S191 is "unnecessary", the servers 11 to 13 transfer the process to step S195. In the case where the return value is "necessary", on the other hand, the servers 11 to 13 operate in step S193 in such a manner that the load balancing manner of the load balancer in the next higher layer for distributing the processing request to the target device is changed to the weighting method. In the process, the servers 11 to 13 change to the "weighting method" the value of the data "load balancing manner switching" in the load balancing information which is stored in the storage unit 202 and associated with the device in the next higher layer for distributing the processing request to the target device. Also, the value of the data "load balancing manner switching flag" in the load balancing information for the device on the next higher layer is changed from "off" to "on". In step S195, the servers 11 to 13 operate in such a manner that the value of the data for the target device included in the data "route state of the next lower layer" in the load balancing information for the device which is connected to the target device and which is in the next higher layer than the target device is set to "valid". The value of the data "route state from higher-layer devices" in the load balancing information for the target device is set to "valid", and the process is ended.

Figure 29:
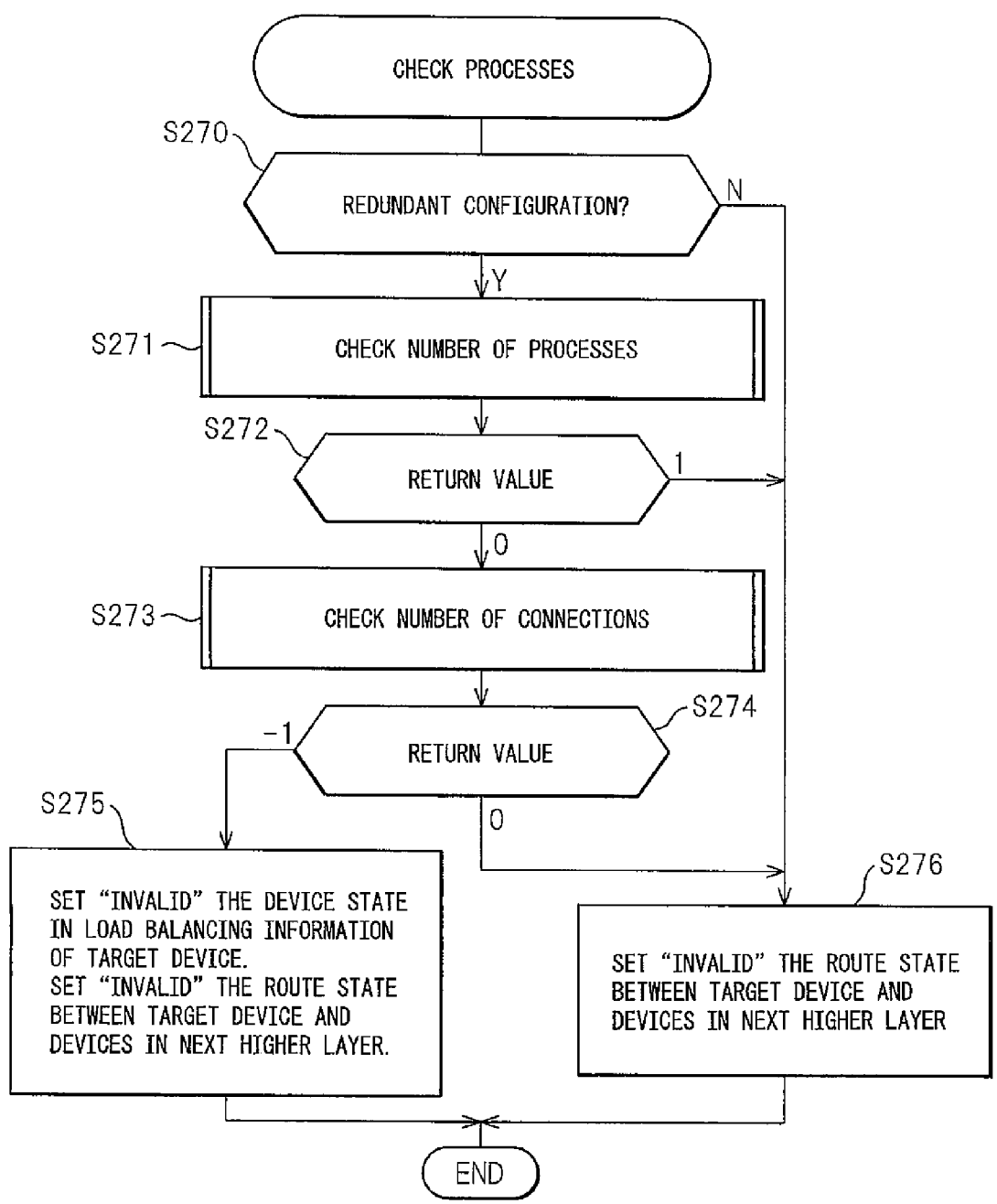
FIG. 29 is a flowchart depicting the check process as a subroutine accessed from the load balancing information correction process depicted in FIG. 19.

FIG. 29 is a flowchart for the check process as a subroutine accessed in step S170 of the load balancing information correction process illustrated in FIG. 19. In the case where the check process is accessed, the fact that the load balancing manner carried out for the target device by the device upstream of the target device is the hash method, etc. results in the processing request distributes being designated in accordance with each processing request. Therefore, only the load state of each server is checked, but the load balancing manner is not changed. In step S270, the servers 11 to 13 access the data "load balancing manner (existing)" (ID=8) in the load balancing information for the target device, and judges whether the distributee of the processing request according to the hash method, etc. has a redundant configuration or not. In the case where the distributee has no redundant configuration, the servers 11 to 13 operate in step S276 in such a manner that the value of the data for the target device included in the data "route state of the next lower layer" in the load balancing information for the device which is connected to the target device and which is in the next higher layer than the target device is set to "valid". The value of the data "route state from higher-layer devices" in the load balancing information for the target device is set to "valid", and the process is ended. In the case where the distributes has a redundant configuration, on the other hand, the servers 11 to 13 execute, in step S271, the processed number check process illustrated with reference to FIG. 22.

In the case where the return value of the processed number check process is "1" in step S272, the servers 11 to 13 execute step S276. In the case where the return value of the processed number check process is "0" in step S272, on the other hand, the servers 11 to 13 transfer the process to step S273. In step S273, the connection number check process illustrated with reference to FIG. 23 is executed.

In the case where the return value of the processed number check process is "0" in step S274, the servers 11 to 13 execute step S276. In the case where the return value of the connection number check process is "−1" in step S274, the servers 11 to 13 transfer the process to step S275, and the value of the data "device state" in the load balancing information for the target device is set to "invalid". Also, the value of the data for the target device included in the data "route state of the next lower layer" in the load balancing information for the device which is connected to the target device and which is in next higher layer than the target device is set to "invalid". Further, the value of the data "route state from higher-layer devices" in the load balancing information for the target device is set to "invalid", and the process is ended. Incidentally, the load balancing control program 104 may be generated in such a manner as to execute the process of step S276 regardless of whether the distributes of the processing request according to the hash method, etc. has a redundant configuration in step S270.

Upon completion of the load balancing information correction process (step S105) illustrated in FIG. 12, the process proceeds to step S106 depicted in FIG. 13. In step S106, the servers 11 to 13 in the highest layer request the lower-layer devices other than those in the lowest layer in the load balancing system 1 to correct the load balancing information stored in the storage units 202 and 302, respectively. In the process, it is not necessary for the servers 11 to 13 to send the load balancing information correction request to all the lower-layer devices. The servers 11 to 13 may send the load balancing information correction request only to the devices which needs to correct the load balancing information stored in the devices themselves as a result of the correction of the load balancing information stored in the highest-layer servers 11 to 13 in steps S104 and S105. The load balancing control program 104 to be executed on the servers 11 to 13 causes the servers 11 to 13 to execute the process of transmitting, to each device, the load balancing information correction request containing the load balancing information for the lower-layer devices which are stored in the storage units 102 of the servers 11 to 13 and changed by steps S104 and S105.

An example of the data structure of the load balancing information correction request transmitted from the servers 11 to 13 to the lower-layer devices is illustrated in FIG. 30. The type data indicating that the transmitted data is the load balancing information correction request is input to the data "request type", so that the data having the IDs of "1" to "10", "16" to "18", "20", "22", "24", "26" to "40 are validated. The data having the IDs of "33" to "40" transmitted to the lowest-layer servers 51 to 59, however, are invalidated.

The load balancing information included in the load balancing information correction request transmitted from the servers 11 to 13 to each lower-layer device and the balancing information held in the storage unit 202 or 203 of the lower-layer device i.e. the transmittee of the request, are related to same device. Specifically, the load balancing information correction request transmitted to the servers 51 to 59 in the lowest layer includes only the load balancing information for the transmittee 51 to 59 itself. The load balancing information correction request transmitted to the intermediate-layer servers 31 to 39 and the load balancers 21, 41 to 43 includes, in addition to the load balancing information for the transmittee device 31 to 39, 21, 41 to 43 itself, the load balancing information for the device which is connected to the transmittee device and which is in next lower layer than the transmittee device.

The control program 204 executed on the servers 31 to 39, 51 to 59 causes these servers to execute the process of receiving the load balancing information correction request from the servers 11 to 13 and the process of updating the value of the load balancing information 205 stored in the storage unit 202 to the value held in the load balancing information included in the load balancing information correction request. Further, the control program 204, in accordance with this load balancing information, causes the servers 31 to 39 to execute the process of transmitting the processing request received from the higher-layer devices to the devices in the next lower layer. In the servers 31 to 39, 51 to 59, as described above, the value of the load balancing information 205 stored in the storage unit 202 is updated to the value held in the load balancing information transmitted from the severs 11 to 13 in the highest layer, so that the load balancing information held in these servers 31 to 39, 51 to 59 are matched with the load balancing information held in the servers 11 to 13 in the highest layer.

The servers 31 to 39, in transmitting the processing request to the devices in the next lower layer, access the data "route state of the next lower layer" in the load balancing information. In the case where the device X included in the devices in the next lower layer has no valid path capable of transmitting the processing request to the servers 51 to 59 at the tail end, the processing request is not transmitted to the device X by the servers 31 to 39.

The load balancing program 305 executed by the load balancers 21, 41 to 43 causes these load balancers to execute the process of receiving the load balancing information correction request from the servers 11 to 13, the process of updating the value of the load balancing information 306 stored in the storage unit 302 to the value held in the load balancing information included in the load balancing information correction request and the process of distributing, in accordance with this load balancing information, the processing request received from the higher-layer devices to the devices in the next lower layer. In the load balancers 21, 41 to 43, as described above, the value of the load balancing information 306 stored in the storage unit 302 is updated to the value held in the load balancing information transmitted from the severs 11 to 13 in the highest layer, so that the load balancing information held in these load balancers 21, 41 to 43 are matched with the load balancing information held in the servers 11 to 13 in the highest layer.

The load balancers 21, 41 to 43, in distributing the processing request to the devices in the next lower layer, access the data "route state of the next lower layer" in the load balancing information. In the case where the device X included in the devices in the next lower layer has no valid path capable of transmitting the processing request to the servers 51 to 59 at the tail end, the processing request is not distributed to the device X by the load balancers 21, 41 to 43.

As described above, the load balancing information correction request transmitted to the lower-layer devices from the servers 11 to 13 includes the information for determining the advisability of transmission of the processing request to the lower-layer devices in accordance with the presence or absence of an valid path leading from a given lower-layer device to the tail end downstream thereof. Therefore, the load balancing information correction request may be an example of the advisability notice described in the claims. Also, the CPU 101 which executes the load balancing program 104 causing the servers 11 to 13 to execute the process of transmitting the load balancing information correction request and the communication interface 103 of the servers 11 to 13 may be an example of the transmission advisability notification unit described in the claims. In similar fashion, the CPU 301 which executes the load balancing program 305 on the load balancers 21, 41 to 43 may be an example of the load distributing unit described in the claims, and the CPU 301 which executes the load balancing program 305 and the communication interface 303 of the load balancers 21, 41 to 43 may be an example of the advisability notice receiving unit described in the claims.

Also, the load balancers 21, 41 to 43, in distributing the processing request to the devices in the next lower layer, access the data "load balancing manner switching flag" (ID=9) in the load balancing information. If the value of the data "load balancing manner switching flag" in the load balancing information for a given load balancer is "on", i.e. if the given load balancer is notified from the servers 11 to 13 that that the load balancing manner for the given load balancer is to be switched, then the given load balancer changes the load balancing manner to the one indicated by the data "load balancing manner switching" (ID=10) in the load balancing information.

As described above, the load balancing information correction request transmitted from the servers 11 to 13 to the lower-layer devices includes the information for notifying the load balancer of the load balancing manner changed by the servers 11 to 13. The load balancing information correction request, therefore, may be an example of the load balancing manner change notice described in the claims. Also, the CPU 103 which executes the load balancing control program 104 causing the servers 11 to 13 to execute the process of transmitting the load balancing information correction request and the communication interface 103 of the servers 11 to 13 may be an example of the load balancing manner notification unit described in the claims. In similar fashion, the CPU 301 which executes the load balancing program 305 and the communication interface 303 of the load balancers 21, 41 to 43 may be an example of the load balancing manner change notice receiving unit described in the claims.

The lower-layer device, upon reception of the load balancing information correction request and complete updating of the load balancing information stored in itself, transmits the load balancing information correction completion notice to the servers 11 to 13. The content of the load balancing information correction completion notice is identical with the content of the load balancing information correction except that the data "request type" is the type data indicating that the transmitted data is the load balancing information correction completion notice. The load balancing system 1 periodically repeats steps S102 to S106 after start completion thereof.

Figure 32:
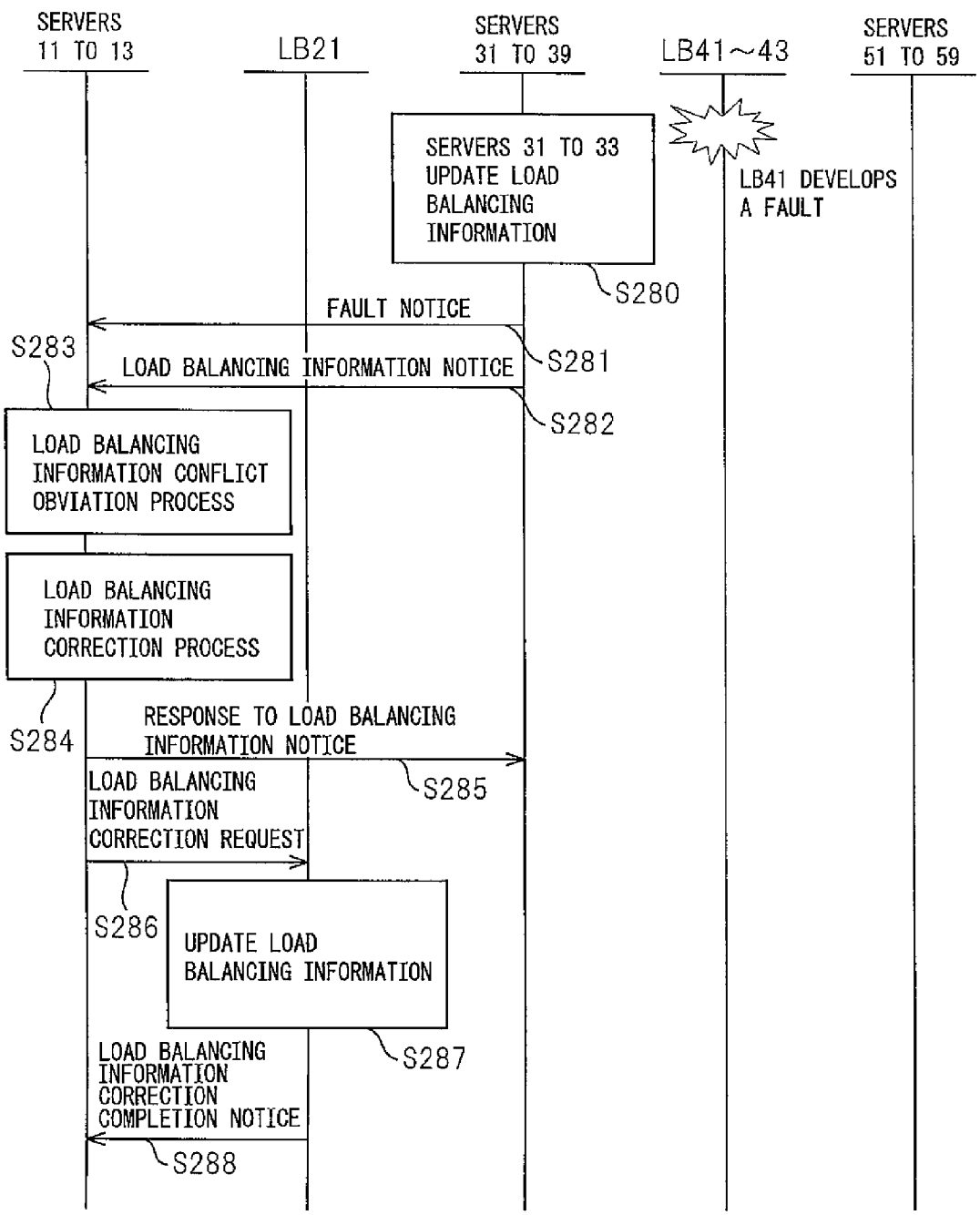
FIG. 32 is a diagram (No. 1) depicting the sequence at the time of fault occurrence in the hierarchical load balancing system depicted in FIG. 4.
Figure 33:
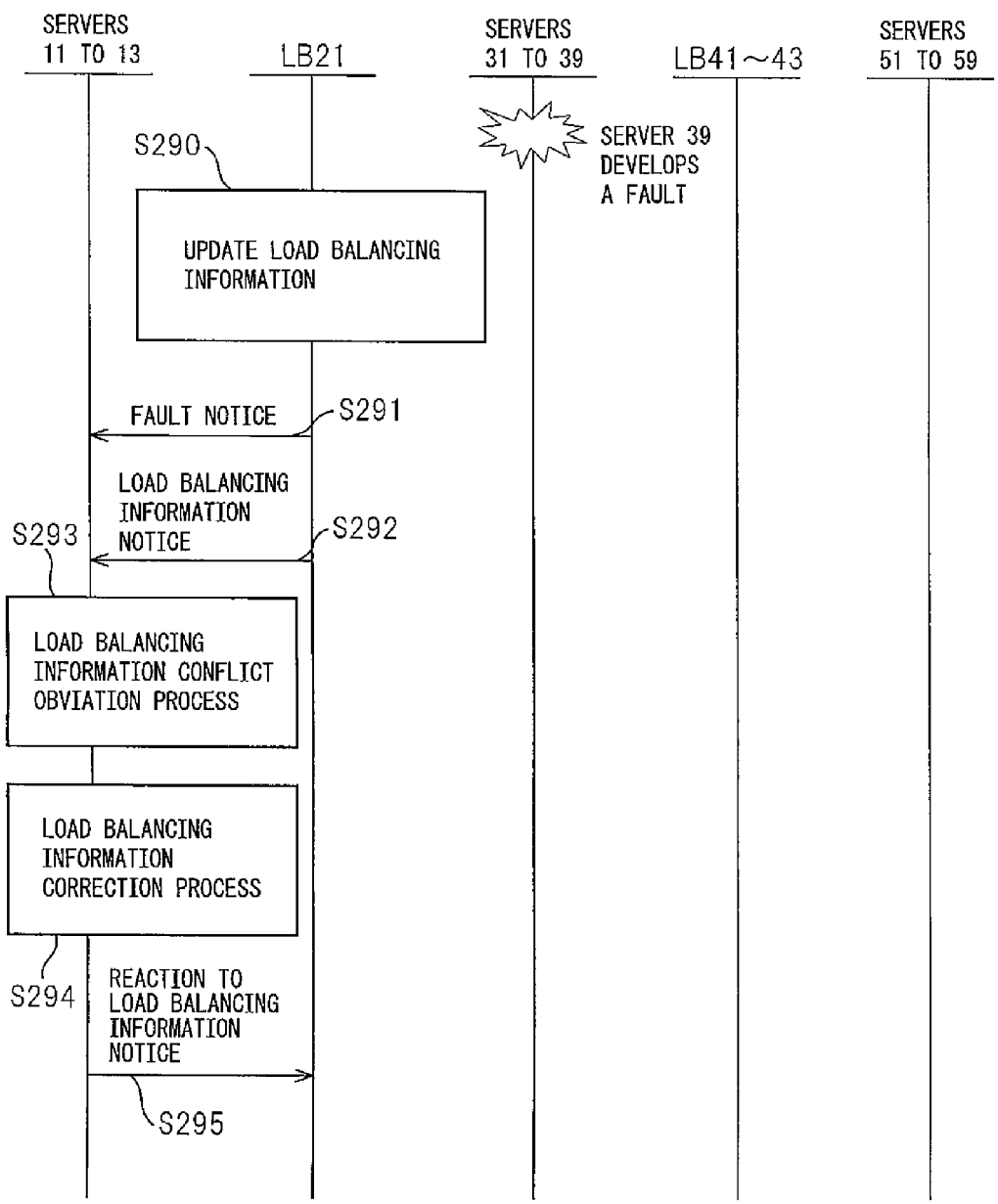
FIG. 33 is a diagram (No. 2) depicting the sequence at the time of fault occurrence in the hierarchical load balancing system depicted in FIG. 4.

Now, the operation performed at the time of fault occurrence and the restoration of the fault in the load balancing system 1 depicted in FIG. 4 are illustrated. FIG. 31 is a diagram depicting the state in which a fault has occurred in the load balancing system 1 depicted in FIG. 4, and the state in which the third-layer server 39 has also developed a fault after the fault occurrence in the fourth-layer load balancer 41. FIGS. 32 and 33 are diagrams depicting the sequence at the time of fault occurrence in the load balancing system 1 illustrated in FIG. 4.

In the case where a fault occurs in the load balancer 41, the response signal from the load balancer 41 dies out, and therefore, in step S280, the servers 31 to 33 in the next higher layer to transmit the processing request to the load balancer 41 detects the fault occurrence in the load balancer 41. The control program 204 operating on the servers 31 to 33 causes the servers 31 to 33 to execute the process of changing the value of the data "device state" in the load balancing information for the load balancer 41 stored in the storage unit 202 to "fault", and the process of setting the value of the data for the load balancer 41 included in the data "route state of the next lower layer" in the load balancing information for the servers 31 to 34 themselves to "invalid".

After that, the control program 204 causes, in step S281, the servers 31 to 33 to execute the process of notifying the highest-layer servers 11 to 13 that the load balancer 41 has developed a fault, and also causes, in step S282, the servers 31 to 33 to execute the process of transmitting the load balancing information for the servers 31 to 33 themselves and the load balancer 41 to the highest-layer servers 11 to 13. FIG. 34 depicts an example of the data structure to notify a fault. The type data indicating that the data is a fault notice is set in the "request type", and all the data having the ID=1 to 40 become valid data. However, the data having the ID=33 to 40 transmitted from the servers 51 to 59 in the lowest layer become invalid data. Also, the data structure of the load balancing information notice is similar to the structure of the reply data of the load balancing information depicted in FIG. 16, and the type data indicating that the data is the load balancing information notice is set in the "request type".

The load balancing control program 104 executed on the servers 11 to 13 causes the servers 11 to 13 to execute the process of receiving the loading balancing information notice from the servers 31 to 33, and the process of updating the value of the load balancing information stored in the storage unit 102 to the value held in the received load balancing information. Then, the load balancing program 104 causes, in step S283, the servers 11 to 13 to execute the load balancing information conflict obviation process illustrated in FIG. 17. As a result, the value of the data "route state from higher-layer devices" in the load balancing information which are stored in the storage unit 102 and associated with the servers 51 to 53 connected to and arranged downstream of the load balancer 41 that has developed a fault is changed to "invalid".

Also, the load balancing control program 104 causes the servers 11 to 13, in step S284, to execute the load balancing information correction process illustrated in FIG. 19. As a result, of all the load balancing information stored in the storage unit 102, the value of the data "route state of next lower layer" in the load balancing information stored in the storage unit 102 and associated with the servers 31 to 33 transmitting the processing request to the load balancer 41 is changed to "invalid". Also, since the servers 31 to 33 have no path to the lower layers other than the load balancer 41, the value indicating the route state to the servers 31 to 33 included in the data "route state of next lower layer" in the load balancing information for the load balancer 21 one layer higher than the servers 31 to 33 is changed to "invalid", and the value of the data "route state from higher-layer devices" in the load balancing information for the servers 31 to 33 is also changed to "invalid".

The load balancing control program 104 causes, in step S285, the servers 11 to 13 to execute the process of transmitting the response to the load balancing information notice to the servers 31 to 33. Then, in step S286, the load balancing control program 104 causes the servers 11 to 13 to execute the process of transmitting the load balancing information correction request to the load balancer 21, among lower-layer devices with the load balancing information corrected by steps S282 to S284, which is indicated as being having a valid route from higher-layer devices by the data "route state from higher-layer devices" in the load balancing information. This load balancing information correction request includes the load balancing information.

The load balancing program 305 executed on the load balancer 21 causes the load balancer 21 to execute the process of receiving the load balancing information correction request from the servers 11 to 13 and the process of updating the value of the load balancing information 306 stored in the storage unit 302 to the value held in the load balancing information contained in the load balancing information correction request (step S287). After that, the load balancing program 305 causes the load balancer 21 to execute the process of distributing the processing request received from the higher-layer devices to the devices in the next lower layer in accordance with the updated load balancing information. The load balancer 21, in distributing the processing request to the servers 31 to 39 in the next lower layer, accesses the data "route state of next lower layer" in the load balancing information. Then, the load balancer 21 transmits no processing request to the server among the servers 31 to 39 which has no valid path capable of transmitting the processing request to the tail-end servers 51 to 59. The load balancer 41, upon reception of the load balancing information correction request and completion of updating the load balancing information stored therein, transmits the load balancing information correction completion notice to the servers 11 to 13 in step S288.

In FIG. 33, assume that the server 39 develops a fault. The response signal from the server 39 dies out, and therefore, the load balancer 21 in the next higher layer for distributing the processing request to the server 39 detects the occurrence of a fault in the server 39. The load balancing program 305 operating on the balancer 21 causes the load balancer 21 to execute the process of changing to "fault" the value of the data "device state" in the load balancing information for the server 39 stored in the storage unit 302 and the process of setting the data to "invalid" for the server 39 included in the data "route state of next lower layer" in the load balancing information for the load balancer 21 itself.

After that, the load balancing program 305 causes, in step S291, the load balancer 21 to execute the process of notifying the occurrence of a fault in the server 39 to the servers 11 to 13 in the highest layer, and causes, in step S292, the load balancer 21 to transmit the load balancing information for the load balancer 21 itself and the server 39 to the servers 11 to 13 in the highest layer.

The load balancing control program 104 executed on the servers 11 to 13 causes the servers 11 to 13 to execute the process of receiving the load balancing information notice from the load balancer 21 and the process of updating the value of the load balancing information stored in the storage unit 102 to the value held in the received load balancing information. Then, the load balancing control program 104 causes, in step S293, servers 11 to 13 to execute the load balancing information conflict obviation process illustrated in FIG. 17.

The load balancing control program 104 causes, in step S294, the servers 11 to 13 to execute the load balancing information correction process illustrated in FIG. 19. As a result, of all the load balancing information stored in the storage unit 102, the value for the server 39 included in the data "route state of next lower layer" in the load balancing information for the load balancer 21 transmitting the processing request to the server 39 is changed to "invalid". In the process, the load balancer 21 has a path also to the lower layers other than the server 39. Therefore, the data "route state of next lower layer" in the load balancing information for the servers 11 to 13 one layer higher than the load balance 21 and the data in the load balancing information for the load balancer 21 are not changed. The load balancing control program 104 causes, in step S295, the servers 11 to 13 to execute the process of transmitting the response to the load balancing information notice to the servers 31 to 33. After that, the load balancer 21, in distributing the processing request to the servers 31 to 39 in the next lower layer, accesses the data "route state of next lower layer" in the load balancing information. The value of the data "route state of next lower layer" for the server 39 is "invalid", and therefore, the load balancer 21 transmits no processing request to the server 39.

Figure 35:
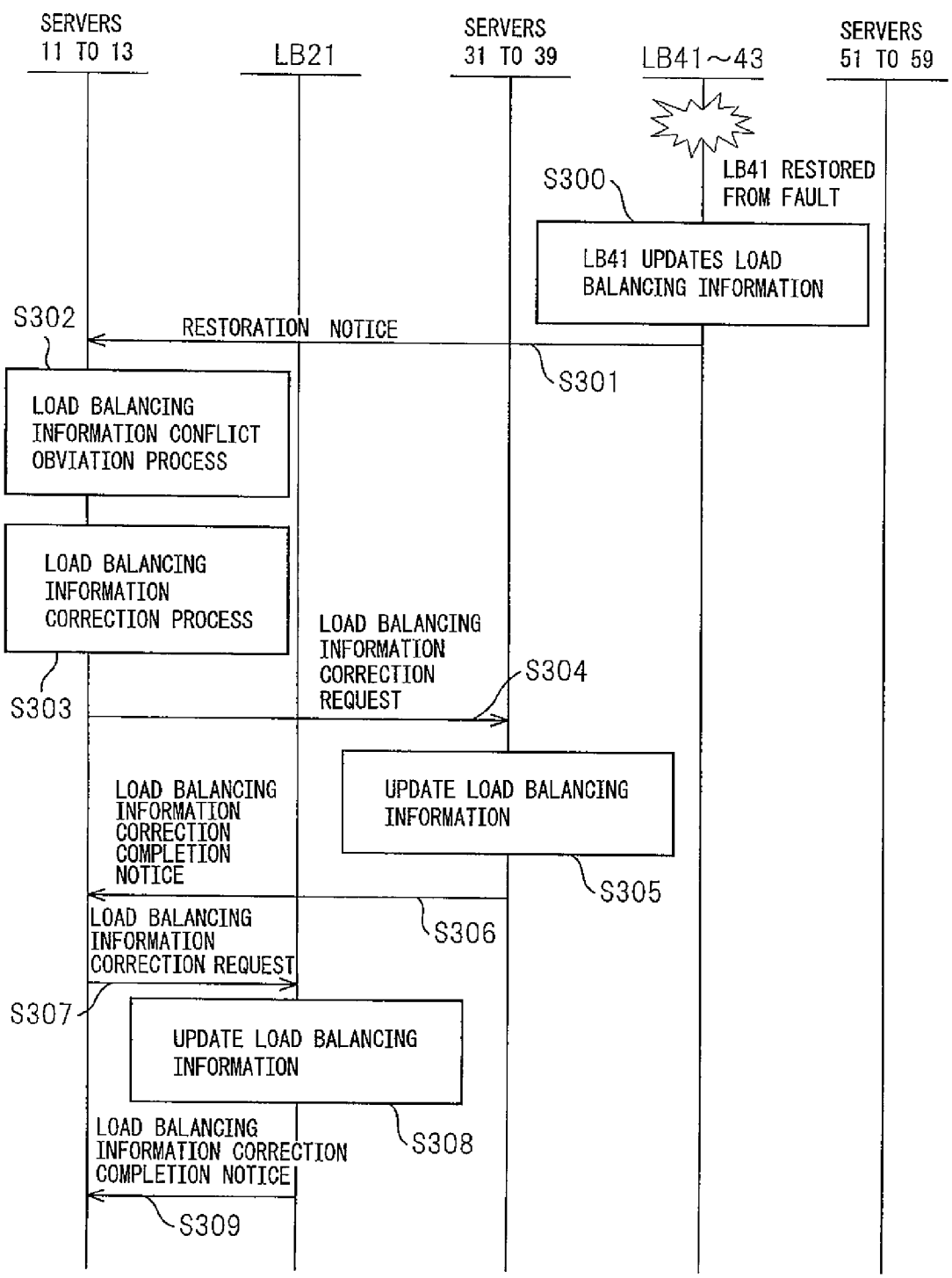
FIG. 35 is a diagram (No. 1) depicting the sequence at the time of restoration from a fault in the hierarchical load balancing system depicted in FIG. 4.
Figure 36:
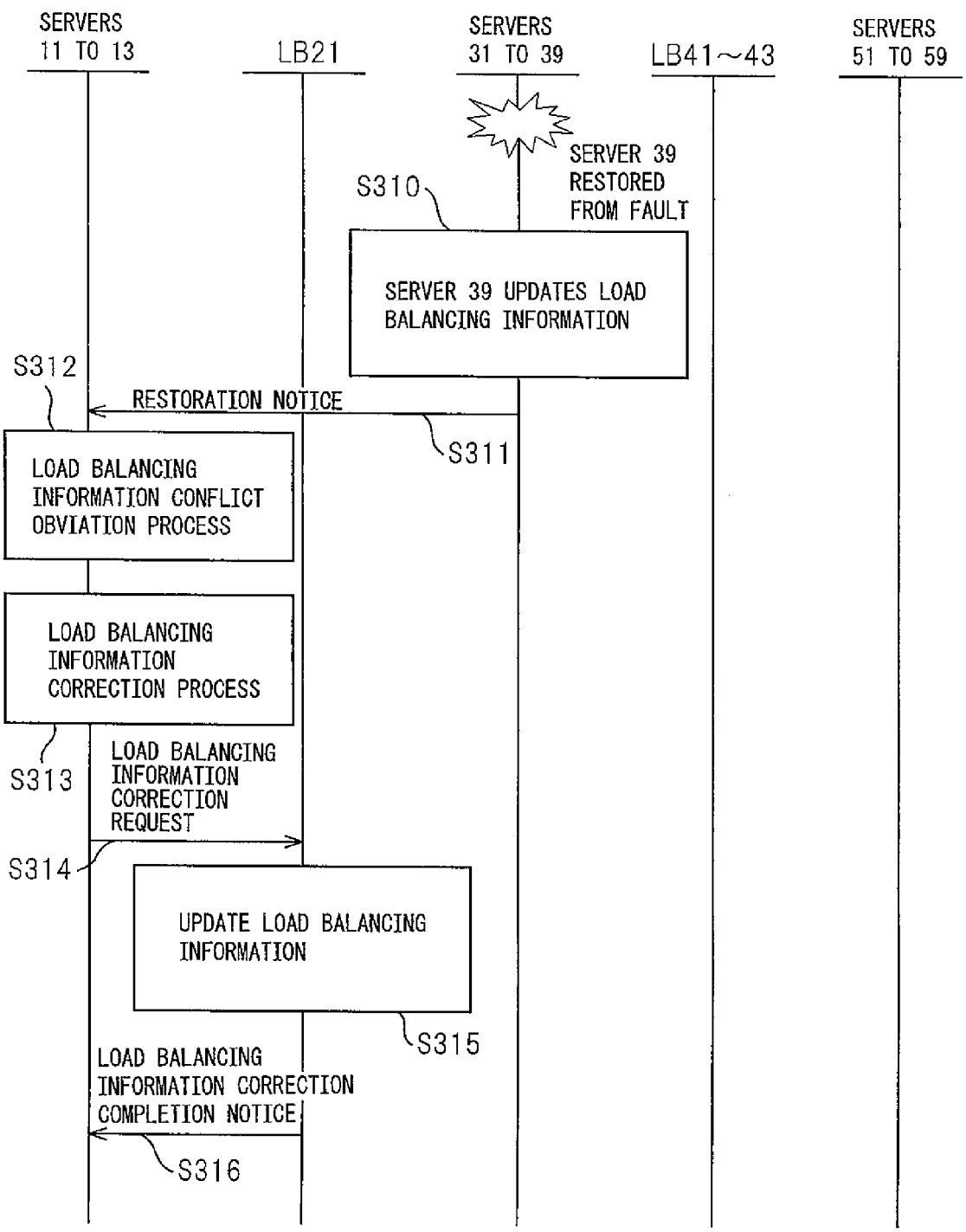
FIG. 36 is a diagram (No. 2) depicting the sequence at the time of restoration from a fault in the hierarchical load balancing system depicted in FIG. 4.

FIGS. 35 and 36 are diagrams depicting the sequence for restoration from a fault in the load balancing system 1 illustrated in FIG. 4. In FIG. 35, upon restoration of the load balancer 41 from a fault, the load balancing control program 305 executed on the load balancer 41 causes, in step S300, the load balancer 41 to execute the process of setting to "normal" the data "device state" in the load balancing information for the load balancer 41 stored in the storage unit 302 and the process of setting to "valid" the value of the data "route state from higher-layer devices" in the load balancing information for the servers 51 to 53 stored in the storage unit 302.

After that, the load balancing program 305 causes, in step S301, the load balancer 41 to execute the process of transmitting the restoration notice that the load balancer 41 has been restored, to the servers 11 to 13 in the highest layer. The restoration notice includes the load balancing information for the load balancer 41 and the servers 51 to 53 changed in step S300 by the load balancer 41. FIG. 37 illustrates an example of the data structure of the restoration notice. The type data indicating that this data is the restoration notice is set in "request type", and all the data having IDs=1 to 40 become valid data. However, the data having IDs=33 to 40 transmitted from the servers 51 to 59 in the lowest layer become invalid data.

The load balancing control program 104 executed on the servers 11 to 13 causes the servers 11 to 13 to execute the process of receiving the restoration notice from the load balancer 41 and the process of updating the value of load balancing information stored in the storage unit 102 to the value held in the load balancing information received. Then, the load balancing control program 104 causes, in step S302, the servers 11 to 13 to execute the load balancing information conflict obviation process illustrated in FIG. 17. As a result, the conflict of the load balancing information stored in the storage unit 102 which is caused by the change in the load balancing information due to the restoration of the load balancer 41 is obviated. After that, the load balancing control program 104 causes, in step S303, the servers 11 to 13 to execute the load balancing information correction process illustrated in FIG. 19. As a result, of all the load balancing information stored in the storage unit 102, the value of the data "route state of next lower layer" in the load balancing information for the servers 31 to 33 transmitting the processing request to the load balancer 41 is changed to "valid". Also, the value of the data for the servers 31 to 33 included in the data "route state of next lower layer" in the load balancing information for the load balancer 21 in the next higher layer than the servers 31 to 33 is changed to "valid". The value of the data "route state from higher-layer devices" in the load balancing information for the servers 31 to 33 is also changed to "valid".

The load balancing control program 104 causes, in step 304, the servers 11 to 13 to execute the process of transmitting the load balancing information correction request to the servers 31 to 33, among the lower-layer devices with the load balancing information corrected by the process of steps S301 to S303, which is indicated as being having a valid route from higher-layer devices by the data "route state from higher-layer devices" in the load balancing information. This load balancing information correction request includes the load balancing information. The load balancing control program 204 executed on the servers 31 to 33 causes the servers 31 to 33 to execute the process of receiving the load balancing information correction request from the servers 11 to 13, and the process of updating the value of the load balancing information 205 stored in the storage unit 202 to the value held in the load balancing information included in the load balancing information correction request (step S305). After that, the control program 204, in accordance with the updated load balancing information, causes the servers 31 to 33 to execute the process of distributing the processing request received from the servers 11 to 13 to the servers 51 to 53. After that, the servers 31 to 33, in transmitting the processing request to the load balancer 41 in the next lower layer, access the data "route state of next lower layer" in the load balancing information. The value of this data has been changed to "valid" by the servers 11 to 13, and therefore, the servers 31 to 33 restart the distribution of the processing request to the servers 51 to 53. The servers 31 to 33, in step S356, transmit the load balancing information correction completion notice to the servers 11 to 13.

In step S307, the load balancing control program 104 causes the servers 11 to 13 to execute the process of transmitting the load balancing information correction request to the load balancer 21, among the lower-layer devices with the load balancing information corrected by steps S302 and S303, which is indicated as being having a valid route from higher-layer devices by the data "route state from higher-layer devices" in the load balancing information. This load balancing information correction request includes the load balancing information. The load balancing program 305 executed on the load balancer 21 causes the load balancer 21 to execute the process of receiving the load balancing information correction request from the servers 11 to 13 and the process of updating the value of the load balancing information 306 stored in the storage unit 302 to the value held in the load balancing information contained in the load balancing information correction request (step S308). After that, the load balancing program 305 causes the load balancer 21 to execute the process of transmitting the processing request received from the higher-layer devices to the devices in the next lower layer in accordance with the updated load balancing information. The load balancer 21, in transmitting the processing request to the servers 31 to 39 in the next lower layer, accesses the data "route state of next lower layer" in the load balancing information. Since the value of the data for the servers 31 to 33 has been changed to "valid", the load balancer 21 restarts the transmission of the processing request to the servers 31 to 33. After that, the load balancer 21 transmits the load balancing information correction completion notice to the servers 11 to 13 in step S309.

In FIG. 36, upon restoration of the server 39 from a fault, the control program 204 executed on the server 39 causes, in step S310, the server 39 to execute the process of setting to "normal" the value of the data "device state" in the load balancing information for the server 39 stored in the storage unit 202, and the process of setting to "valid" the value of the data "route state from higher-layer devices" in the load balancing information for the load balancer 41 stored in the storage unit 202.

After that, the control program 204 causes, in step S311, the server 39 to execute the process of transmitting the restoration notice notifying the restoration of the server 39 to the servers 11 to 13 in the highest layer. The restoration notice includes the load balancing information for the load balancer 41 and the server 39 changed in step S310 by the server 39. The load balancing control program 104 executed on the servers 11 to 13 causes the servers 11 to 13 to execute the process of receiving the restoration notice from the server 39 and the process of updating the value of the load balancing information stored in the storage unit 102 to the value held in the received load balancing information. Then, the load balancing control program 104 causes, in step S312, the servers 11 to 13 to execute the load balancing information conflict obviation process illustrated in FIG. 17. As a result, the conflict of the load balancing information stored in the storage unit 102, which is caused by the change in the load balancing information due to the restoration of the server 39, is obviated. After that, the load balancing control program 104 causes, in step S313, the servers 11 to 13 to execute the load balancing information correction process illustrated in FIG. 19. As a result, of all the load balancing information stored in the storage unit 102, the value of the data for the server 39 included in the data "route state of next lower layer" in the load balancing information for the load balancer 21 distributing the processing request to the server 39 is changed to "valid".

In step S314, the load balancing control program 104 causes the servers 11 to 13 to execute the process of transmitting the load balancing information correction request to the load balancer 21, among the lower-layer devices with the load balancing information corrected by the process of steps S311 to S313, which is indicated as being having a valid route from higher-layer devices by the data "route state from higher-layer devices" in the load balancing information. This load balancing information correction request includes the load balancing information. The load balancing control program 305 executed on the load balancer 21 causes the load balancer 21 to execute the process of receiving the load balancing information correction request from the servers 11 to 13 and the process of updating the value of the load balancing information 306 stored in the storage unit 302 to the value held in the load balancing information included in the load balancing information correction request (step S315). Also, after that, the load balancing control program 305 causes the load balancer 21 to execute the process of distributing the processing request received from the higher-layer devices to the devices in the next lower layer in accordance with the updated load balancing information. The load balancer 21, in transmitting the processing request to the servers 31 to 39 in the next lower layer, accesses the data "route state of next lower layer" in the load balancing information. Of this information, the value of the data for the server 39 is changed to "valid" by the servers 11 to 13, and therefore, the load balancer 21 restarts the transmission of the processing request to the server 39. Then, in step S316, the load balancer 21 transmits the load balancing information correction completion notice to the servers 11 to 13.

Figure 38:
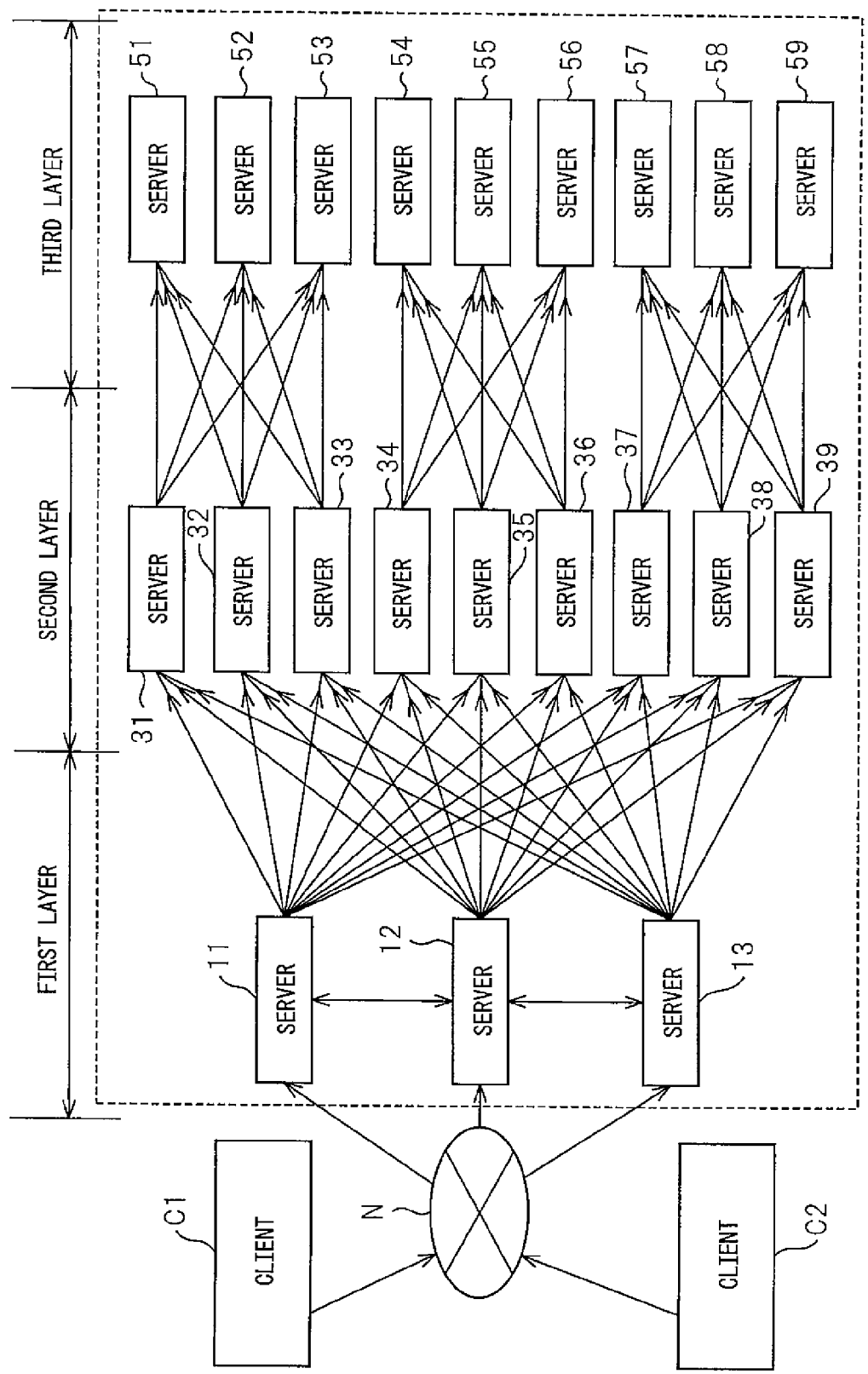
FIG. 38 is a diagram depicting a configuration of the hierarchical load balancing system according to a second embodiment.

FIG. 38 is a diagram depicting a configuration of the hierarchical load balancing system 1 according to a second embodiment. In this configuration example, the load balancing process is executed by a load balancing application operating on the server. The servers 11 to 13 in the highest layer (first layer) accept the processing request from the clients C1 and C2. The servers 11 to 13, by the load balancing application program executed thereon, distribute the received processing request to the servers 31 to 39 arranged in the next lower layer (second layer). The load balancing process by the load balancing application program is executed in accordance with one of the various load balancing manners corresponding to the prevailing situation.

The servers 31 to 33 arranged in the second layer, by the load balancing application program executed thereon, distribute the received processing request to the servers 51 to 53 arranged in the next lower layer (third layer). Similarly, the servers 34 to 36 distribute the received processing request to the servers 54 to 56, and the servers 37 to 39 distribute the received processing request to the servers 57 to 59. These processing requests are processed by the servers 51 to 59 at the tail end.

Figure 39:
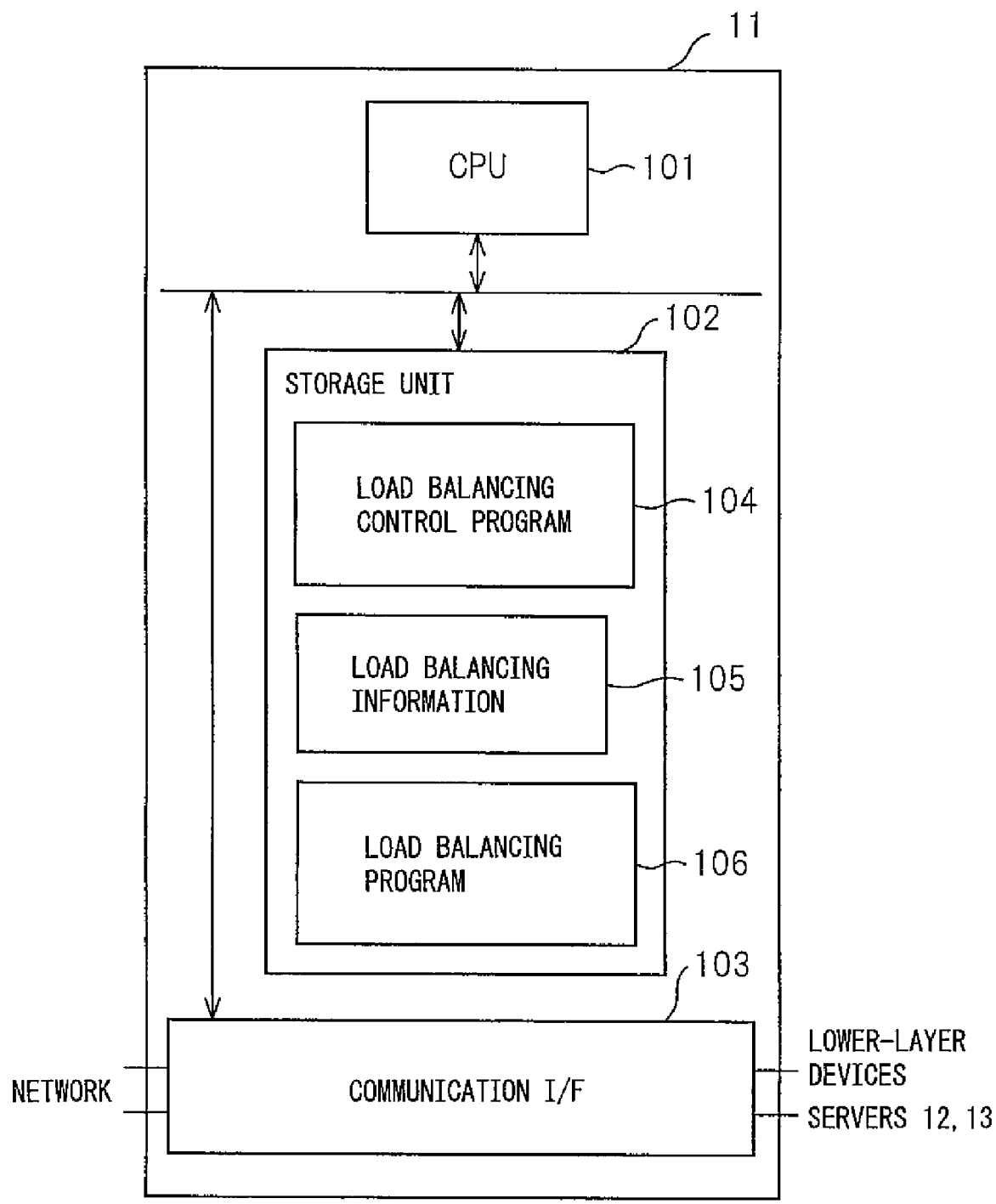
FIG. 39 is a diagram depicting a configuration of a server arranged in the highest layer in the hierarchical load balancing system depicted in FIG. 38.

FIG. 39 is a diagram illustrating a configuration of the server 11 arranged in the highest layer of the load balancing system depicted in FIG. 38. The configuration of the servers 12 and 13 is similar to that of the server 11. The server 11 configured this way has a similar configuration to the server depicted in FIG. 5. The same component elements are designated by the same reference numerals, respectively, and not illustrated again. The storage unit 102 has a load balancing program 106 as an application program causing the CPU 101 to execute the load balancing process for distributing the processing request received through the communication interface 103 to the lower-layer servers 31 to 39 connected to the server 11. The server 11 receives, through the communication interface 103, the processing request issued by the clients C1 and C2, distributes the received processing request to the lower-layer servers 31 to 39, and transmits the distributed processing request to each of the servers 31 to 39 through the communication interface 103. Also, the load balancing information 105 stored in the storage units 102 of the servers 11 to 13 contains the load balancing information for all the servers 11 to 13, 31 to 39 and 51 to 59 included in the load balancing system 1.

Figure 40:
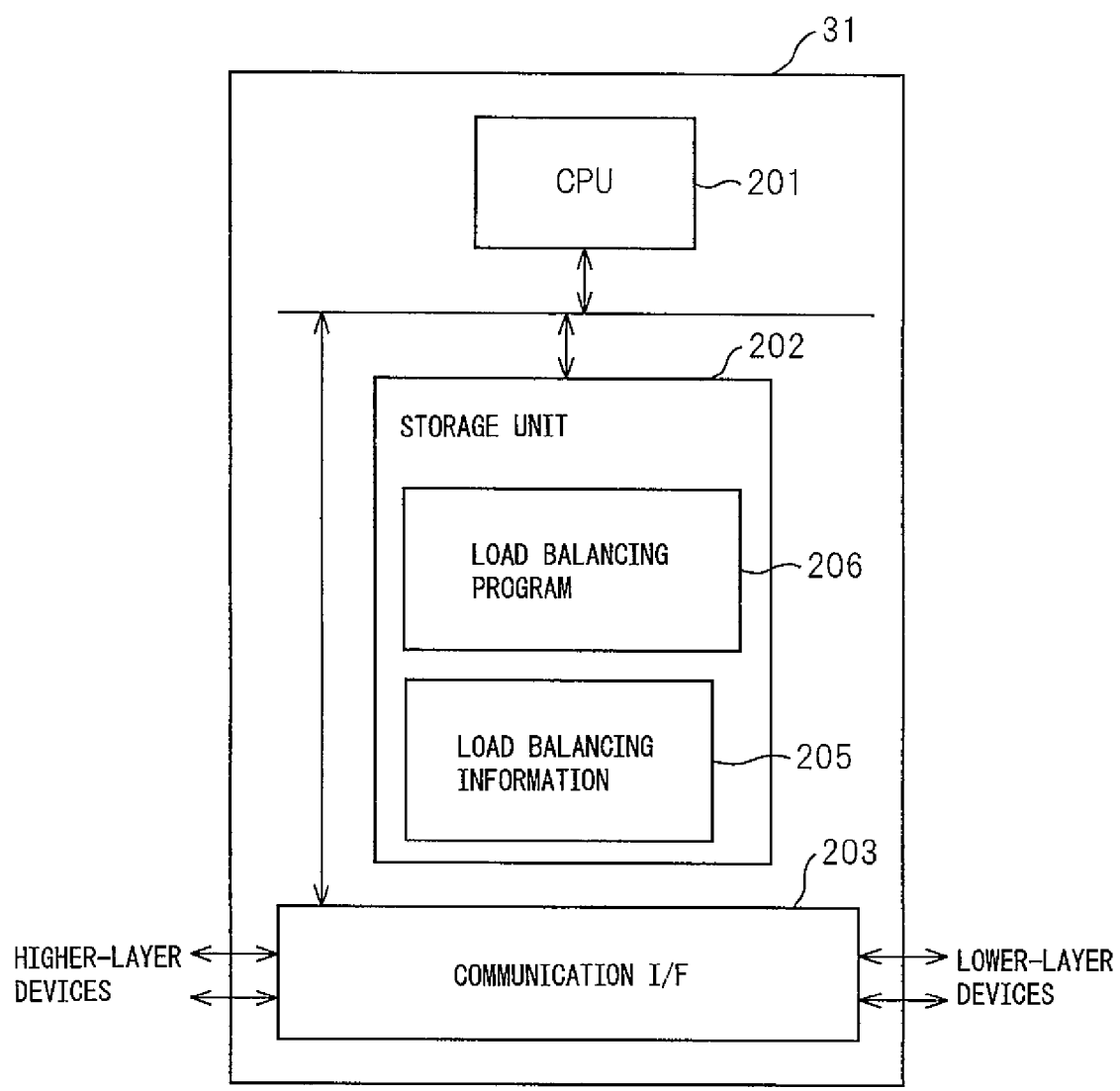
FIG. 40 is a diagram depicting a configuration of a server arranged in the intermediate layer or the low layer in the hierarchical load balancing system depicted in FIG. 38.

FIG. 40 is a diagram depicting a configuration of the server 31 arranged in the intermediate layer or the lower layer of the load balancing system illustrated in FIG. 38. The configuration of the servers 32 to 39 is also similar to that of the server 31. The server 31 configured this way has a similar configuration to the server illustrated in FIG. 6. The same component elements are designated by the same reference numerals, respectively, and not illustrated. The storage unit 202 has the load balancing program 206 as an application program causing the CPU 201 to execute the load balancing process for distributing the processing request received through the communication interface 203, to the lower-layer servers 51 to 53 connected to the server 31. The server 31 receives, through the communication interface 103, the processing request transmitted from the servers 11 to 13, distributes the received processing request to the lower-layer servers 51 to 59, and transmits the distributed processing request to each of the servers 51 to 59 through the communication interface 203.

Also, the load balancing information 205 stored in the storage unit 202 of the servers 31 to 39 arranged in the intermediate layer contains the load balancing information for the target device, i.e. each of the servers 31 to 39 itself, and the load balancing information for the devices which are connected to the target device and which are in next lower layer than the target device. For example, the load balancing information 205 stored in the storage unit 202 of the servers 31 to 39 contains the load balancing information for the servers 31 and 51 to 53. Also, the servers 51 to 59 in the lowest layer have a similar configuration to the one illustrated with reference to FIG. 6. In the following description of the load balancing system 1 according to the second embodiment, the servers 31 to 39, 51 to 59 may be collectively referred to as the "lower-layer devices".

Figure 41:
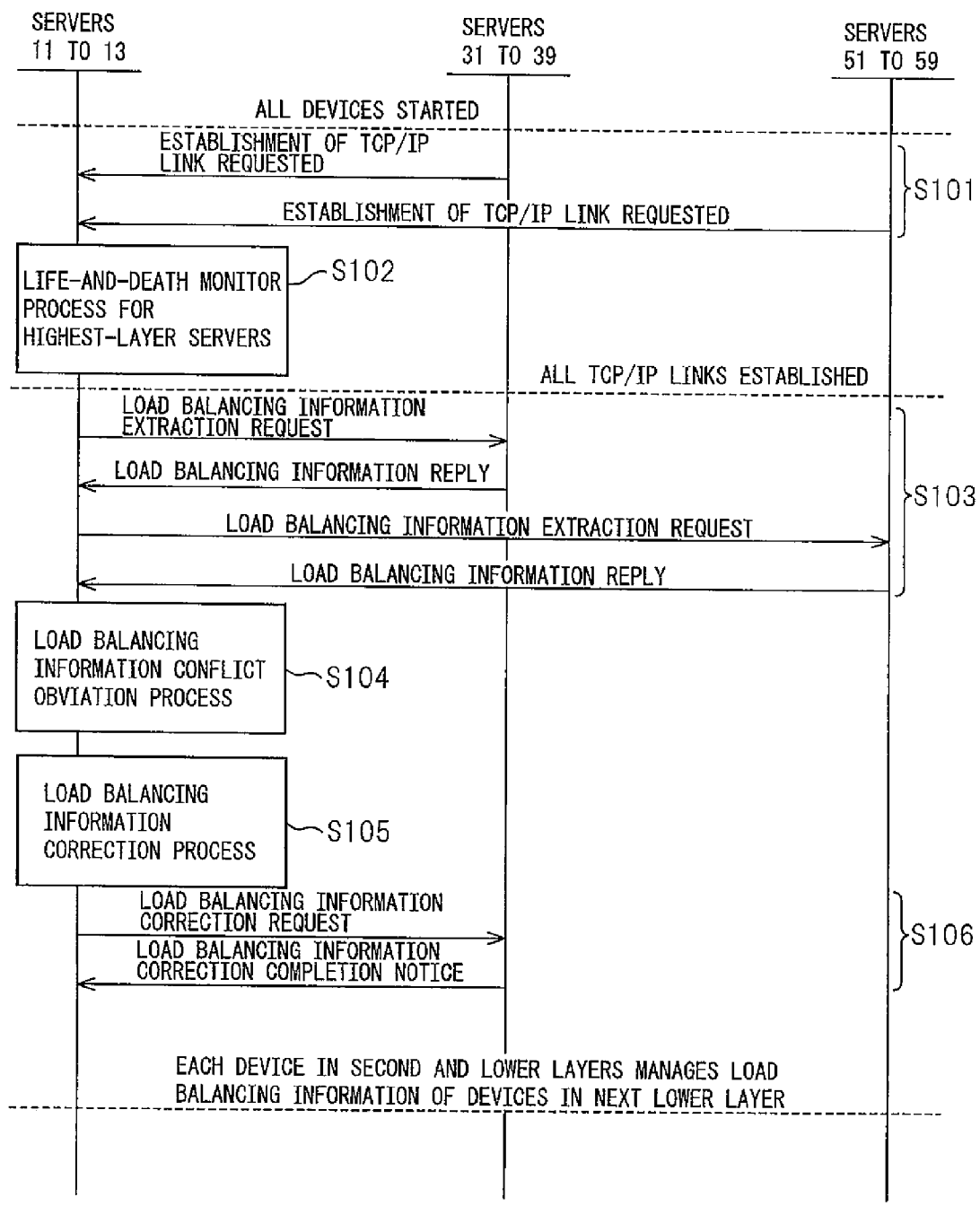
FIG. 41 is a diagram depicting the sequence for starting the hierarchical load balancing system depicted in FIG. 38.

FIG. 41 is a diagram illustrating the starting sequence of the load balancing system depicted in FIG. 38. The lower-layer devices, by requesting the highest-layer servers 11 to 13 to establish the TCP/IP link, establish the TCP/IP link with the highest-layer servers 11 to 13 (step S101). In step S102, each of the highest-layer servers 11 to 13 executes the life-and-death monitor process for the highest-layer servers illustrated with reference to FIG. 14. Once the advisability of connection by the TCP/IP link between the highest-layer servers 11 to 13 and all the lower-layer devices is determined, in step S103, the load balancing control program 104 causes servers 11 to 13 to execute, like in the starting sequence illustrated in FIG. 11, the process of collecting the load balancing information for all the devices in the load balancing system 1.

The load balancing program 206 operating on each of the servers 31 to 39, upon reception of the load balancing information extraction request, causes each server to execute the process of returning, to the highest-layer servers 11 to 13, the load balancing information for each of the servers 31 to 39 stored in the storage unit 202 thereof. In the process, the load balancing program 206 causes each of the servers 31 to 39 to execute the process of collecting the load balancing information from the servers 51 to 59 which are connected to each of the servers 31 to 39 and which are in next lower layer than the servers 31 to 39. The servers 31 to 39 store the collected load balancing information in each storage unit 202 thereof. Also, the control program 204 operating on each of the servers 51 to 59, upon reception of the load balancing information extraction request, causes each server to execute the process of returning the load balancing information 205 for each of the servers 51 to 59 stored in the corresponding storage unit 202 to the highest-layer servers 11 to 13. The data structure of the returned load balancing information is similar to the one illustrated with reference to FIG. 16.

The load balancing control program 104 of the servers 11 to 13 causes the servers 11 to 13 to execute the process of receiving the load balancing information transmitted from the other highest-layer servers and the lower-layer devices and the process of storing the received load balancing information in each storage unit 102. In step S104, each of the highest-layer servers 11 to 13 obviates the conflict contained in the load balancing information collected in step S103. This process is executed as the load balancing information conflict obviation process illustrated with reference to FIGS. 17 and 18. In step S105, the highest-layer servers 11 to 13 execute the load balancing information correction process illustrated with reference to FIGS. 19 to 29 thereby to correct the load balancing information stored in each storage unit 102 of the servers 11 to 13.

The load balancing program 106 executed on the servers 11 to 13, in accordance with the corrected load balancing information, causes the servers 11 to 13 to execute the process of returning the processing request received from the clients C1, C2 to the device in the next lower layer. The servers 11 to 13, in transmitting the processing request to the servers 31 to 39 in the next lower layer, access the data "route state of next lower layer" in the load balancing information. In the case where the server X included in the servers 31 to 39 in the next lower layer has no valid path capable of transmitting the processing request to the tail-end servers 51 to 59, the processing request is not distributed to the server X by the servers 11 to 13.

In step S106, the highest-layer servers 11 to 13 request a lower-layer devices of which the load balancing information is corrected, other than the lowest-layer devices in the load balancing system 1, to correct the load balancing information stored in each storage unit 202 like in the sequence illustrated in FIG. 13. The load balancing program 206 executed on the servers 31 to 39 causes these servers to execute the process of receiving the load balancing information correction request from the servers 11 to 13 and the process of updating the value of the load balancing information 205 stored in the storage unit 202 to the value held in the load balancing information contained in the load balancing information correction request. Also, after that, the load balancing program 206 causes the servers 31 to 39 to execute the process of distributing the processing request received from the servers 11 to 13 to the lower-layer servers in accordance with the updated load balancing information. In the process, the servers 31 to 39 access the data "route state of next lower layer" in the load balancing information. In the case where the server X included in the servers 31 to 39 in the next lower layer has no valid path capable of transmitting the processing request to the servers 51 to 59 at the tail end, the processing request is not distributed by the servers 31 to 39 to the server X.

The servers 11 to 13 and 31 to 39, in distributing the processing request to the devices in the next lower layer, access the data "load balancing manner switching flag" in the load balancing information. In the case where the value of the data "load balancing manner switching flag" in the load balancing information for the server X is "on", the server X changes the load balancing manner thereof to the method indicated by the data "load balancing manner switching flag" in the load balancing information.

Also, the control program 204 executed on the servers 51 to 59 causes these servers to execute the process of receiving the load balancing information correction request from the servers 11 to 13 and the process of updating the value of the load balancing information 205 stored in the storage unit 202 to the value held in the load balancing information contained in the load balancing information correction request. The lower-layer devices, upon reception of the load balancing information correction request and complete updating of the load balancing information stored in themselves, like in the sequence illustrated in FIG. 13, transmit the load balancing information correction completion notice to the servers 11 to 13. Then, the load balancing system 1, after being started, periodically repeats steps S102 to S106.

Figure 42:
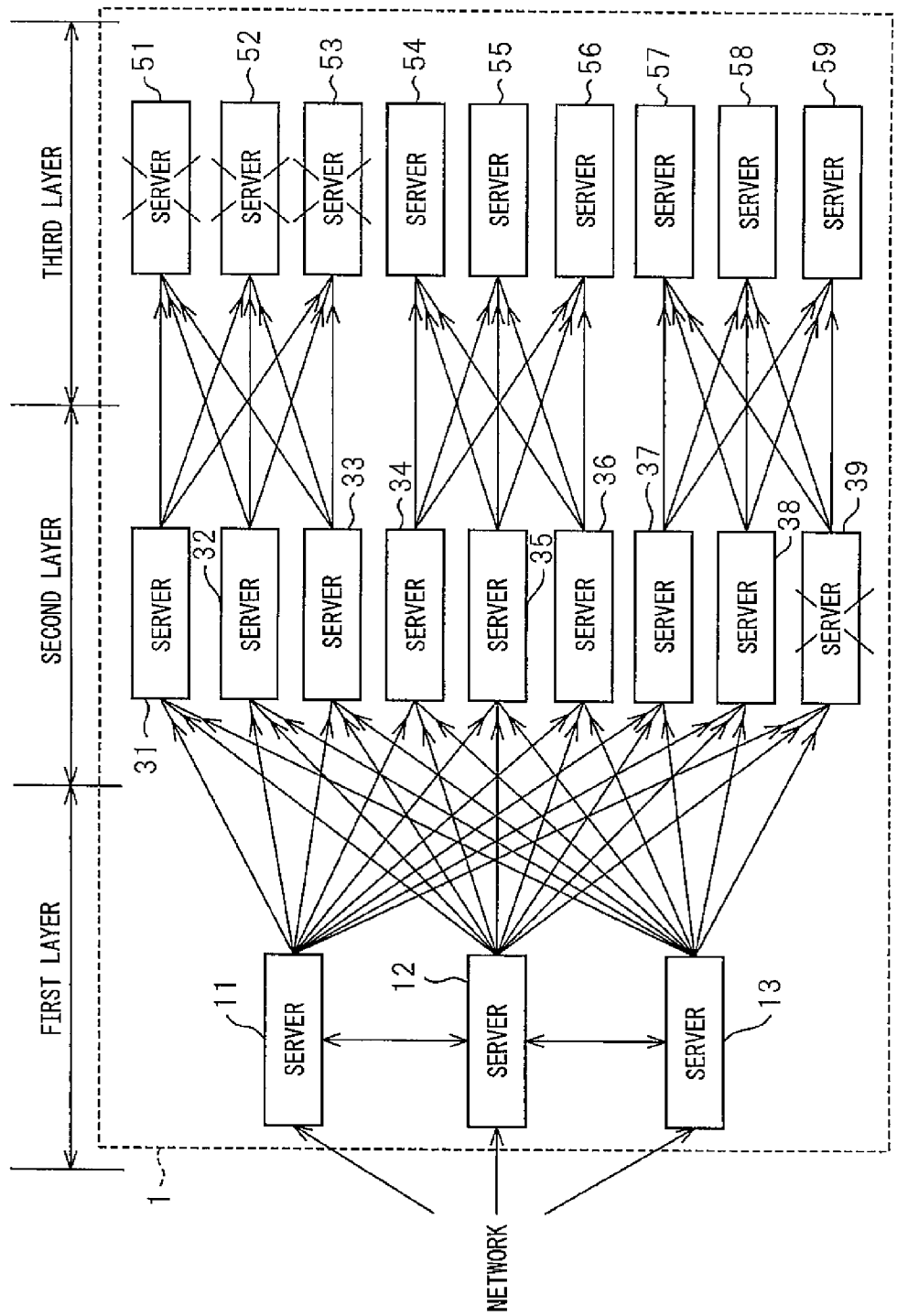
FIG. 42 is a diagram depicting the state in which a fault has occurred in the hierarchical load balancing system depicted in FIG. 38.
Figure 43:
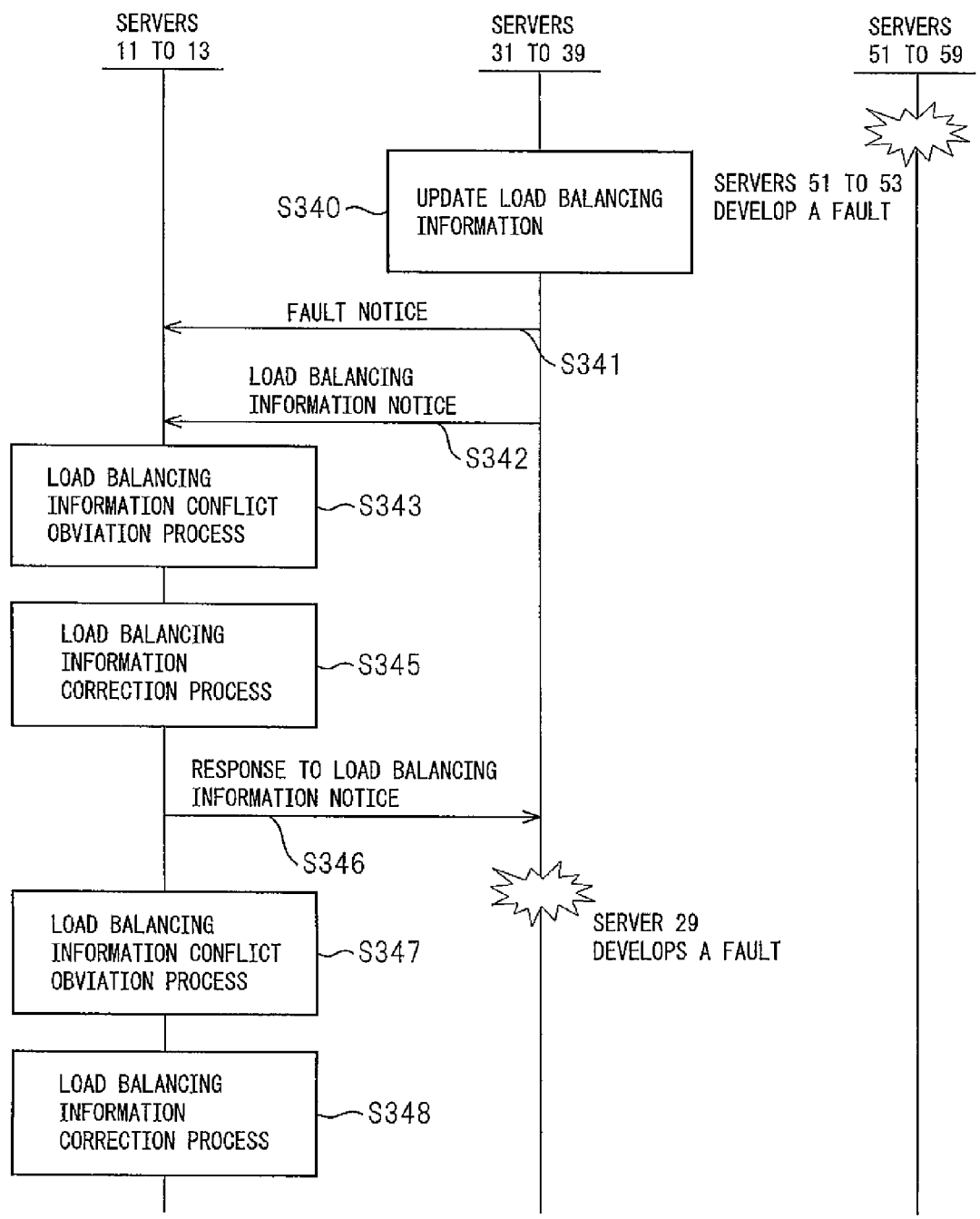
FIG. 43 is a diagram depicting the sequence at the time of fault occurrence in the hierarchical load balancing system depicted in FIG. 38.

Now, the operation performed at the time of fault occurrence and restoration from the fault in the load balancing system 1 depicted in FIG. 38 is illustrated. FIG. 42 is a diagram depicting the state in which the load balancing system 1 depicted in FIG. 38 has developed a fault, i.e. the state in which a fault has developed also in the second-layer server 39 after the fault occurrence in the third-layer servers 51 to 53. FIG. 43 is a diagram illustrating the sequence at the time of fault occurrence in the load balancing system illustrated in FIG. 38.

In the case where a fault develops in the servers 51 to 53, the response signal from these servers dies out. In step S340, therefore, the servers 31 to 33 in the next higher layer detect that a fault has occurred in the serves 51 to 53. The load balancing program 206 operating on the servers 31 to 33 causes the servers 31 to 33 to execute the process of changing the value of the data "device state" in the load balancing information for the servers 51 to 53 stored in the storage unit 202 to "fault" and the process of setting to "valid" the value of the data for the servers 51 to 53 included in the data "route state of next lower layer" in the load balancing information for the servers 31 to 33 themselves.

After that, the load balancing program 206 causes, in step S341, the servers 31 to 33 to execute the process of transmitting the fault notice to the highest-layer servers 11 to 13 notifying that the servers 51 to 53 have developed a fault, and also causes, in step S342, the servers 31 to 33 to execute the process of transmitting the load balancing information for the servers 31 to 33 themselves and the servers 51 to 53 to the servers 11 to 13 in the highest layer. In the process, the data structure of the fault notice and the load balancing information notice transmitted is similar to the one illustrated with reference to FIGS. 34 and 16.

The load balancing control program 104 executed on the servers 11 to 13 causes the servers 11 to 13 to execute the process of receiving the load balancing information notice from the servers 31 to 33 and the process of updating the value of the load balancing information stored in the storage unit 102 to the value held in the load balancing information received. Then, the load balancing control program 104 causes, in step S343, the servers 11 to 13 to execute the load balancing information conflict obviation process illustrated in FIG. 17. Also, the load balancing control program 104 causes, in step S345, the servers 11 to 13 to execute the load balancing information correction process illustrated in FIG. 19. As a result, of all the load balancing information stored in the storage unit 102, the value of the data for the servers 31 to 33 included in the data "route state of next lower layer" in the load balancing information for the servers 11 to 13 is changed to "invalid".

The load balancing control program 104 causes, in steps S346, the servers 11 to 13 to execute the process of transmitting, to the servers 31 to 33, the response to the load balancing information notice. After that, the servers 11 to 13, in executing the load balancing process for the servers 31 to 39 in the next lower layer by the load balancing program 106, access the data "route state of next lower layer" in the load balancing information. Then, the servers 11 to 13 transmit no processing request to the server among the servers 31 to 39 in the next lower layer which has no valid path capable of transmitting the processing request to the servers 51 to 59 at the tail end.

Next, in the case where a fault develops in the server 39, the response signal from the server 39 dies out, and therefore, the servers 11 to 13 in the next higher layer detect that a fault has developed in the server 39. The load balancing program 106 operating on the servers 11 to 13 cause the servers 11 to 13 to execute the process of changing the value of the data "device state" to "fault" in the load balancing information for the server 39 stored in the storage unit 102 and the process of setting the value of the data for the server 39 to "invalid" in the data "route state of next lower layer" included in the load balancing information for the servers 11 to 13 themselves. Then, the load balancing control program 104 operating on the servers 11 to 13 cause, in step S347, the servers 11 to 13 to execute the load balancing information conflict obviation process illustrated in FIG. 17. Also, the load balancing control program 104 causes, in step S348, the servers 11 to 13 to execute the load balancing information correction process illustrated in FIG. 19.

After that, the servers 11 to 13, in executing the load balancing process for the servers 31 to 39 in the next lower layer by the load balancing program 106, access the data "route state of next lower layer" in the load balancing information. Then, the servers 11 to 13 transmit no processing request to the server 39 included in the servers 31 to 39 in the next lower layer and having no valid path capable of transmitting the processing request to the tail-end servers 51 to 59.

Figure 44:
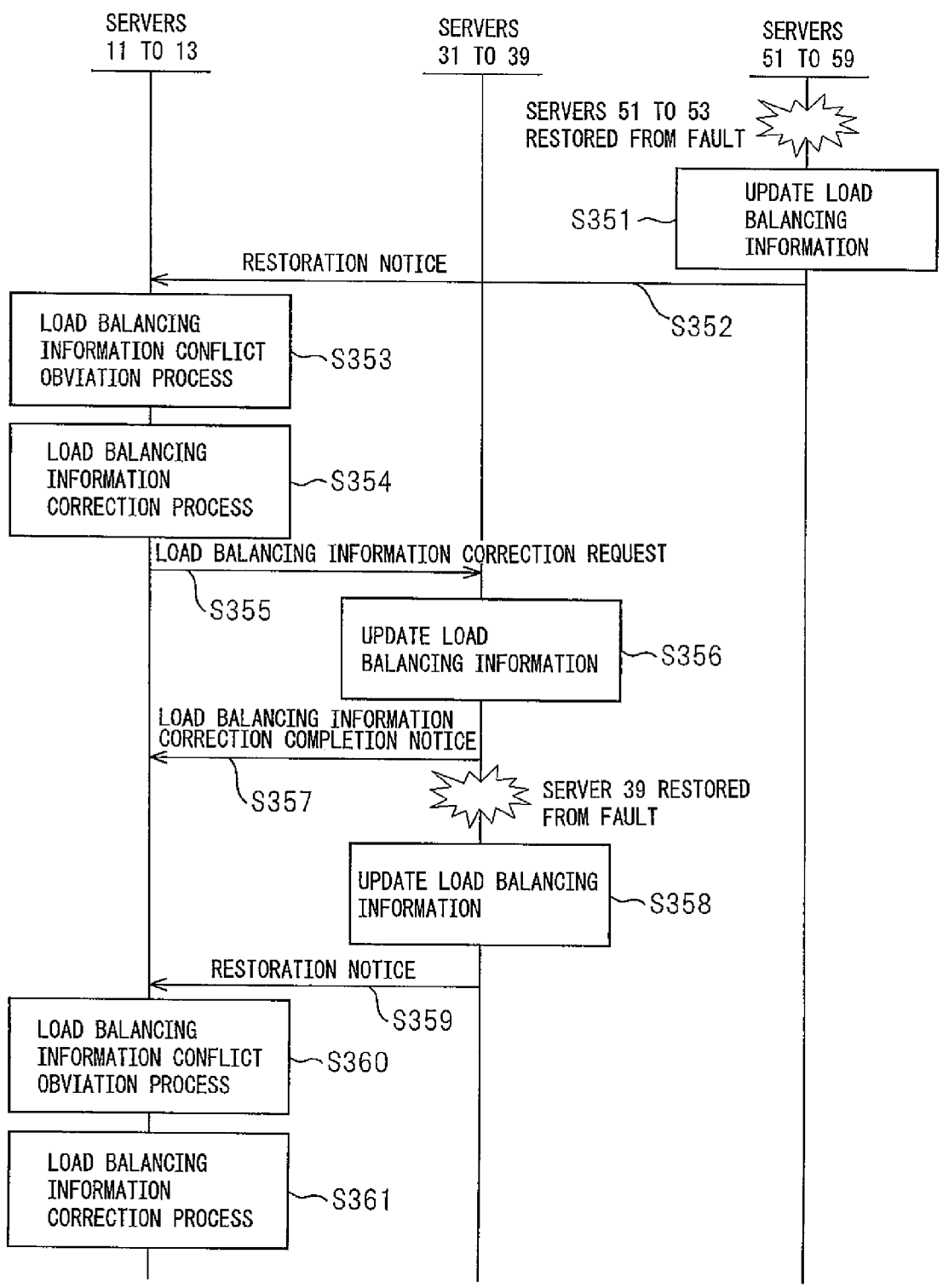
FIG. 44 is a diagram depicting the sequence of restoration from a fault in the hierarchical load balancing system depicted in FIG. 38.

FIG. 44 is a diagram depicting the sequence of restoration from a fault in the load balancing system 1 illustrated in FIG. 38. Upon restoration of the servers 51 to 53 from a fault, the control program 204 executed on the servers 51 to 53 causes, in step S351, the servers 51 to 53 to execute the process of setting the value of the data "device state" to "valid" in the load balancing information for the servers 51 to 53 stored in the storage unit 202.

After that, the control program 204 causes, in step S352, the servers 51 to 53 to execute the process of transmitting, to the highest-layer servers 11 to 13, the restoration notice that the servers 51 to 53 are restored. The restoration notice contains the load balancing information for the servers 51 to 53 changed in step S351. The data items of the restoration notice transmitted are identical with those of the restoration notice illustrated with reference to FIG. 37.

The load balancing control program 104 executed on the servers 11 to 13 causes the servers 11 to 13 to execute the process of receiving the restoration notice from the servers 51 to 53 and the process of updating the value of the load balancing information stored in the storage unit 102 to the value held in the load balancing information received. Then, the load balancing control program 104 causes, in step S353, the servers 11 to 13 to execute the load balancing information conflict obviation process illustrated in FIG. 17. As a result, the conflict of the load balancing information stored in the storage unit 102 is obviated which otherwise might be caused by the change in the load balancing information due to the restoration of the servers 51 to 53.

The load balancing control program 104 causes, in step S354, the servers 11 to 13 to execute the load balancing information correction process illustrated in FIG. 19. As a result, of all the load balancing information stored in the storage unit 102, the value of the data for the servers 51 to 53 included in the data "route state of next lower layer" in the load balancing information for the servers 31 to 33 is changed to "valid". Also, the value of the data for the servers 31 to 33 included in the data "route state of next lower layer" in the load balancing information for the servers 11 to 13 is changed to "valid". Further, the value of the data "route state from higher-layer devices" in the load balancing information for the servers 31 to 33 is changed to "valid".

In step S355, the load balancing control program 104 causes the servers 11 to 13 to execute the process of transmitting the load balancing information correction request to the servers 31 to 33, among the lower-layer devices with the load balancing information corrected by the process of steps S352 to S354, which is indicated as being having a valid route from higher-layer devices by the data "route state from higher-layer devices" in the load balancing information. This load balancing information correction request includes the load balancing information. The load balancing program 206 executed on the servers 31 to 33 causes the servers 31 to 33 to execute the process of receiving the load balancing information correction request from the servers 11 to 13 and the process of updating the value of the load balancing information 205 stored in the storage units 202 to the value held in the load balancing information included in the load balancing information correction request (step S356).

After that, the load balancing program 206, in accordance with the updated load balancing information, causes the servers 31 to 33 to execute the process of distributing the processing request received from the servers 11 to 13 to the lower-layer servers. After that, the servers 31 to 33, in distributing the processing request to the servers 51 to 59, access the data "route state of next lower layer" in the load balancing information. The value of the data for the servers 51 to 53 included in the data "route state of lower layers" is changed to "valid", and therefore, the servers 31 to 33 resume the transmission of the processing request to the servers 51 to 53.

Also, the servers 11 to 13, in executing the load balancing process for the servers 31 to 39 by the load balancing program 106, access the data "route state of next lower layers" in the load balancing information. Of all the data "route state of next lower layers", the value of the data for the servers 31 to 33 is changed to "valid", and therefore, the servers 11 to 13 restart the transmission of the processing request to the servers 31 to 33. In step S357, the load balancing information correction completion notice is transmitted to the servers 31 to 33.

After that, upon restoration of the server 39 from the fault, the load balancing program 206 executed on the server 39 causes, in step S358, the server 39 to execute the process of setting to "normal" the value of the data "device state" in the load balancing information for the server 39 itself stored in the storage unit 202 and the process of setting to "normal" the data "route state from higher-layer devices" in the load balancing information for the servers 51 to 53 stored in the storage units 202.

After that, the load balancing program 206 causes, in step S359, the server 39 to execute the process of transmitting the restoration notice to the highest-layer servers 11 to 13 notifying that the server 39 is restored. The restoration notice contains the load balancing information for the servers 31 to 33, 51 to 53 changed by the server 39 in step S357. The load balancing control program 104 executed on the servers 11 to 13 causes the servers 11 to 13 to execute the process of receiving the restoration notice from the server 39 and the process of updating the value of the load balancing information stored in the storage units 102 to the value held in the received load balancing information. Then, the load balancing control program 104 causes, in step S360, the servers 11 to 13 to execute the load balancing information conflict obviation process illustrated in FIG. 17. As a result, the conflict of the load balancing information stored in the storage units 102 which otherwise might be caused by the change in the load balancing information due to the restoration of the server 39 is obviated. The load balancing control program 104 causes, in step S361, the servers 11 to 13 to execute the load balancing information correction process illustrated in FIG. 19. As a result, of all the load balancing information stored in the storage units 102, the value of the data for the server 39 included in the data "route state of next lower layer" in the load balancing information for the servers 11 to 13 is changed to "valid". After that, the servers 11 to 13, in executing the load balancing process for the servers 31 to 39, access the data "route state of next lower layers" in the load balancing information. Of all the data "route state of next lower layers", the value of the data for the server 39 is changed to "valid", and therefore, the transmission of the processing request to the server 39 is restarted.

Figure 45:
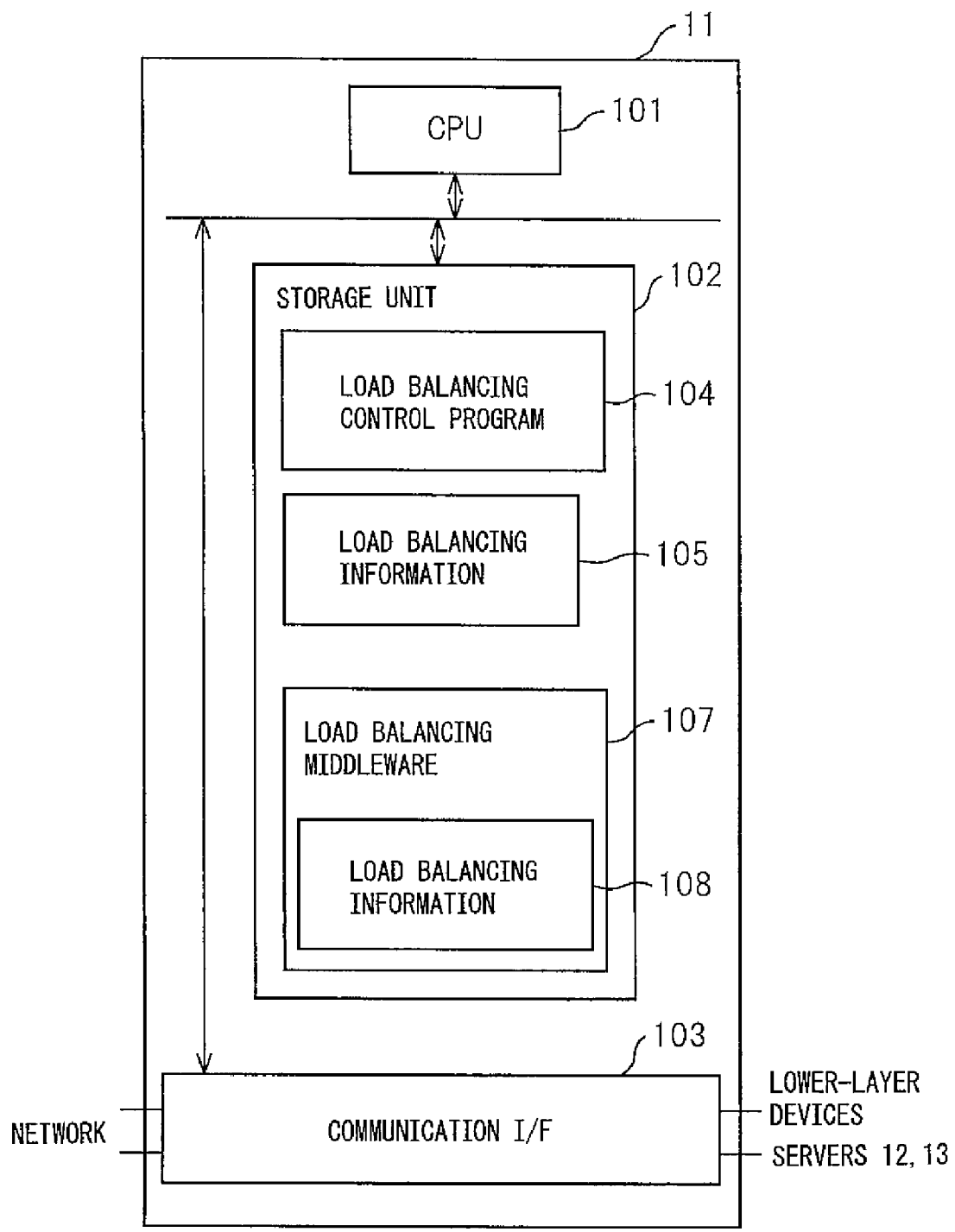
FIG. 45 is a diagram depicting a configuration of a server arranged in the highest layer for executing the load balancing process with the load balancing middleware.

In the configuration illustrated in FIG. 38, the load balancing process by the servers 11 to 13, 31 to 39 may be executed by the load balancing middleware operating on these servers. FIG. 45 is a diagram depicting a configuration of the server 11 arranged in the highest layer to execute the load balancing process with the load balancing middleware. The configuration of the servers 12 and 13 is similar to that of the server 11. This configuration of the server 11 is similar to the configuration of the server illustrated in FIG. 5. The same component elements are designated by the same reference numerals, respectively, and not described any further. In the description that follows, the component elements having the same reference numerals have the same function, respectively, unless otherwise specified. The storage unit 102 has the load balancing middleware 107 causing the CPU 101 to execute the load balancing process for distributing the processing request received through the communication interface 103 to the lower-layer servers 31 to 39 connected to the server 11. In the load balancing middleware 107, the load balancing information 108 used for the operation of itself is stored in the storage unit 102. This load balancing information 108 contains the load balancing information for the server 11 itself and the load balancing information for the servers 31 to 39 in the layer where the server 11 distributes the processing request.

Figure 46:
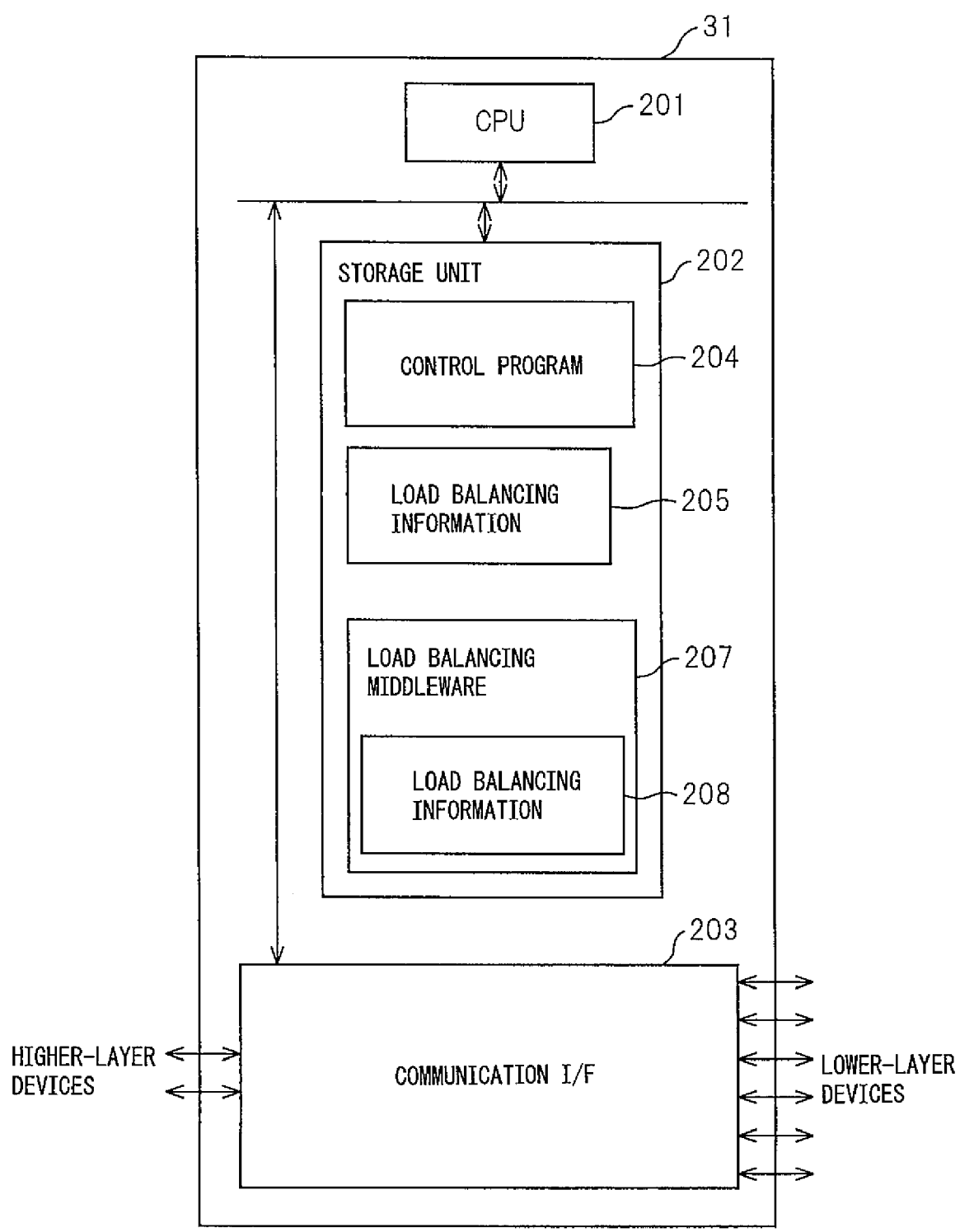
FIG. 46 is a diagram depicting a configuration of a server arranged in the intermediate layer or the low layer for executing the load balancing process with the load balancing middleware.

FIG. 46 is a diagram depicting a configuration of the server 31 arranged in the intermediate layer or the lower layer in the case where the load balancing process is executed by the load balancing middleware. The configuration of the servers 32 to 39 is similar to that of the server 31. The server 31 configured this way has a similar configuration to the server illustrated in FIG. 6. The same component elements are designated by the same reference numerals, respectively, and not described any further. Unless otherwise specified below, the component elements designated by the same reference numerals have the same function. In the storage unit 202, a load balancing middleware 207 for causing the CPU 201 to execute the load balancing process in which the processing request is received from the control program 204 having received the particular processing request through the communication interface 203 and distributed to the lower-layer servers 51 to 53 connected to the server 31 is stored. The load balancing middleware 207 stores, in the storage unit 202, the load balancing information 208 used for the operation of itself. The load balancing information 208 includes the load balancing information for the server 31 itself and the load balancing information for the servers 51 to 53 in the layer to which the server 31 distributes the processing request.

Figure 47:
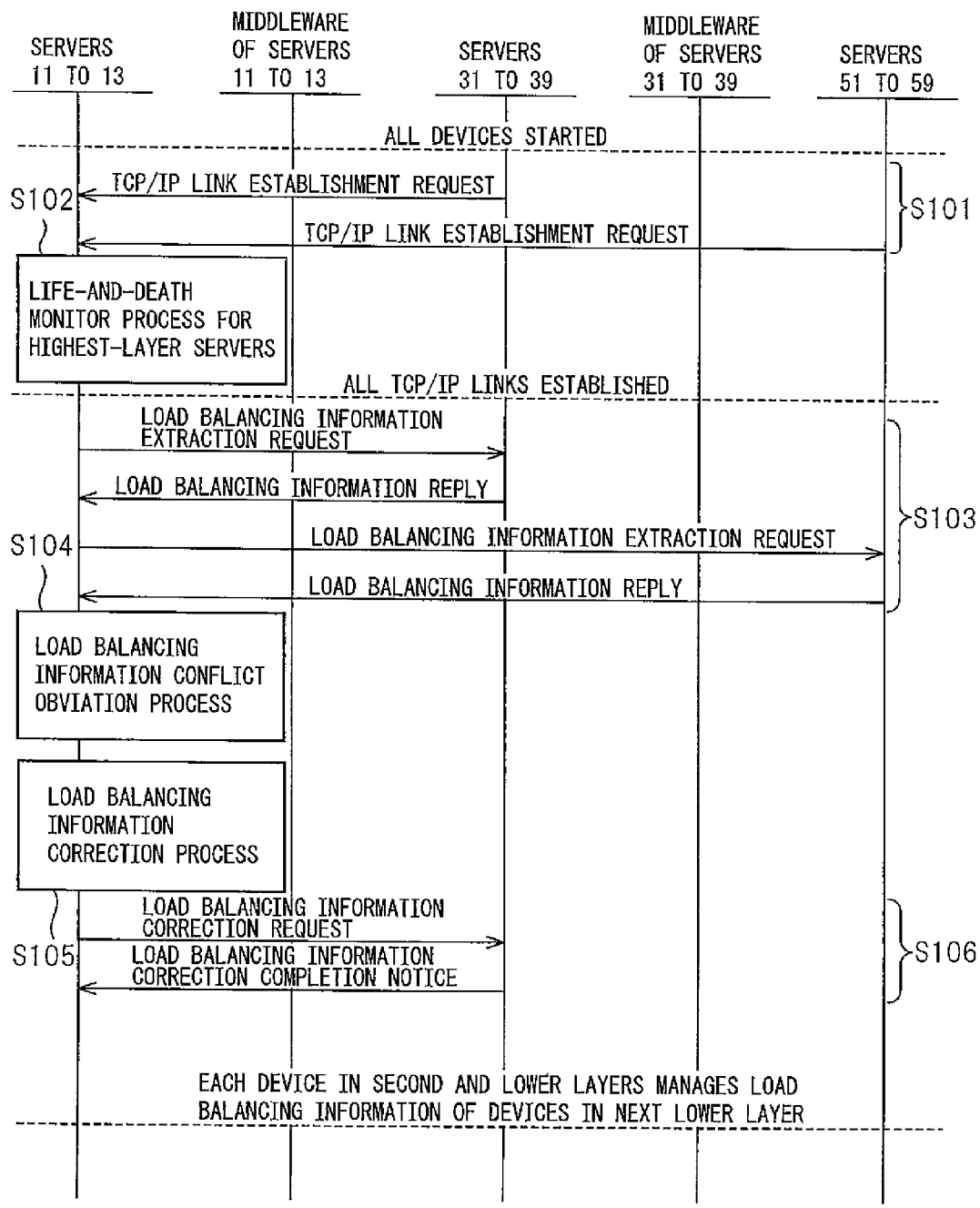
FIG. 47 is a diagram depicting the starting sequence for executing the load balancing process with the load balancing middleware.

FIG. 47 is a diagram depicting the starting sequence for executing the load balancing process with the load balancing middleware. The lower-layer devices, by requesting the highest-layer servers 11 to 13 to establish the TCP/IP link, establish the TCP/IP link with the highest-layer servers 11 to 13 (step S101). In step S102, each of the highest-layer servers 11 to 13 executes the life-and-death monitor process for the highest-layer servers described with reference to FIG. 14. Once the advisability of connection with the TCP/IP link between the highest-layer servers 11 to 13 and all the devices in the lower layers is determined, the load balancing control program 104 causes step S103 to execute the process, like in the starting sequence illustrated in FIG. 12, of collecting the load balancing information for the servers 31 to 39, 51 to 59.

The control program 204 operating on the servers 31 to 39, 51 to 59, upon reception of the load balancing information extraction request, causes each server to execute the process of returning, to the highest-layer servers 11 to 13, the load balancing information 205 for itself stored in each storage unit 202 by each server. In the process, the control program 204 operating on each of the servers 31 to 39 causes the each of servers 31 to 39 to execute the process of collecting the load balancing information from the servers 51 to 59 which are connected to each of the servers 31 to 39 and which are in the next lower layer than the servers 31 to 39. The servers 31 to 39 store the collected load balancing information in each storage unit 202. The data structure of the returned load balancing information is similar to the one illustrated with reference to FIG. 16. The load balancing control program 104 of the servers 11 to 13 causes the servers 11 to 13 to execute the process of receiving the load balancing information transmitted from other highest-layer servers and the lower-layer devices and the process of storing the received load balancing information in each storage unit 102.

In step S104, each of the highest-layer servers 11 to 13 executes the load balancing information conflict obviation process illustrated with reference to FIGS. 17 and 18. Also, in step S105, each of the highest-layer servers 11 to 13 executes the load balancing information correction process illustrated with reference to FIGS. 19 to 29. The load balancing control program 104 executed on the servers 11 to 13 causes the servers 11 to 13 to execute the process of notifying the load balancing information for the servers 11 to 13 and the load balancing information for the servers 31 to 39 in the next lower layer to the load balancing middleware 107 executed by the servers 11 to 13. The load balancing middleware 107 causes the servers 11 to 13 to execute the process of storing the notified load balancing information in the internal storage area of the storage unit 102 prepared for the load balancing middleware 107.

In step S106, the highest-layer servers 11 to 13 request a lower-layer devices of which the load balancing information is corrected, other than the lowest-layer devices in the load balancing system 1, to correct the load balancing information stored in each storage unit 202 like in the sequence illustrated in FIG. 13. The control program 204 executed on the servers 31 to 39 causes these servers to execute the process of receiving the load balancing information correction request from the servers 11 to 13 and the process of updating the value of the load balancing information 205 stored in the storage unit 202 to the value held in the load balancing information contained in the load balancing information correction request. Also, the control program 204 causes the servers 31 to 39 to execute the process of notifying, to the load balancing middleware 207 executed on the servers 31 to 39, the load balancing information for the respective servers themselves and the load balancing information for other servers arranged in the next lower layer and connected thereto. The load balancing middleware 207 causes the serves 31 to 39 to execute the process of storing this notified load balancing information in the storage area in of each storage unit 202 prepared for the load balancing middleware 207.

After that, the load balancing middleware 107 executed on the servers 11 to 13 causes the servers 11 to 13 to execute the process of transmitting the processing request received from the clients C1, C2 to the devices in the next lower layer in accordance with the corrected load balancing information. Also, the load balancing middleware 207 executed on the servers 31 to 39 causes the servers 31 to 39 to execute the process of distributing the processing request received from the control program 204 to the lower-layer servers. The load balancing middleware 107, 207 execute the load balancing process similar to the load balancing programs 106, 206 described above.

The lower-layer devices, upon reception of the load balancing information correction request and complete updating of the load balancing information stored therein, like in the sequence illustrated in FIG. 13, transmit the load balancing information correction completion notice to the servers 11 to 13. Then, the load balancing system 1, after finishing the starting process, periodically repeats steps S102 to S106.

Figure 48:
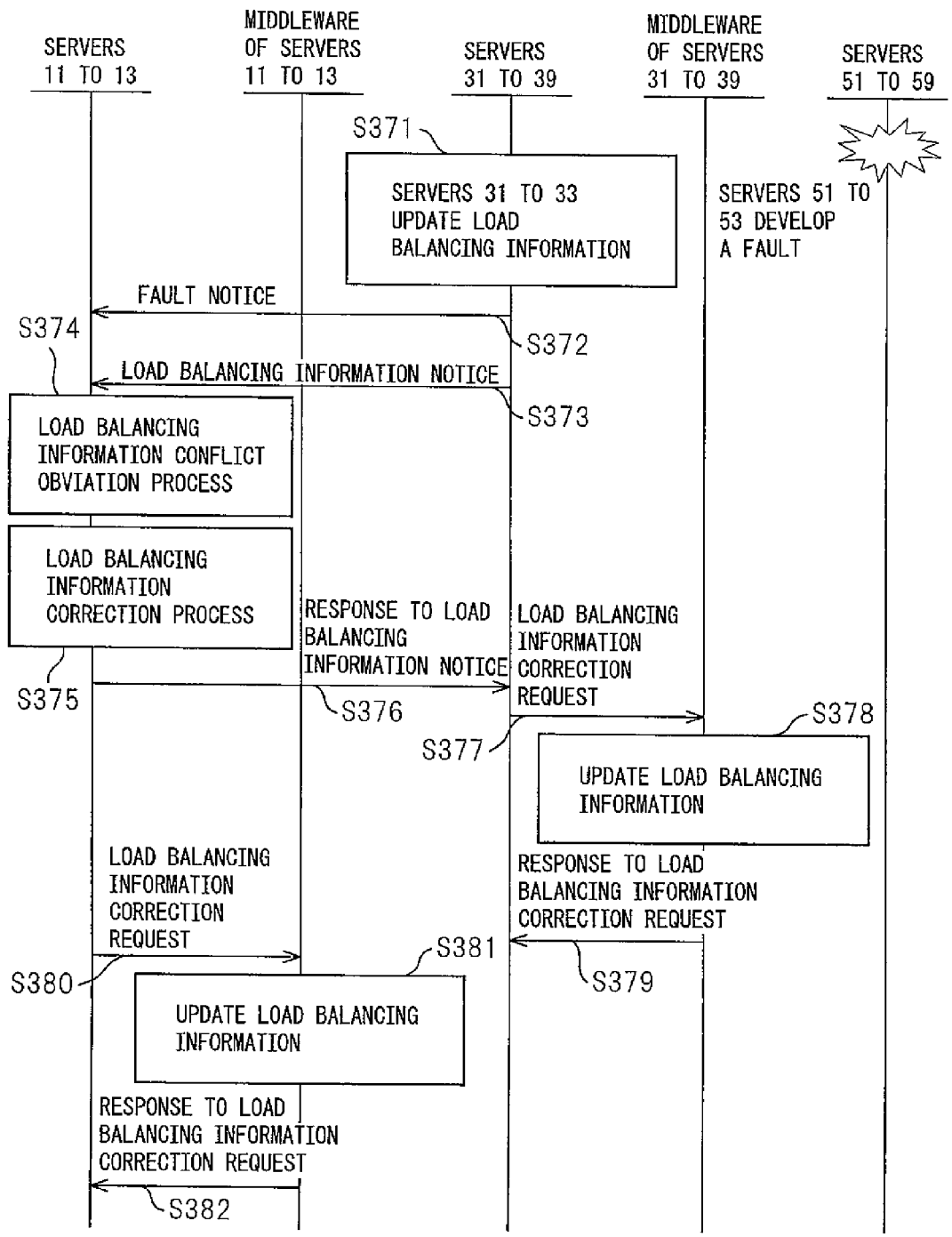
FIG. 48 is a diagram (No. 1) depicting the sequence at the time of fault occurrence to execute the load balancing process with the load balancing middleware.
Figure 49:
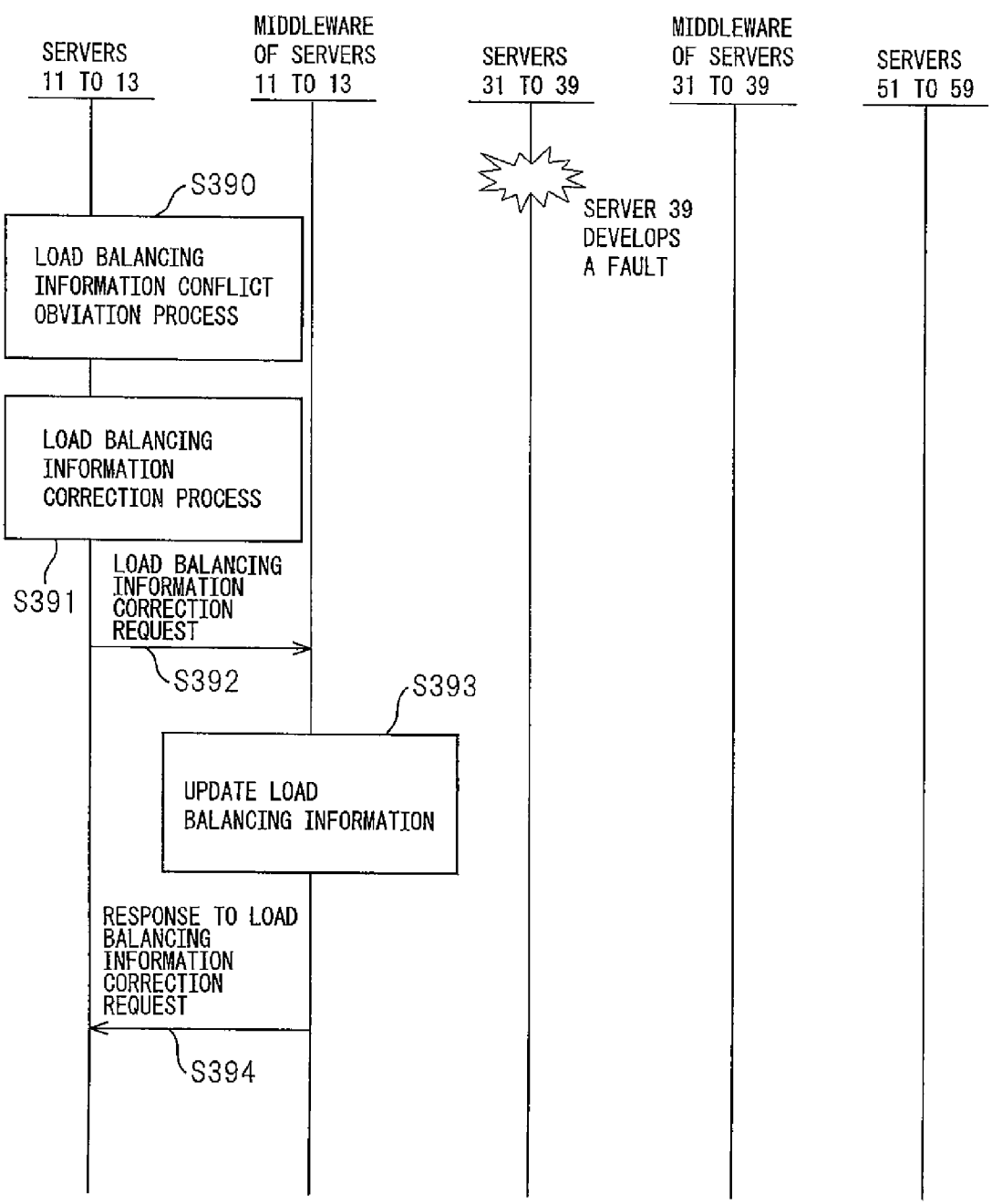
FIG. 49 is a diagram (No. 2) depicting the sequence at the time of fault occurrence to execute the load balancing process with the load balancing middleware.

FIGS. 48 and 49 are diagrams depicting the sequence at the time of fault occurrence in the case where the load balancing process is executed by the load balancing middleware. Like in the example depicted in FIG. 42, consider a case in which a fault occurs in the server 39 of the second layer after the fault occurrence in the servers 51 to 53 of the third layer. In FIG. 48, upon occurrence of a fault in the servers 51 to 53, the response signal from these servers stops, and therefore, the servers 31 to 33 in the next higher layer detect, in step S371, that a fault has occurred in the servers 51 to 53. The control program 204 operating on the servers 31 to 33 causes the servers 31 to 33 to execute the process of changing to "fault" the value of the data "device state" in the load balancing information for the servers 51 to 53 stored in the storage unit 202 and the process of setting to "invalid" the value of the data for the servers 51 to 53 included in the data "route state of next lower layer" in the load balancing information for the servers 31 to 33 themselves.

After that, the control program 204 causes, in step S372, the servers 31 to 33 to execute the process of transmitting the fault notice indicating the fault occurrence in the servers 51 to 53 to the highest-layer servers 11 to 13 on the one hand, and causes, in step S373, the servers 31 to 33 to execute the process of transmitting the load balancing information for the servers 31 to 33 themselves and the servers 51 to 53 to the highest-layer servers 11 to 13 on the other hand.

The load balancing control program 104 executed on the servers 11 to 13 causes the servers 11 to 13 to execute the process of receiving the load balancing information notice from the servers 31 to 33 and the process of updating the value of the load balancing information stored in the storage unit 102 to the value held in the load balancing information received. Then, the load balancing control program 104 causes, in step S374, the servers 11 to 13 to execute the load balancing information conflict obviation process illustrated in FIG. 17. Also, the load balancing control program 104 causes, in step S375, the servers 11 to 13 to execute the load balancing information correction process illustrated in FIG. 19. As a result, the value of the data for the servers 31 to 33 included in the data "route state of next lower layer" in the load balancing information for the servers 11 to 13 stored in the storage unit 102 is changed to "invalid". The load balancing control program 104 causes, in step S376, the servers 11 to 13 to execute the process of transmitting, to the servers 31 to 33, the response to the load balancing information notice.

In step S377, on the other hand, the control program 204 operating on the servers 31 to 33 causes the servers 31 to 33 to execute the process of notifying the load balancing information changed in step S371 to the load balancing middleware 207 operating on the servers 31 to 33. The load balancing middleware 207 causes the servers 31 to 33 to execute the process of updating the value of the load balancing information stored in the storage area for the load balancing middleware 207 to the value of the load balancing information notified (step S378) and the process of transmitting the response message to the control program 204 (step S379).

Also, in step S380, the load balancing control program 104 operating on the servers 11 to 13 causes the servers 11 to 13 to execute the process of notifying the load balancing middleware 107 of the load balancing information changed by the process of steps S373 to S375. The load balancing middleware 107 causes the servers 11 to 13 to execute the process of updating the value of the load balancing information stored in the storage area for the load balancing middleware 107 to the value of the load balancing information notified (step S381) and the process of transmitting the response message to the load balancing control program 104 (step S382).

After that, the load balancing middleware 107 executed on the servers 11 to 13 causes the servers 11 to 13 to execute the process of transmitting the processing request received from the clients C1, C2 to the device in the next lower layer in accordance with the corrected load balancing information.

Also, the load balancing middleware 207 executed on the servers 31 to 39 causes the servers 31 to 39 to execute the process of distributing the processing request received from the control program 204 to the lower-layer servers.

In FIG. 49, in the case where a fault develops in the server 39, the response signal from the server 39 stops, and therefore, the servers 11 to 13 in the next higher layer detect the occurrence of the fault in the server 39. In the process, the load balancing control program 104 operating on the servers 11 to 13 causes the servers 11 to 13 to execute the process of changing the value of the data "device state" to "fault" in the load balancing information for the server 39 stored in the storage unit 102 and the process of setting to "invalid" the value of the data for the server 39 included in the data "route state of next lower layer" in the load balancing information for the servers 11 to 13 themselves. The load balancing control program 104 operating on the servers 11 to 13 causes, in step S390, the servers 11 to 13 to execute the load balancing information conflict obviation process illustrated in FIG. 17. Also, the load balancing control program 104 causes, in step S391, the servers 11 to 13 to execute the load balancing information correction process illustrated in FIG. 19.

Also, the load balancing control program 104 causes, in step S392, the servers 11 to 13 to execute the process of notifying the load balancing middleware 107 of the load balancing information reflecting the change made during the process of the fault detection of the server 39 to step S391. The load balancing middleware 107 causes the servers 11 to 13 to execute the process of updating the value of the load balancing information stored in the storage area for the load balancing middleware 107 to the value of the load balancing information notified (step S393) and the process of transmitting the response message to the load balancing control program 104 (step S394). After that, the load balancing middleware 107 executed on the servers 11 to 13 causes the servers 11 to 13 to execute the process of transmitting the processing request received from the clients C1, C2 to the devices in the next lower layer in accordance with the corrected load balancing information.

Figure 50:
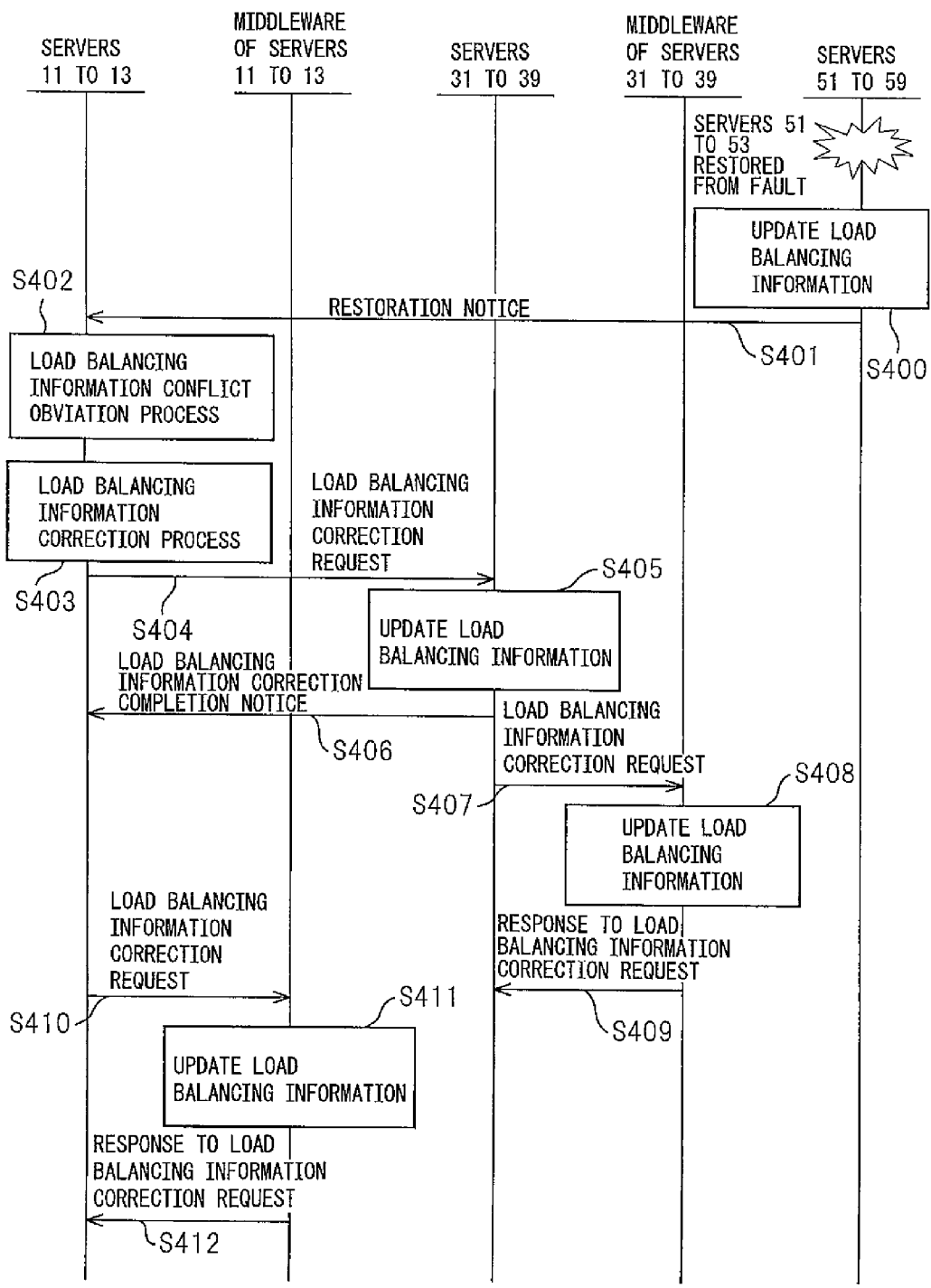
FIG. 50 is a diagram (No. 1) depicting the sequence at the time of restoration from a fault in the case where the load balancing process is executed with the load balancing middleware.
Figure 51:
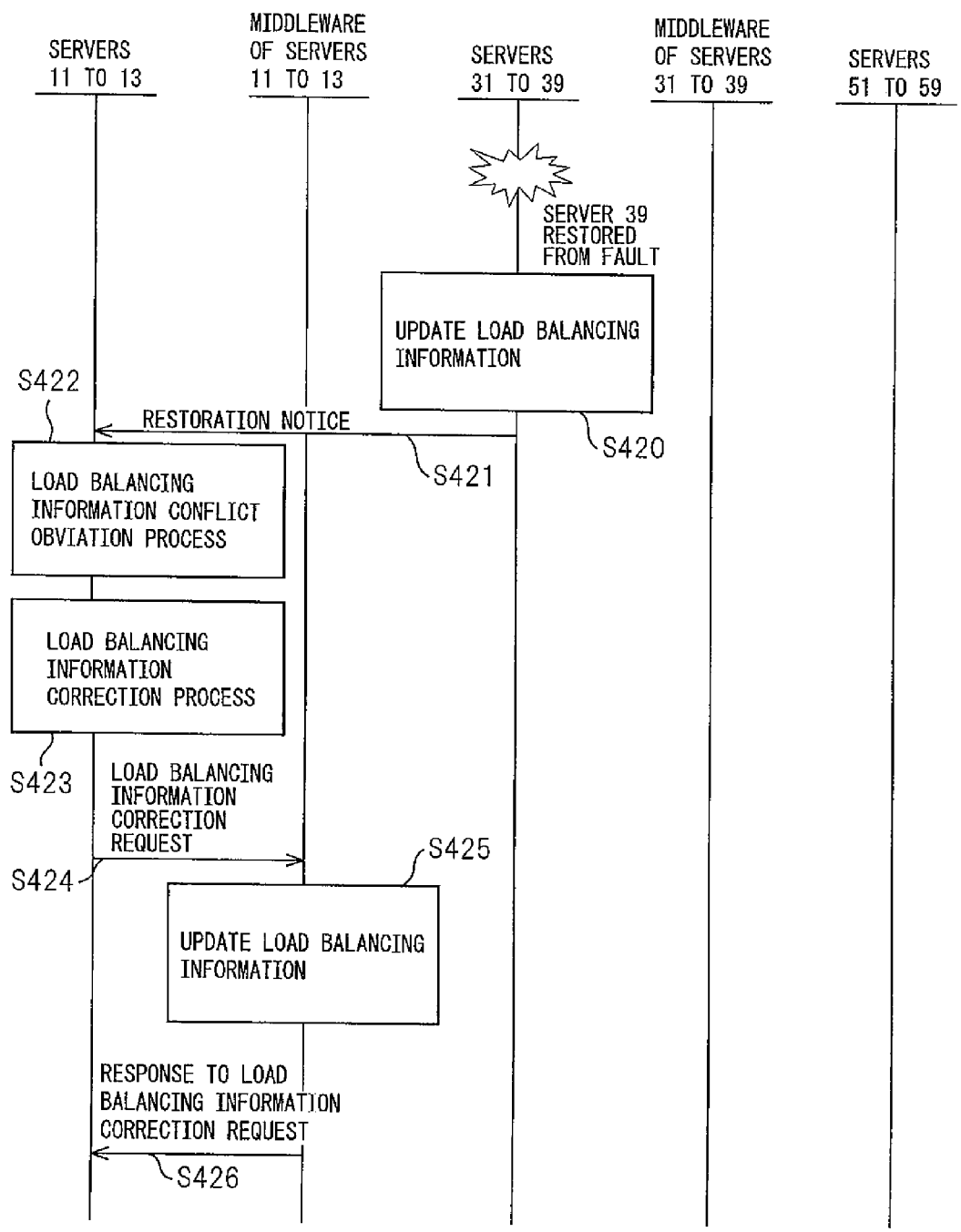
FIG. 51 is a diagram (No. 2) depicting the sequence at the time of restoration from a fault in the case where the load balancing process is executed with the load balancing middleware.

FIGS. 50 and 51 are diagrams depicting the sequence for restoration from a fault in the case where the load balancing process is executed by the load balancing middleware. In FIG. 50, upon restoration of the servers 51 to 53 from a fault, the control program 204 executed on the servers 51 to 53 causes, in step S400, the servers 51 to 53 to execute the process of setting to "normal" the value of the data "device state" in the load balancing information for the servers 51 to 53 themselves stored in the storage unit 202. After that, the control program 204 causes, in step S401, the servers 51 to 53 to execute the process of transmitting the restoration notice indicating the restoration of the servers 51 to 53 to the highest-layer servers 11 to 13.

The load balancing control program 104 executed on the servers 11 to 13 causes the servers 11 to 13 to execute the process of receiving the restoration notice from the servers 51 to 53, and the process of updating the value of the load balancing information stored in the storage unit 102 to the value held in the received load balancing information. Then, the load balancing control program 104, causes, in step S402, the servers 11 to 13 to execute the load balancing information conflict obviation process illustrated in FIG. 17. As a result, the conflict of the load balancing information stored in the storage unit 102 which otherwise might be caused by the change in the load balancing information due to the restoration of the servers 51 to 53 is obviated.

The load balancing control program 104 causes, in step S403, the servers 11 to 13 to execute the load balancing information correction process illustrated in FIG. 19, resulting in the change in the data "route state of next lower layer" and "route state from higher-layer devices" in the load balancing information for the servers 31 to 33 and the data "route state of next lower layer" in the load balancing information for the servers 11 to 13.

In step S404, the load balancing control program 104 causes the servers 11 to 13 to execute the process of transmitting the load balancing information correction request to the servers 31 to 33 with the load balancing information corrected by the process of steps S401 to S403. The load balancing control program 204 executed on the servers 31 to 33 causes the servers 31 to 33 to execute the process of receiving the load balancing information correction request from the servers 11 to 13, the process of updating the value of the load balancing information 205 stored in the storage unit 202 to the value held in the load balancing information contained in the load balancing information correction request (step S405) and the process of transmitting the load balancing information correction completion notice to the servers 11 to 13 (step S406).

In step S407, the control program 204 operating on the servers 31 to 33 causes the servers 31 to 33 to execute the process of notifying the load balancing information changed in step S405 to the load balancing middleware 207 operating on the servers 31 to 33. The load balancing middleware 207 causes the servers 31 to 33 to execute the process of updating the value of the load balancing information stored in the storage area for the load balancing middleware 207 to the value of the notified load balancing information (step S408) and the process of transmitting the response message to the control program 204 (step S409).

In step S410, the load balancing control program 104 operating on the servers 11 to 13 causes the servers 11 to 13 to execute the process of notifying the load balancing middleware 107 of the load balancing information changed by the process of steps S401 to S403. The load balancing middleware 107 causes the servers 11 to 13 to execute the process of updating the value of the load balancing information stored in the storage area for the load balancing middleware 107 to the value of the load balancing information notified (step S411), and the process of transmitting the response message to the load balancing control program 104 (step S412).

In FIG. 51, assume that the server 39 is restored from a fault. In step S420, the control program 204 executed on the server 39 causes the server 39 to execute the process of setting to "normal" the data "device state" in the load balancing information for the server 39 itself stored in the storage unit 20, and the process of setting to "valid" the value of the "route state from higher-layer devices" in the load balancing information for the servers 51 to 53 stored in the storage unit 202. After that, the control program 204 causes, in step S421, the server 39 to execute the process of transmitting the restoration notice indicating the restoration of the server 39, to the highest-layer servers 11 to 13.

The load balancing control program 104 executed on the servers 11 to 13 causes the servers 11 to 13 to execute the process of receiving the restoration notice from the server 39 and the process of updating the value of the load balancing information stored in the storage unit 102 to the value held in the received load balancing information. The load balancing control program 104 causes, in step S422, the servers 11 to 13 to execute the load balancing information conflict obviation process illustrated in FIG. 17. As a result, the conflict of the load balancing information stored in the storage unit 102 in which the conflict might otherwise be caused by the change in the load balancing information due to the restoration of the server 39 is obviated. The load balancing control program 104 causes, in step S423, the servers 11 to 13 to execute the load balancing information correction process illustrated in FIG. 19. As a result, the data "route state of next lower layer" in the load balancing information for the servers 11 to 13 is changed.

In step S424, the load balancing control program 104 causes the servers 11 to 13 to execute the process of notifying the load balancing middleware 107 of the load balancing information changed by the process of steps S421 to S423. The load balancing middleware 107 causes the servers 11 to 13 to execute the process of updating the value of the load balancing information stored in the storage area for the load balancing middleware 107 to the value of the load balancing information notified (step S425), and the process of transmitting the response message to the load balancing control program 104 (step S426).

Embodiments have been illustrated above in detail with reference to preferred embodiments, and to facilitate the understanding of the invention, specific forms of the embodiment are described as notes below.

(Note 1)
A load balancing system having a hierarchical structure in which each layer which includes one or more nodes and processing requests are sequentially transmitted from the higher-layer nodes to the lower-layer nodes and in which any one of the nodes acts as a load balancing unit thereby to distribute the processing request to the tail-end nodes, characterized in that:
one of the nodes is a master node comprising:
a load balancing information receiving unit which receives predetermined load balancing information held in a first node other than the master node from the first node or a second node in a higher layer than that of the first node; and
a load balancing information storage unit which collectively stores the load balancing information for all the nodes included in the hierarchical structure.

(Note 2)
The load balancing system as described in Note 1, characterized in that the predetermined load balancing information is the information indicating any one of: the number of processes accepted in the nodes to which the processing requests are distributed from the load balancing unit; the number of processes executed in the nodes; connection status of the nodes; load condition of the nodes; and a load balancing manner carried out by the load balancing unit.

(Note 3)
The load balancing system as described in Note 2, characterized in that:
the master node comprises:
a transmission advisability determining unit which determines the advisability of the processing request to the first node in accordance with the presence or absence of a valid path leading from the first node to the tail end downstream thereof, as judged from the load balancing information stored in the load balancing information storage unit; and
a transmission advisability notification unit which transmits, to another node which transmits the processing request to the first node, an advisability notice indicating the advisability of the processing request to the first node.

(Note 4)
The load balancing system as described in Note 2 or 3, characterized in that:
the master node further comprises:
a load balancing manner change unit which changes the load balancing manner of a load balancing unit which distributes the processing request to the first node in the case where the load condition indicated by the load balancing information for the first node meets a predetermined standard; and
a load balancing manner notification unit which transmits, to the load balancing unit, a load balancing manner change notice indicating the load balancing manner changed.

(Note 5)
The load balancing system as described in Note 2 or 3, characterized in that:
the master node further comprises:
a data matching unit which executes the process of matching between the load balancing information stored for the first node in the load balancing information storage unit and the load balancing information held in the first node.

(Note 6)
The load balancing system as described in Note 5, characterized in that the data matching unit executes the matching process periodically and/or at the time when the master node starts the load balancing process.

(Note 7)
The load balancing system as described in Note 5, characterized in that:
the master node comprises:
a fault notice receiving unit which receives the fault notice which indicates the fault occurrence in any one of the nodes and which is issued by another node in the next higher layer; and
the data matching unit executes the matching process upon reception of the fault notice.

(Note 8)
The load balancing system as described in Note 5, characterized in that:
the master node comprises a restoration notice receiving unit which receives the restoration notice in which the restoration of any one of the nodes from the faulty state is notified by the any one of the nodes; and
the data matching unit executes the matching process upon reception of the restoration notice.

(Note 9)
The load balancing system as described in Note 2 or 3, characterized in that:
the master node further comprises:
a data check unit which checks the conflict existing in the load balancing information stored in the load balancing information storage unit.

(Note 10)
The load balancing system as described in Note 9, characterized in that the data check unit checks the difference between the previously received load balancing information and the currently received load balancing information.

(Note 11)
The load balancing system as described in Note 9, characterized in that the data check unit checks for the conflict existing in the load balancing information with regard to whether the load balancing information stored for each of the nodes indicates the node is normal or invalid.

(Note 12)
The load balancing system as described in Note 9, characterized in that the data check unit judges whether a node is valid or invalid in accordance with the presence or absence of a valid path leading from the node to the tail end.

(Note 13)
The load balancing system as described in Note 9, characterized in that the data check unit judges whether each of the nodes is valid or invalid in accordance with the presence or absence of a valid path leading from highest-layer nodes to each of the nodes.

(Note 14)

The load balancing system as described in Note 9, characterized in that the data check unit, in the absence of a valid path leading from the first node to the tail end or in the absence of a valid path leading from the highest-layer nodes to the first node, sets the invalidity of the first node in the load balancing information stored in the load balancing information storage unit for the first node.

(Note 15)

The load balancing system as described in Note 4, characterized in that the load balancing manner change unit, during the period when the load condition of each node to which the processing request is distributed by the load balancing unit is maintained within a predetermined tolerable range, maintains the load balancing manner of the load balancing unit in the current load balancing manner.

(Note 16)

The load balancing system as described in Note 4, characterized in that the load balancing manner change unit maintains the load balancing manner of the load balancing unit in the current load balancing manner, in the case where the load balancing manner of the load balancing unit is such that distributee of each of the processing requests received by the load balancing unit is determined in accordance with each processing request.

(Note 17)

The load balancing system as described in Note 2 or 3, wherein a plurality of nodes are arranged each as a master node in the highest layer of the hierarchical structure, and wherein each of these master nodes comprises a life-and-death monitor unit which mutually monitors whether other master nodes are faulty or not.

(Note 18)

The load balancing system as described in Note 17, characterized in that the master node comprises a fault notification unit which transmits the fault notice and/or the fault restoration notice of the other master node to the client devices transmitting the processing request to the load balancing system and/or the lower-layer nodes.

(Note 19)

The load balancing system as described in Note 18, characterized in that the lower-layer node comprises:

a receiving unit which receives the fault notice and/or the fault restoration notice;

a storage unit which stores the predetermined load balancing information and the life-and-death state of each of the master nodes; and a load balancing information transmission unit which transmits the predetermined load balancing information in store to the maser node not in a faulty state.

(Note 20)

The load balancing system as described in any one of Notes 1 to 19, characterized in that the load balancing unit is a load balancer which distributes, to the node in the next lower layer, the processing request transmitted from the higher-layer node, or the node whose processor executes an application program or a middleware which causes the processor to execute the load balancing process for distributing, to the node in the next lower layer, the processing request transmitted from the higher-layer node.

(Note 21)

A node device operating as the master node in the load balancing system as described in Note 1 or 2, characterized by comprising:

a load balancing information receiving unit which receives the predetermined load balancing information held in the first node other than the master node from the first node or the second node in a higher layer than that of the first node; and a load balancing information storage unit which collectively stores the load balancing information for all the nodes included in the hierarchical structure.

(Note 22)

The node device as described in Note 21, characterized by comprising:

a transmission advisability determining unit which determines the advisability of the processing request to the first node in accordance with the presence or absence of a valid path leading from the first node to the tail end downstream thereof, as judged from the load balancing information stored in the load balancing information storage unit; and a transmission advisability notification unit which transmits, to another node which transmits the processing request to the first node, an advisability notice indicating the advisability of the processing request to the first node.

(Note 23)

The node device as described in Note 21 or 22, characterized by further comprising:

a load balancing manner change unit which changes the load balancing manner of a load balancing unit which distributes the processing request to the first node in the case where the load condition indicated by the load balancing information for the node involved meets a predetermined standard; and a load balancing manner notification unit which transmits, to the load balancing unit, a load balancing manner change notice indicating the load balancing manner changed.

(Note 24)

A load balancer operating as the load balancing unit in the load balancing system as described in Note 3, characterized by comprising:

an advisability notice receiving unit which receives the advisability notice from the master node; and a load distributing unit which distributes the processing request in accordance with the advisability notice received.

(Note 25)

A load balancer operating as the load balancing unit in the load balancing system as described in Note 4, 15 or 16, characterized by comprising:

a load balancing manner change notice receiving unit which receives the load balancing manner change notice from the master node; and a load distributing unit which distributes the accepted processing request in accordance with the load balancing manner changed.

(Note 26)

A computer-readable storage medium storing a load balancing control program for a load balancing system having a hierarchical structure in which each layer which includes one or more nodes and the processing requests are sequentially transmitted from the higher-layer nodes to the lower-layer nodes and in which any one of the nodes acts as a load balancing unit thereby to distribute the processing request to the tail-end nodes, the program being executed by a processor on a master node as one of the nodes to cause the master node to execute:

a process of receiving predetermined load balancing information held in a first node other than the master node, from the first node or a second node in a higher layer than that of the first node, and a process of collectively storing, in a predetermined load balancing information storage unit arranged on the master node, the load balancing information for all the nodes included in the hierarchical structure.

(Note 27)

The computer-readable storage medium as described in Note 26, characterized in that the predetermined load balancing information is the information indicating any one of: the number of processes accepted in the nodes to which the processing requests are distributed from the load balancing unit; the number of processes executed in the nodes; connection status of the nodes; load condition of the nodes; and a load balancing manner carried out by the load balancing unit.

(Note 28)

The computer-readable storage medium as described in Note 27, wherein the load balancing control program causes the master node to execute:

a process of determining the advisability of the processing request to the first node in accordance with the presence or absence of a valid path leading from the first node to the tail end downstream thereof, as judged from the load balancing information stored in the load balancing information storage unit; and a process of transmitting, to another node which transmits the processing request to the first node, an advisability notice indicating the advisability of the processing request to the first node.

(Note 29)

The computer-readable storage medium as described in Note 27 or 28, wherein the load balancing control program causes the master node to execute:

a process of changing the load balancing manner of a load balancing unit which distributes the processing request to the first node in the case where the load condition indicating the load balancing information for the first node meets a predetermined standard; and a process of transmitting, to the load balancing unit, a load balancing manner change notice indicating the changed load balancing manner.

(Note 30)

A computer-readable storage medium storing a load balancing program executed by a processor on any node acting as the load balancing unit in the load balancing system as described in Note 3, to cause the any node to execute:

a process of receiving the advisability notice to from the master node; and a process of distributing the processing request in accordance with the received advisability notice.

(Note 31)

A computer-readable storage medium storing a load balancing program executed by a processor on any node acting as the load balancing unit in the load balancing system as described in Note 4, 15 or 16, to cause the any node to execute:

a process of receiving the load balancing manner change notice to from the master node; and a process of distributing the processing request in accordance with the load balancing manner changed by the load balancing manner change notice.

(Note 32)

A computer-readable storage medium as described in Note 30 or 31, characterized in that the load balancing program is an application program or a middleware installed in the node.

(Note 33)

A load balancing method for a load balancing system having a hierarchical structure in which each layer which includes one or more nodes and the processing requests are sequentially transmitted from the higher-layer nodes to the lower-layer nodes and in which any one of the nodes acting as a load balancing unit thereby to distribute the processing request to the tail-end nodes, characterized in that:

a master node as one of the nodes receives predetermined load balancing information held in a first node than the master node, from the first node or a second node in a higher layer than that of the first node; and the load balancing information for all the nodes included in the hierarchical structure are collectively stored in a predetermined load balancing information storage unit included in the master node.

(Note 34)

The load balancing method as described in Note 33, characterized in that the predetermined load balancing information is the information indicating any one of: the number of processes accepted in the nodes to which the processing requests are distributed from the load balancing unit; the number of processes executed in the nodes; connection status of the nodes; load condition of the nodes; and a load balancing manner carried out by the load balancing unit.

(Note 35)

The load balancing method as described in Note 34, characterized in that:

the master node determines the advisability of the processing request to the first node in accordance with the presence or absence of a valid path leading from the first node to the tail end downstream thereof, as judged from the load balancing information stored in the load balancing information storage unit; and the advisability of the processing request to the network is notified to other nodes transmitting the processing request to the first node.

(Note 36)

The load balancing method as described in Note 34 or 35, characterized in that:

the master node changes the load balancing manner of the load balancing unit which distributes the processing request to the first node in the case where the load condition indicated by the load balancing information for the first node meets a predetermined standard; and the load balancing manner changed is notified to the load balancing unit.

(Note 37)

The load balancing method as described in Note 34 or 35, characterized in that the master node executes the process of matching between the load balancing information stored for the first node in the load balancing information storage unit and the load balancing information held in the first node.

(Note 38)

The load balancing method as described in Note 37, characterized in that the matching process is executed periodically and/or when the master node starts the load balancing process.

(Note 39)

The load balancing method as described in Note 37, characterized in that:

the master node receives the fault notice which indicates the fault occurrence in any one of the nodes and which is issued by another node in the next higher layer; and the master node executes the matching process upon reception of the fault notice.

(Note 40)

The load balancing method as described in Note 37, characterized in that:

the master node receives the restoration notice in which the restoration of any one of the nodes from the faulty state is notified by the any one of the nodes; and the master node executes the matching process upon reception of the restoration notice.

(Note 41)

The load balancing method as described in Note 34 or 35, characterized in that:

the master node checks the conflict existing in the load balancing information stored in the load balancing information storage unit.

(Note 42)

The load balancing method as described in Note 41, characterized in that the difference between the previously received load balancing information and the currently received load balancing information is checked.

(Note 43)

The load balancing method as described in Note 41, characterized in that the conflict existing in the load balancing information stored in each of the nodes is checked as to whether each of the nodes is normal or invalid.

(Note 44)

The load balancing method as described in Note 41, characterized in that the validity or invalidity of each of the nodes is judged in accordance with the presence or absence of a valid path leading from the node to the tail end.

(Note 45)

The load balancing method as described in Note 41, characterized in that the validity or invalidity of each of the nodes is judged in accordance with the presence or absence of a valid path leading to each of the nodes from the highest-layer nodes.

(Note 46)

The load balancing method as described in Note 41, characterized in that in the absence of a valid path leading from the first node to the tail end or in the absence of a valid path leading from the highest-layer nodes to the first node, the invalidity of the first node is set in the load balancing information stored in the load balancing information storage unit for the first node.

(Note 47)

The load balancing method as described in Note 36, characterized in that during the period when the load condition of each node to which the processing request is distributed by the load balancing unit is maintained in a predetermined tolerable range, the load balancing manner of the load balancing unit is maintained in the current load balancing manner.

(Note 48)

The load balancing method as described in Note 36, characterized in that the load balancing manner of the load balancing unit is maintained in the current load balancing manner in the case where the load balancing manner of the load balancing unit is such that the distributee of each of the processing requests received by the load balancing unit is determined in accordance with each processing request.

(Note 49)

The load balancing method as described in Note 34 or 35, characterized in that:

a plurality of nodes are arranged as the master nodes in the highest layer of the hierarchical structure of the load balancing system, and each of the master nodes mutually monitors whether other master nodes are faulty or not.

(Note 50)

The load balancing method as described in Note 49, characterized in that the master node transmits a fault notice and/or a fault restoration notice of the other master nodes to the client devices transmitting the processing request to the load balancing system and/or the lower-layer nodes.

(Note 51)

The load balancing method as described in Note 50, characterized in that:

the lower-layer nodes receive the fault notice and/or the fault restoration notice, the lower-layer nodes store the predetermined load balancing information and the life-and-death state of each of the master nodes, and the lower-layer nodes transmit the predetermined load balancing information in store to the master nodes not in a faulty state.

(Note 52)

The load balancing method as described in any one of Notes 33 to 51, characterized in that the load balancing unit is a load balancer which distributes, to the node in the next lower layer, the processing request transmitted from the higher-layer node, or the node whose processor executes an application program or a middleware which causes the processor to execute the load balancing process for distributing, to the node in the next lower layer, the processing request transmitted from the higher-layer node.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A load balancing system having a hierarchical structure in which each layer includes one or more nodes and processing requests are sequentially transmitted from higher-layer nodes to lower-layer nodes and in which any one of said nodes acts as a load balancer thereby to distribute the processing requests to tail-end nodes, said hierarchical structure comprising:

a load balancing node in a first layer, to distribute a processing request to another node;

a first node in a second layer lower than said first layer, receiving the processing request distributed by said load balancing node;

at least one second node in a third layer lower than said second layer; and a master node other than said first node and said second node comprising:

a load balancing information receiver which receives predetermined load balancing information held in said second node from said first node or said second node, a load balancing information storage which stores said load balancing information for all nodes included in said hierarchical structure, wherein said load balancing information for said first node includes status information of all of said at least one second node in one or more paths where the processing request is transmitted from said first node, a processor which determines advisability of distributing the processing request to said first node by said load balancing node, in response to whether all of said at least one second node in one or more paths where the processing request is transmitted from said first node is in fault or not, and a transmission advisability notification transmitter which transmits, to a node acting as said load balancing node distributing the processing request to said first node, an advisability notice indicating the advisability of distributing the processing request to said first node.

2. The load balancing system as claimed in claim 1, characterized in that said predetermined load balancing information is information indicating any one of: the number of processes accepted in said nodes to which the processing requests are distributed from said load balancing node; the number of processes executed in said nodes; connection status of said nodes; load condition of said nodes; and a load balancing manner carried out by said load balancing node.

3. The load balancing system as claimed in claim 2, characterized in that:
said master node further comprises:
a load balancing manner changer which changes a load balancing manner of a load balancing node which distributes the processing request to said first node in the case where the load condition indicated by said load balancing information for said first node meets a predetermined standard; and
a load balancing manner notification transmitter which transmits, to said load balancing node, a load balancing manner change notice indicating said load balancing manner changed.

4. The load balancing system as claimed in claim 1, characterized in that said load balancing node is a load balancer which distributes, to said node in the next lower layer, the processing request transmitted from said higher-layer node, or said node whose processor executes an application program or a middleware which causes said processor to execute a load balancing process for distributing, to said node in the next lower layer, the processing request transmitted from said higher-layer node.

5. A node device operating as said master node in the load balancing system as claimed in claim 1, characterized by comprising:
a load balancing information receiver which receives predetermined load balancing information held in said second node from said first node or said second node; and
a load balancing information storage which stores said load balancing information for all said nodes included in said hierarchical structure, wherein said load balancing information for said first node includes status information of all of said at least one second node in one or more paths where the processing request is transmitted from said first node;
a processor which determines advisability of distributing the processing request to said first node by said load balancing node in response to whether all of said at least one second node in one or more paths where the processing request is transmitted from said first node is in fault or not; and
a transmission advisability notification transmitter which transmits, to a node acting as said load balancing node distributing the processing request to said first node, an advisability notice indicating the advisability of distributing the processing request to said first node.

6. The node device as claimed in claim 5, characterized by further comprising:
a load balancing manner changer which changes a load balancing manner of a load balancing node which distributes the processing request to said first node in the case where a load condition indicated by said load balancing information for said first node meets a predetermined standard; and
a load balancing manner notification transmitter which transmits, to said load balancing node, a load balancing manner change notice indicating said load balancing manner changed.

7. A load balancer operating as said load balancing node of the load balancing system as claimed in claim 1, characterized by comprising:
an advisability notice receiver which receives said advisability notice from said master node; and
a load distributor which distributes the processing request in accordance with said advisability notice received.

8. A load balancer operating as said load balancing node of the load balancing system as claimed in claim 3, characterized by comprising:
a load balancing manner change notice receiver which receives said load balancing manner change notice from the master node; and
a load distributor which distributes the accepted processing request in accordance with said load balancing manner changed.

9. A non-transitory computer-readable storage medium storing a load balancing program executed by a processor on any node acting as said load balancing node in the load balancing system as claimed in claim 1, to cause said any node to execute:
a process of receiving said advisability notice from said master node; and a process of distributing said processing request in accordance with the received advisability notice.

10. A non-transitory computer-readable storage medium storing a load balancing program executed by a processor on any node acting as said load balancing node in the load balancing system as claimed in claim 3, to cause said any node to execute:
a process of receiving said load balancing manner change notice from said master node; and
a process of distributing said processing request in accordance with the load balancing manner changed by said load balancing manner change notice.

11. A non-transitory computer-readable storage medium storing a load balancing control program for a load balancing system having a hierarchical structure in which each layer includes one or more nodes and processing requests are sequentially transmitted from higher-layer nodes to lower-layer nodes and in which any one of said nodes acting as a load balancer thereby to distribute the processing requests to tail-end nodes,
said hierarchical structure comprising:
a load balancing node in a first layer, to distribute a processing request to another node,
a first node in a second layer lower than said first layer, receiving the processing request distributed by said load balancing node,
at least one second node in a third layer lower than said second layer, and
a master node other than said first node and said second node;
said load balancing control program being executed by a processor on a master node to cause said master node to execute:
a process of receiving predetermined load balancing information held in said second node, from said first node or said second node, a process of storing, in a predetermined load balancing information storage arranged on said master node, said load balancing information for all nodes included in said hierarchical structure, wherein said load balancing information for said first node includes status information of all of said at least one second node in one or more paths where the processing request is transmitted from said first node, a process of determining advisability of distributing the processing request to said first node by said load balancing node in response to whether all of said at least one second node in one or more paths where the processing request is transmitted from said first node is in fault or not, and a process of transmitting, to a node acting as said load balancing node distributing the processing request to said first node, an advisability notice indicating the advisability of distributing the processing request to said first node.

12. The non-transitory computer-readable storage medium as claimed in claim 11, characterized in that said predetermined load balancing information is information indicating any one of: the number of processes accepted in said nodes to which the processing requests are distributed from said load balancing node; the number of processes executed in said nodes; connection status of said nodes; load condition of said nodes; and a load balancing manner carried out by said load balancing node.

13. The non-transitory computer-readable storage medium as claimed in claim 12, wherein said load balancing control program causes said master node to execute:

a process of changing a load balancing manner of a load balancing node which distributes the processing request to said first node in the case where the load condition indicating said load balancing information for said first node meets a predetermined standard; and a process of transmitting, to said load balancing node, a load balancing manner change notice indicating the changed load balancing manner.

14. A load balancing method for a load balancing system having a hierarchical structure in which each layer includes one or more nodes and processing requests are sequentially transmitted from higher-layer nodes to lower-layer nodes and in which any one of said nodes acts as a load balancer thereby to distribute the processing requests to tail-end nodes, said hierarchical structure comprising:

a load balancing node in a first layer, to distribute a processing request to another node, a first node in a second layer lower than said first layer, receiving the processing request distributed by said load balancing node, at least one second node in a third layer lower than said second layer, and a master node other than said first node and said second node; wherein said master node receives predetermined load balancing information held in said second node, from said first node or said second node;

said load balancing information for all nodes included in said hierarchical structure are stored in a predetermined load balancing information storage included in said master node;

said load balancing information for said first node includes status information of all of said at least one second node in one or more paths where the processing request is transmitted from said first node;

said master node determines advisability of distributing the processing request to said first node by said load balancing node in response to whether all of said at least one second node in one or more paths where the processing request is transmitted from said first node is in fault or not; and the advisability of distributing the processing request to said first node is notified to a node acting as said load balancing node distributing the processing request to said first node.

15. The load balancing method as claimed in claim 14, characterized in that said predetermined load balancing information is information indicating any one of the number of processes accepted in said nodes to which the processing requests are distributed from said load balancing node; the number of processes executed in said nodes; connection status of said nodes; load condition of said nodes; and a load balancing manner carried out by said load balancing node.

16. The load balancing method as claimed in claim 15, characterized in that:

said master node changes a load balancing manner of a load balancing node which distributes the processing request to said first node in the case where the load condition indicated by said load balancing information for said first node meets a predetermined standard; and said load balancing manner changed is notified to said load balancing node.

* * * * *